United States Patent
Fukushima et al.

(10) Patent No.: US 7,124,333 B2
(45) Date of Patent: Oct. 17, 2006

(54) RETRANSMISSION PACKET STRUCTURE HAVING MULTIPLE SEQUENCE NUMBERS

(75) Inventors: Hideaki Fukushima, Kashiba (JP); Seiji Horii, Kashiwara (JP); Tatsuya Ohnishi, Kawanishi (JP); Makoto Hagai, Osaka (JP); Yoshinori Matsui, Katano (JP); Akihiro Miyazaki, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 63 days.

(21) Appl. No.: 10/945,881

(22) Filed: Sep. 22, 2004

(65) Prior Publication Data

US 2005/0053093 A1 Mar. 10, 2005

Related U.S. Application Data

(60) Division of application No. 10/601,706, filed on Jun. 24, 2003, now Pat. No. 6,918,077, which is a division of application No. 10/227,456, filed on Aug. 26, 2002, now Pat. No. 6,684,354, which is a continuation of application No. 09/450,590, filed on Nov. 30, 1999, now Pat. No. 6,587,985.

(30) Foreign Application Priority Data

Nov. 30, 1998 (JP) .................................. 10-340469
Aug. 6, 1999 (JP) .................................. 11-223379

(51) Int. Cl.
G06F 11/00 (2006.01)
G08C 25/02 (2006.01)
H04L 12/62 (2006.01)

(52) U.S. Cl. .................... 714/701; 714/748; 370/395.4

(58) Field of Classification Search ........ 714/748–750, 714/701; 375/240.27; 370/395.4, 395.42
See application file for complete search history.

(56) References Cited

U.S. PATENT DOCUMENTS 5,084,877 A 1/1992 Netravali et al.

(Continued)

FOREIGN PATENT DOCUMENTS

EP 0 905 976 A1 3/1999

(Continued)

OTHER PUBLICATIONS

RFC1889, "RTP: A Transport Protocol for Real-Time Applications", Jan. 1996.

(Continued)

*Primary Examiner*—Cynthia Britt
(74) *Attorney, Agent, or Firm*—Wenderoth, Lind & Ponack, L.L.P.

(57) ABSTRACT

A data transmission apparatus for relaying data transmitted from the transmitting end in units of packets, each packet having additional information relating to its sequence number, priority and data reproduction time, comprises: a receiving unit for receiving packets transmitted from the transmitting end; a priority decision unit for deciding the priority of each of the received packets; a retransmission packet storage unit for storing packets the priorities of which are equal to or higher than a predetermined value, as retransmission packets, on the basis of the priority of each packet decided by the priority decision unit; a retransmission instruction receiving unit for receiving a retransmission request from a terminal at the receiving end; a retransmission decision unit for deciding whether retransmission of the packet for which the retransmission request has been made should be performed or not, on the basis of the retransmission request and the storage status of the retransmission packets in the retransmission packet storage unit a transmission queue management unit for setting the transmission order of the received packets and the packets which have been decided as packets to be retransmitted, on the basis of additional information which is given to each packet; and a transmission unit for transmitting the data of these packets in the transmission order set by the management unit. Therefore, the transmission quality in a radio section in real-time transmission is improved and, further, the number of retransmission times is reduced.

4 Claims, 30 Drawing Sheets

U.S. PATENT DOCUMENTS

| | | | |
|---|---|---|---|
| 5,255,268 | A | 10/1993 | Cato et al. |
| 5,550,847 | A | 8/1996 | Zhu |
| 5,768,533 | A | 6/1998 | Ran |
| 6,031,818 | A | 2/2000 | Lo et al. |
| 6,052,812 | A | 4/2000 | Chen et al. |
| 6,085,253 | A | 7/2000 | Blackwell et al. |
| 6,104,757 | A | 8/2000 | Rhee |
| 6,141,324 | A | 10/2000 | Abbott et al. |
| 6,233,283 | B1 | 5/2001 | Chiu et al. |
| 6,301,222 | B1 | 10/2001 | Kovacevic et al. |
| 6,373,842 | B1 | 4/2002 | Coverdale et al. |
| 6,389,066 | B1 | 5/2002 | Ejzak |
| 6,469,992 | B1 | 10/2002 | Schieder |
| 6,674,477 | B1 | 1/2004 | Yamaguchi et al. |

FOREIGN PATENT DOCUMENTS

| | | |
|---|---|---|
| JP | 07-221789 | 8/1995 |
| JP | 09-191314 | 7/1997 |
| JP | 10-126772 | 5/1998 |
| JP | 10-243050 | 9/1998 |
| WO | 98/42132 | 9/1998 |

OTHER PUBLICATIONS

Seneviratne A. et al.: "Cellular networks and mobile internet", Computer Communications, Butterworths & Co. Publishers Ltd., GB, vol. 21, No. 14, Sep. 15, 1998, pp. 1244-1255 XP004146584.

Papadopoulos C., Parulkar G.: "Retransmission-based error control for continuous media applications", Proceedings of the Sixth International Workshop on Network and Operating Systems Support for Digital Audio and Video, 1996, pp. 5-12, XP002251288.

Rhee I: "Error Control Techniques for Interactive Low-bit Rate Video Transmission Over the Internet", Computer Communications Review, Association for Computing Machinery, New York, US, vol. 28, No. 4, Oct. 1998, pp. 290-301, XP000914443.

Xue Li et al.: "Layered video multicast with retransmission (LVMR): evaluation of error recovery schemes", Network and Operating Systems Support for Digital Audio and Video, 1997, pp. 161-172, XP010251695.

Sugh-Hoon Lee et al.: "Retransmission scheme for MPEG streams in mission critical mutimedia appllications" Euromicro Conference, Aug. 25, 1998, pp. 574-580, XP010298024.

$t_s$ : server transmission time
$t_r$ : terminal reception time
$t_o$ : packet output time
$t_p$ : time stamp of packet
(unit and initial value are identical to those of server transmission time and terminal reception time)
$d_p$ : (allowable) reproduction delay
$d_s$ : server-to-terminal transmission delay

Fig.34 (a)

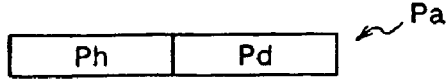

Fig.34 (b)

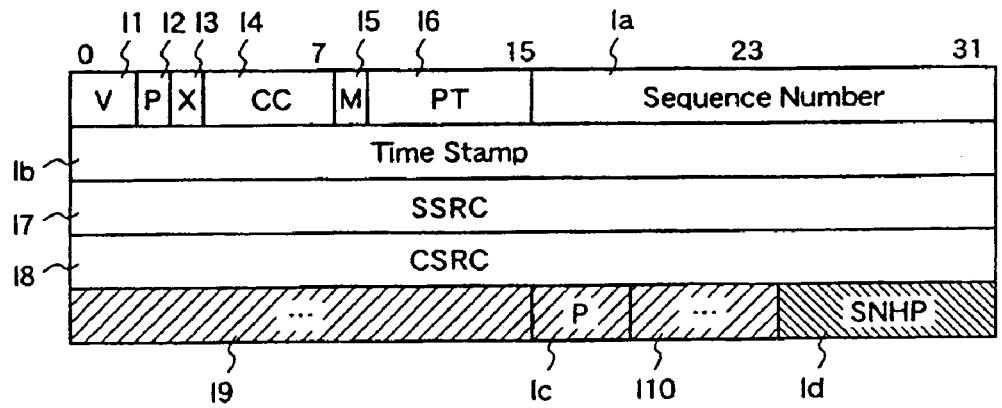

Fig.34 (c)

| Field name | Number of bits | Description |
|---|---|---|
| V:Version | 2 | Please refer to RFC1889 |
| P:Padding | 1 | Please refer to RFC1889 |
| X:Extension | 1 | Please refer to RFC1889 |
| CC:CSRC Count | 4 | Please refer to RFC1889 |
| M:Marker | 1 | Please refer to RFC1889 |
| PT:Payload Type | 7 | MPEG1, MPEG2 in Fig.35(b) |
| Sequence Number | 16 | Please refer to RFC1889 |
| Time Stamp | 32 | Please refer to RFC1889 |
| SSRC | 32 | Please refer to RFC1889 |
| CSRC | 32*CC | Please refer to RFC1889 |
| P:Padding | 3 | Picture Type(I or P or B) |
| SNHP:Sequence Number of RTP packet with High Priority | 6 | |

RETRANSMISSION PACKET STRUCTURE HAVING MULTIPLE SEQUENCE NUMBERS

This is a Divisional Application of U.S. application Ser. No. 10/601,706, filed Jun. 24. 2003 now U.S. Pat. No. 6,918,077, which is a Divisional Application of U.S. application Ser. No. 10/227,456, filed Aug. 26, 2002, which is now U.S. Pat. No. 6,684,354, which is a Continuation Application of U.S. application Ser. No. 09/450,590, filed Nov. 30, 1999, which is now U.S. Pat. No. 6,587,985.

FIELD OF THE INVENTION

The present invention relates to data transmission methods, data transmission apparatuses, data receiving apparatuses, and a packet data structure and, more particularly, to a process of performing data transmission in packet units between a distribution server and a terminal while successively reproducing the data of received packets at the terminal.

BACKGROUND OF THE INVENTION

For transmission of video (audio and video) data on the Internet, a download type transmission method and a stream type transmission method are currently employed.

In the download type transmission method, a video file transmitted from a distribution server is once copied at the terminal and, thereafter, data of the video file (video data) is reproduced. So, the terminal cannot perform data reproduction until the file transmission is completed. Therefore, the download type transmission method is not suitable for long-hours of reproduction of video data or the like.

On the other hand, in the stream type transmission method, while video data or the like is transmitted from a distribution server to a terminal, received data is reproduced at the terminal.

Recently, a stream type transmission method using, a protocol called RTP (Real-time Transport Protocol) which is defined in IETE-RFC 1889, has mainly been used.

FIG. 28(a) is a diagram for explaining a video data transmission method according to the RTP.

With reference to FIG. 28(a), a distribution server (transmitting end) and a terminal (receiving end) such as a personal computer are connected by a cable in the Internet, such as modem, ISDN, or LAN, and transmission of video data is carried out between the server and the terminal by using the RTP.

In the data transmission according to the RTP, processes for the respective packets are synchronized between the transmitting end and the receiving end by using time stamps as time information, and asynchronous (late arrival) packets and packets affected by transmission errors are discarded at the receiving end. Further, discarded or lost packets are detected at the receiving end, according to the absence of sequence numbers give to these packets.

On the other hand, Internet applications utilizing mobile phones, for example, mail access and text information service, are advancing now, and infrastructure for high-speed radio data communication (high-speed packet communication of about 384 kbps) is under preparation for practical use of the third generation mobile communication (W-CDMA: Wide band-Code Division Multiple Access).

FIG. 28(b) is a diagram illustrating a communication network for the above-described W-CDMA visual terminal.

Such communication network includes a radio transmission section. For example, when performing data transmission between a video distribution server and a visual terminal through a relay server, the section between the distribution server and the relay server is a cable transmission section by the Internet, but the section between the relay server and the visual terminal is a radio transmission section by a mobile phone network such as the W-CDMA.

However, the bit error rate in the radio transmission section is $10^{-3}$ while the bit error rate in the cable transmission section is $10^{-5}$–$10^{-7}$, and the radio transmission quality becomes a problem in the RTP type data transmission method in which the reproduction quality depends on the end-to-end (server-to-terminal) transmission quality.

SUMMARY OF THE INVENTION

The present invention is made to solve the above-described problems and has for its object to provide a data transmission method, a data transmission apparatus, and a data receiving apparatus, which can improve the transmission quality in a radio section in real-time transmission.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data transmission method for performing continuous data transmission from the transmitting end to the receiving end in units of packets, each packet having additional information relating to its sequence number, priority, and data reproduction time at the receiving end, while successively reproducing data of packets received at the receiving end. This method comprises: at the transmitting end, giving priority information to each packet to be transmitted; and storing, as retransmission data, only data of packets whose priorities are equal to or higher than a predetermined value, in a retransmission buffer; at the receiving end, when a transmission error is detected, detecting the priority information of an error packet; and when the detected priority is equal to or higher than the predetermined value, outputting a retransmission request for the error packet to the transmitting end by indicating the sequence number of this error packet; at the transmitting end, only when the data of the packet having the sequence number which is indicated by the retransmission request from the receiving end is stored in the retransmission buffer, retransmitting the data of this packet to the receiving end; and discarding the data stored in the retransmission buffer in order starting from a packet which cannot be in time for data reproduction at the receiving end. Therefore, the transmission quality in a radio section in real-time transmission is improved and, further, the number of retransmission times is reduced.

According to a second aspect of the present invention, in the data transmission method of the first aspect, when the retransmission buffer is filled up to its capacity, an updating process is performed, in which the retransmission data are retained while the data stored in the retransmission buffer are discarded in order, starting from a packet of the earliest reproduction time, on the basis of the reproduction time of each packet stored in the retransmission buffer. Therefore, the transmission quality in a radio section in real-time transmission is improved and, further, the number of retransmission times is reduced.

According to a third aspect of the present invention, in the data transmission method of the first aspect, when the data transmitted from the transmitting end to the receiving end is video data based on MPEG, a packet which contains data corresponding to frames coded by utilizing intra-frame correlation is regarded as a packet having a high priority. Therefore, the transmission quality in a radio section in real-time transmission is improved and, further, the number of retransmission times is reduced.

According to a fourth aspect of the present invention, in the data transmission method of the first aspect, at the transmitting end, the additional information relating to the sequence number and the priority of a predetermined packet is also embedded in a subsequent packet to be transmitted after the predetermined packet; and at the receiving end, in the case where a transmission error has occurred in the predetermined packet and the additional information of the predetermined packet has an error, a retransmission request for the predetermined packet as an error packet is made on the basis of the additional information of the predetermined packet which is embedded in the subsequent packet, when the subsequent packet transmitted after the predetermined packet is received. Therefore, the transmission quality in a radio section in real-time transmission is improved and, further, the number of retransmission times is reduced.

According to a fifth aspect of the present invention, in the data transmission method of the fourth aspect, at the transmitting end, the process of embedding the sequence number of a predetermined high priority packet in a subsequent packet which follows the predetermined high priority packet is continuously performed until a high priority packet next to the predetermined high priority packet is transmitted; and at the receiving end, the sequence number of another packet which is embedded in the received packet is extracted, and when a transmission error has occurred in the packet of the extracted sequence number, a retransmission request for this error packet is made by indicating the sequence number of this packet. Therefore, the transmission quality in a radio section in real-time transmission is improved and, further, the number of retransmission times is reduced.

According to a sixth aspect of the present invention, there is provided a data transmission apparatus for relaying data which are successively transmitted from the transmitting end in units of packets, each packet having additional information relating to its sequence number, priority and data reproduction time at the receiving end. This apparatus comprises: a receiving unit for receiving the packets transmitted from the transmitting end; a priority decision unit for deciding the priority of each of the received packets; a retransmission packet storage unit for storing packets whose priorities are equal to or higher than a predetermined value, as retransmission packets, on the basis of the priority of each packet decided by the priority decision unit; a retransmission instruction receiving unit for receiving a retransmission request from a terminal at the receiving end; a retransmission decision unit for deciding whether retransmission of the packet for which the retransmission request has been made should be performed or not, on the basis the retransmission request and the storage status of the retransmission packets in the retransmission packet storage unit transmission queue management unit for setting the transmission order of the received packets and the packets which have been decided as packets to be retransmitted, on the basis of the additional information; and a transmission unit for transmitting the data of these packets in the transmission order set by the management unit. Therefore, only the error packets whose priorities are equal to or higher than a predetermined value can be retransmitted, whereby the transmission quality of radio section in real-time transmission is improved and, further the number of retransmission times is reduced.

According to a seventh aspect of the present invention, there is provided a data receiving apparatus for receiving data which are transmitted from the transmitting end in units of packets, each packet having additional information relating to its sequence number, priority and data reproduction time at the receiving end, and successively reproducing the data for each packet. This apparatus comprises: a receiving unit for receiving the packets transmitted from the transmitting end; an error packet detection unit for detecting error packets in which errors have occurred during transmission, and outputting normal packets which have been transmitted without transmission errors, on the basis of the data of the received packets; a packet priority decision unit for receiving the output from the error packet detection unit, and deciding error packets whose priorities are equal to or higher than a predetermined value; and a retransmission instruction output unit for outputting a retransmission request for each of the error packets the priorities of which are decided as being equal to or higher than the predetermined value, to the transmitting end, by indicating the sequence number of this error packet. Therefore, at the receiving end, a retransmission request to the transmitting end is made only for the error packet whose priority is equal to or higher than a predetermined value, whereby the transmission quality in a radio section in real-time transmission is improved and, further, the number of retransmission times is reduced.

According to an eighth aspect of the present invention, there is provided a data transmission method in which data transmission from the transmitting end to the receiving end is continuously performed in units of packets, each packet having additional information relating to its sequence number, priority, and data reproduction time at the receiving end, while successively reproducing data of packets which have arrived at the receiving end and, at this time, only packets which can be in time for data reproduction at the receiving end are retransmitted. This method comprises: at the transmitting end, giving a data reproduction time at the receiving end to each packet to be transmitted; and storing, as retransmission data, only data of packets the priorities of which are equal to or higher than a predetermined value, in a retransmission buffer; at the receiving end, when a transmission error is detected, detecting the reproduction time for an error packet and the arrival time of the error packet, and deciding an arrival time limit in accordance with the reproduction time; and when the error packet has arrived before the arrival time limit, outputting a retransmission request for the error packet to the transmitting end by indicating the sequence number of this error packet; at the transmitting end, when the data of the packet having the sequence number indicated by the retransmission request from the receiving end is stored in the retransmission buffer, retransmitting data of the packet the transmission time of which does not pass the reproduction time, to the receiving end, while discarding data of the packet the transmission time of which has passed the reproduction time; and discarding the data stored in the retransmission buffer in order starting from a packet which cannot be in time for data reproduction at the receiving end. Therefore, the transmission quality in a radio section in real-time transmission is improved and, further, the number of retransmission times is reduced.

According to a ninth aspect of the present invention, in the data transmission method of the eighth aspect, when the retransmission buffer is filled up to its capacity, an updating processes is performed, in which the retransmission data are retained while the data stored in the retransmission buffer are discarded in order, starting from a packet of the earliest reproduction time, on the basis of the reproduction time of each packet stored in the retransmission buffer. Therefore, the transmission quality in a radio section in real-time transmission is improved and, further, the number of retransmission times is reduced.

According to a tenth aspect of the present invention, in the data transmission method of the eighth aspect, the arrival time limit is decided based on at least one of the allowable packet delay time decided at the receiving end, and the packet transmission delay time between the transmitting end and the receiving end. Therefore, the transmission quality in a radio section in real-time transmission is improved and, further, the number of retransmission times is reduced.

According to an eleventh aspect of the present invention, in the data transmission method of the eighth aspect, at the transmitting end, additional information relating to the sequence number and the reproduction time corresponding to a target packet to be transmitted is embedded in a subsequent packet to be transmitted after the target packet; and at the receiving end, when a transmission error of the target packet has occurred and the additional information of the target packet has an error, a retransmission request for the target packet as an error packet is made on the basis of the additional information of the target packet which is embedded in the subsequent packet, when the subsequent packet transmitted after the target packet is received. Therefore, the transmission quality in a radio section in real-time transmission is improved and, further, the number of retransmission times is reduced.

According to a twelfth aspect of the present invention, there is provided a data transmission apparatus for relaying data which are successively transmitted from the transmitting end in units of packets, each packet having additional information relating to its sequence number, priority and data reproduction time at the receiving end. This apparatus comprises: a receiving unit for receiving the packets transmitted from the transmitting end; a priority decision unit for deciding the priority of each of the received packets; a reproduction time decision unit for deciding packets which cannot be in time for reproduction at, the receiving end, amongst the packets to be transmitted to the receiving end; a retransmission packet storage unit for storing packets whose priorities are equal to or higher than a predetermined value, as retransmission packets, on the basis of the priority of each packet decided by the priority decision unit; a retransmission instruction receiving unit for receiving a retransmission request from a terminal at the receiving end; a retransmission decision unit for deciding whether retransmission of the packet for which the retransmission request has been made should be performed or not, on the basis of the retransmission request and the storage status of the retransmission packets in the retransmission packet storage unit; a transmission queue management unit for setting the transmission order of the received packets and the packets which have been decided as packets to be retransmitted, on the basis of the additional information; and a transmission unit for transmitting, in the transmission order set by the management unit, the data of packets other than the packets which are decided as packets that cannot be in time for reproduction at the receiving end, by the reproduction time decision unit. Therefore, the transmission quality in a radio section in real-time transmission is improved and, further, the number of retransmission times is reduced.

According to a thirteenth aspect of the present invention, there is provided a data receiving apparatus for receiving data which are transmitted from the transmitting end in units of packets, each packet having additional information relating to its sequence number, priority and data reproduction time at the receiving end, and successively reproducing the data for each packet. This apparatus comprises: a receiving unit for receiving the packets transmitted from the transmitting end; an error packet detection unit for detecting error packets in which errors have occurred during transmission, and outputting normal packets which have been transmitted without transmission errors, on the basis of the data of the received packets; a reproduction time decision unit for detecting the reproduction time given to each error packet detected by the error packet detection unit and the arrival time of the error packet at the receiving end, and setting the arrival time limit based on the reproduction time, and deciding whether or not the error packet has arrived at the receiving end before the arrival time limit; and a retransmission instruction output unit for outputting a retransmission request only for the error packet which has arrived at the receiving end before the arrival time limit, to the transmitting end, by indicating the sequence number of the error packet, on the basis of the result of the decision in the reproduction time decision unit. Therefore, the transmission quality in a radio section in real-time transmission is improved and, further, the number of retransmission times is reduced.

According to a fourteenth aspect of the present invention, there is provided a data transmission method for performing continuous data transmission from the transmitting end to the receiving end in units of packets, each packet having additional information relating to its sequence number, priority, and data reproduction time at the receiving end, while successively reproducing data of packets arrived at the receiving end. This method comprises: at the transmitting end, giving a data reproduction time and priority information to each packet to be transmitted; and storing, as retransmission data, only data of packets whose priorities are equal to or higher than a predetermined value, in a retransmission buffer; at the receiving end, when a transmission error is detected, detecting the priority information of an error packet, the reproduction time of the error packet, and the arrival time of the error packet; setting the arrival time limit of the error packet on the basis of the reproduction time; and when the detected priority is equal to or higher than the predetermined value and the error packet has arrived before the arrival time limit, outputting a retransmission request for this error packet to the transmitting end by indicating the sequence number of this error packet; at the transmitting end, when data of the packet having the sequence number indicated by the retransmission request from the receiving end is stored in the retransmission buffer, retransmitting only data of the packet whose transmission time does not pass the reproduction time, to the receiving end, while discarding data of the packet whose transmission time has passed the reproduction time; and discarding the data stored in the retransmission buffer in order starting from a packet which cannot be in time for reproduction at the receiving end. Therefore, the transmission quality in a radio section in real-time transmission is improved and, further, the number of retransmission times is reduced.

According to a fifteenth aspect of the present invention, the data transmission method of the fourteenth aspect, at the transmitting end, additional information relating to the sequence number, the priority, and the reproduction time of a predetermined packet is embedded in a subsequent packet to be transmitted after the predetermined packet; and at the receiving end, when a transmission error of the predetermined packet has occurred and the additional information of the predetermined packet has an error, a retransmission request for the predetermined packet as an error packet is made on the basis of the additional information of the predetermined packet which is embedded in the subsequent packet, when the subsequent packet transmitted after the predetermined packet is received. Therefore, the transmission quality in a radio section in real-time transmission is improved and, further, the number of retransmission times is reduced.

According to a sixteenth aspect of the present invention, the data transmission method of the fifteenth aspect, at the transmitting end, the process of embedding the sequence number a predetermined high priority packet in a subsequent packet which follows the predetermined high priority packet is continuously performed until a high priority packet next to the predetermined high priority packet is transmitted; and at the receiving end, the sequence number of another packet which is embedded in the received packet is extracted, and when a transmission error has occurred in the packet of the extracted sequence number, a retransmission request for this packet is made by indicating the sequence number of this packet. Therefore, the transmission quality in a radio section in real-time transmission is improve and, further, the number of retransmission times is reduced.

According to a seventeenth aspect of the present invention in the data transmission method of the fifteenth aspect, at the transmitting end, when additional information relating to the sequence number and the reproduction time corresponding to each packet is embedded in a subsequent packet to be transmitted after the packet; a difference between additional information relating to the sequence number and the reproduction time corresponding to the subsequent packet and the additional information relating to the sequence number and the reproduction time corresponding to the previous packet is embedded as the additional information. Therefore, the transmission quality in a radio section in real-time transmission is improved and, further, the number of retransmission times is reduced.

According to an eighteenth aspect of the present invention there is provided a data transmission method for performing data transmission between a distribution server and a terminal through a relay server in units of packets, and successively reproducing data of packets received at the terminal. This method comprises: when a transmission error has occurred between the relay server and the terminal, performing retransmission of an error packet by the relay server in response to a retransmission request from the terminal; and when a transmission error has occurred between the distribution server and the relay server, performing retransmission of an error packet by the distribution server in response to a retransmission request which has been transmitted from the terminal through the relay server. Therefore, the number of retransmission times is reduced between the distribution server and the relay server.

According to a nineteenth aspect of the present invention, in the data transmission method of the eighteenth aspect, when a transmission error has occurred between the distribution server and the relay server, a retransmission request is transmitted from the relay server to the distribution server, and retransmission of an error packet to the relay server is performed by the distribution server. Therefore, wasteful transmission of error packets from the relay server to the terminal is avoided.

According to a twentieth aspect of the present invention, there is provided a data transmission apparatus for relaying data which are successively transmitted from a distribution server, in units of packets each having additional information relating to its sequence number, priority and data reproduction time at the receiving end. This apparatus comprises: a receiving unit for receiving the packets transmitted from the transmitting end; a priority decision unit for deciding the priority of each of the received packets; a retransmission packet storage unit for storing packets whose priorities are equal to or higher than a predetermined value, as retransmission packets, on the basis of the priority of each packet decided by the priority decision unit; a retransmission instruction receiving unit for receiving a retransmission request from a terminal at the receiving end; a retransmission decision unit for deciding whether retransmission of the packet for which the retransmission request has been made is to be performed or not, on the basis of the retransmission request and the storage status of the retransmission packets in the retransmission packet storage unit; a retransmission instruction output unit for outputting the retransmission request for the error packet requested by the terminal, to the distribution server, on the basis of the result of the decision in the retransmission decision unit; a transmission queue management unit for setting the transmission order of the received packets and the packets which have been decided as packets to be retransmitted, on the basis of the additional information; and a transmission unit for transmitting the data of these packets in the transmission order set by the management unit. Therefore, the number of retransmission times between the distribution server and the relay server can be reduced.

According to a twenty-first aspect of the present invention, there is provided a data transmission method for performing continuous data transmission from the transmitting end to the receiving end in units of packets, each packet having additional information relating to its sequence number, priority, and data reproduction time at the receiving end, while successively reproducing data of packets received at the receiving end. This method comprises: at the transmitting end, when a packet the priority of which is equal to or higher than a predetermined value is transmitted as a high priority packet, storing data of this high priority packet, as retransmission data, in a retransmission buffer; managing the value of the transmitting end high priority sequence number which corresponds to the number of transmitted high priority packets, and the value of the sequence number of the high priority packet so that these values are correlated with each other; and transmitting a subsequent packet which follows the high priority packet after embedding the value of the transmitting end high priority sequence number in this subsequent packet; at the receiving end, extracting the value of the transmitting end high priority sequence number which is embedded in the received packet; managing the value of the receiving end high priority sequence number which corresponds to the number of received high priority packets; when the value of the extracted transmitting end high priority sequence number is not equal to the value of the receiving end high priority sequence number, outputting a retransmission request to the transmitting end, by indicating the value of the transmitting end high priority sequence number which is obtained on the basis of the value of the receiving end high priority sequence number; and updating the value of the receiving end high priority sequence number at the transmitting end, only when data of the packet having the sequence number corresponding to the value of the transmitting end high, priority sequence number which is indicated by the retransmission request from the receiving end is stored in the retransmission buffer, retransmitting the data of this packet to the receiving end. Therefore, retransmission of the high priority packet the priority of which is equal to or higher than a predetermined value, can be performed by simpler procedures.

According to a twenty-second aspect of the present invention, in the data transmission method of the twenty-first aspect, at the receiving end, when the value of the transmitting end high priority sequence number embedded in the received packet is not equal to the value of the receiving end high priority sequence number, a retransmission request is output to the transmitting end, by listing the values ranging from the value obtained by adding 1 to the receiving end high priority sequence number, to the value of the transmitting end high priority sequence number, as the values of the transmitting end high priority sequence numbers, or by designating the range as the range of the values of the transmitting end high priority sequence numbers; and at the transmitting end, the sequence numbers corresponding to the values of the plural transmitting end high priority sequence numbers which are indicated by the retransmission request from the receiving end are retrieved, and only when data of the packets having the sequence numbers obtained by the retrieval are stored in the retransmission buffer, the data of the packets are retransmitted to the receiving end. Therefore, retransmission of the high priority packet the priority of which is equal to or higher than a predetermined value, can be performed by simpler procedures.

According to a twenty-third aspect of the present invention, in the data transmission method of the twenty-first aspect, at the receiving end; the retransmission request is performed continuously several times, indicating the value of a transmitting end high priority sequence number; and at the transmitting end, the sequence number corresponding to the value of the transmitting end high priority sequence number which is indicated by the retransmission request from the receiving end is retrieved, and also the packet having the sequence number obtained by the retrieval is retransmitted to the receiving end and, simultaneously, the correspondence between the value of the sequence number obtained by the retrieval and the value of the transmitting end high priority sequence number indicated by the receiving end is deleted. Therefore, when at least one of several transmission requests from the receiving end is a normally received at the transmitting end, only the error packet the priority of which is equal to or higher than a predetermined value can be retransmitted, whereby the transmission quality in a radio section in real-time transmission can be effectively improved.

According to a twenty-fourth aspect of the present invention, there is provided a data transmission apparatus for relaying data which are successively transmitted from the transmitting end in units of packets each packet having additional information relating to its sequence number, priority, data reproduction time at the receiving end. This apparatus comprises: a receiving unit for receiving the packets transmitted from the transmitting end; a transmission queue management unit for setting the transmission order of the received packets and packets which are decided as packets to be retransmitted; a transmission unit for transmitting data of these packets in the transmission order set by the transmission queue management unit; a priority decision unit for deciding the priority of each of the received packets; a retransmission packet storage unit for storing packets whose priorities are equal to or higher than a predetermined value, as retransmission packets, on the basis of the priority of each packet decided by the priority decision unit; a sequence number management unit for managing the value of the transmitting end high priority sequence number which corresponds to the number of transmitted high priority packets, and the value of the sequence number of the high priority packet so that these values are correlated with each other; a high priority sequence number insertion unit for embedding the value of the transmitting end high priority sequence number in a subsequent packet which follows thee high priority packet; a retransmission instruction receiving unit for receiving a retransmission request indicating the high priority sequence number, from a terminal at the transmitting end; and a retransmission decision unit for deciding whether retransmission of the packet for which the retransmission request has been made is to be performed or not, on the basis of the retransmission request and the storage status of the retransmission packets in the retransmission packet storage unit. Therefore, only the error packet the priority of which is equal to or higher than a predetermined value can be retransmitted, whereby retransmission of the high priority packet can be performed by simpler procedures.

According to a twenty-fifth aspect of the present invention, there is provided a data receiving apparatus for receiving data which are transmitted from the transmitting end in units of packets, each packet having additional information relating to its sequence number, priority, and data reproduction time at the receiving end, and successively reproducing the data for each packet. This apparatus comprises: a receiving unit for receiving the packets transmitted from the transmitting end; an error packet detection unit for detecting an error packet in which an error has occurred during transmission, and outputting a normal packet which has been transmitted without transmission errors and the value of the transmitting-end high priority sequence number which corresponds to the number of transmitted high priority packets and is embedded in the normal packet; a high priority sequence number management unit for managing the value of the receiving end high priority sequence number which corresponds to the number of normal high priority packets which have been received without transmission errors, on the basis of the output from the error packet detection unit; a retransmission sequence number decision unit for comparing the value of the transmitting end high priority sequence number from the error packet detection unit with the value of the receiving end high priority sequence number, and when these values are not equal, deciding the value of the transmitting end high priority sequence number for which a retransmission request is to be made, on the basis of the value of the receiving end high priority sequence number; and a retransmission instruction output unit for outputting a retransmission request to the transmitting end, by indicating the value of the decided transmitting end high priority sequence number. Therefore, retransmission of the high priority packet can be performed with simpler procedures.

According to a twenty-sixth aspect of the present invention, there is provided a data structure of a packet for performing data transmission from the transmitting end and the receiving end, wherein the packet comprises a header section containing relevant information indicating the attribute of the packet, and a data section containing data to be transmitted; and the header section comprises at least first and second header information, amongst first header information indicating the sequence number corresponding to the packet, second header information indicating the priority of the packet, and third header information indicating the reproduction time at the receiving end, of the data to be transmitted. Therefore, retransmission of a low priority packet and retransmission of a packet which cannot be in time for reproduction can be avoided, whereby the transmission quality in a radio section in real-time transmission is improved while reducing the number of retransmission times.

According to a twenty-seventh aspect of the present invention, in the packet data structure of the twenty-sixth aspect, the header section of the packet includes attribute information of a packet which has already been transmitted before the packet. Therefore, retransmission of an error packet can be performed with reliability.

According to a twenty-eighth aspect of the present invention, in the packet data structure of the twenty-seventh aspect, the header section of the packet includes the first and second information or the first and third information, as attribute information of a packet which has already been transmitted before the packet. Therefore, retransmission control based on the priority or the reproduction time can be performed with reliability.

According to a twenty-ninth aspect of the present invention, in the packet data structure of the twenty-sixth aspect, the header section of the packet includes the value of the high priority sequence number corresponding to the number of high priority packets which have been transmitted before the packet and having the priorities equal to or higher than a predetermined value. Therefore, the transmission quality in a radio section in real-time transmission is improved and, moreover, retransmission of an error packet is realized by simpler procedures.

BRIEF DESCRIPTION OF THE DRAWINGS

FIGS. 34(a)–34(c) are diagrams illustrating the data structure of a packet for transmitting data by a data transmission method according to any of the aforementioned embodiments (FIG. 34(a)), the structure of the packet header (FIG. 34(b)), and the convention of header information (FIG. 34(c)).

DETAILED DESCRIPTION OF THE PREFERRED EMBODIMENTS

Figure 1:
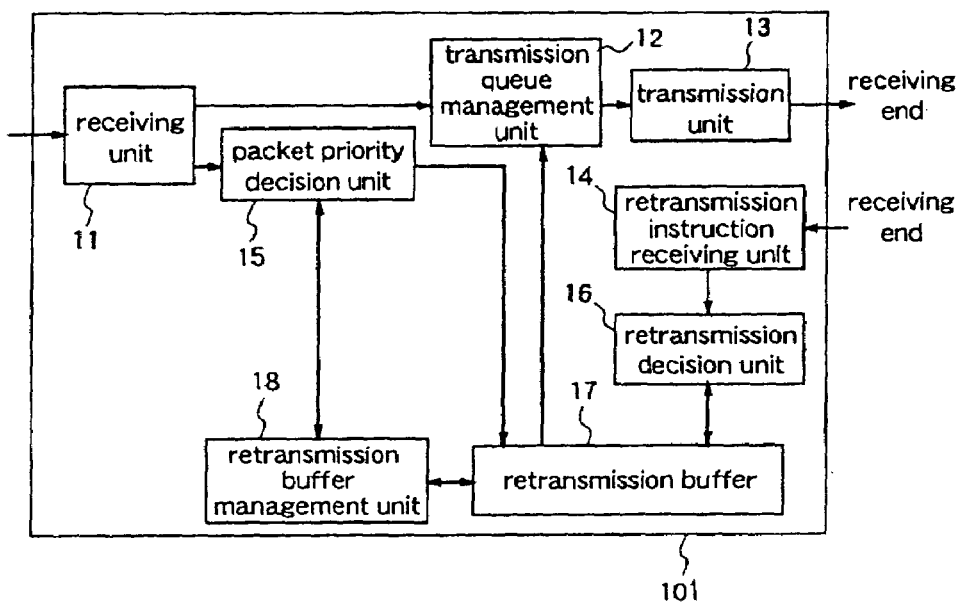
FIGS. 1(a) and 1(b) are block diagrams for explaining data transmission apparatuses as a relay server and a distribution server, respectively, in a data transmission system according to a first embodiment of the present invention.
Figure 1:
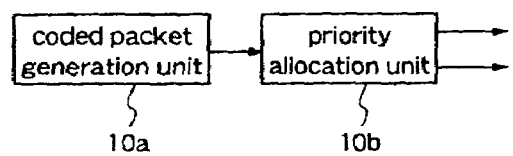

Hereinafter, the inventor's viewpoint and the fundamental principle of the present invention will be described.

The inventors of the present invention have earnestly studied about a method for improving the transmission quality in a network including a radio transmission section, and finally discovered that the transmission quality in the radio section can be improved by performing real-time retransmission of packets, in the existing real-time transmission method.

To be specific, in the existing real-time transmission method, packet data are transmitted in real time between a distribution server and a terminal unit through a relay server or the like, and additional information (e.g., a sequence number, a time stamp, etc) required for real-time transmission of each packet data is given to the header of the packet. The additional information enables real-time control of packet retransmission.

In the data transmission method of the present invention in which data transmission is performed in real time between the distribution server and the terminal through the relay server while retransmission control is performed in real time, the relay server may serve as the video distribution server. Further, as for the video data transmission direction, the present invention can be applied to not only the forward transmission from the distribution server to the terminal but also the backward transmission from the terminal to the distribution server.

Further, in the present invention, for effective real-time transmission, control of transmission QoS (Quality of Service) in the relay server is realized.

Next, the summary of real-time retransmission control in the data transmission method of the present invention will be briefly described.

While the real-time retransmission control of the present invention regards the transmission quality of the radio section and recovers error packets due to radio transmission error by retransmission of the packets, the conventional retransmission control is directed to realize high reliability in data transmission (error-free transmission). That is, in order to recover all error packets, retransmission of error packets is repeated until data are correctly transmitted to the receiving end. In the conventional retransmission control when the final error packet retransmission has failed, the data transmission is abnormally ended as a communication error.

By the way, in the retransmission control required for the real-time video data transmission, even when a transmission error occurs while predetermined packets are transmitted and several frames of images are thereby lost, this is not a fatal transmission error which leads to an abnormal end of data transmission. Accordingly, in the video data transmission method, the highest priority is given to complete real-time transmission with a measure of reliability.

For example, in transmission of a video signal based on MPEG standard, in the case where a packet corresponding to an I frame (intra-frame coded image) as a reference image becomes an error packet, even when subsequent packets corresponding to a P frame (inter-frame forward-prediction coded image) and a B frame (inter-frame bidirectional-prediction coded image) are received normally, video signals of the P frame and the B frame cannot be reproduced. So, as for the I frame, it is necessary to recover the transmission error to the utmost.

Further, in video transmission (stream type communication having an audio signal and a video signal as objects to be transmitted), in contrast with the conventional retransmission control, it is necessary to perform retransmission while performing real-time transmission.

In order to realize such real-time transmission, the present invention provides a real-time transmission method in which the following retransmission control for error packets is performed.

First retransmission control is selective retransmission control for reducing the number of retransmission times by selecting, as packets to be retransmitted, high priority packets amongst the error packets. Second retransmission control is retransmission control with a time limit for reducing excessive retransmission by stopping the retransmission of packets amongst the error packetswhich cannot be in time for reproduction.

Hereinafter, embodiments of the present invention will be described.

Embodiment 1

Figure 2:
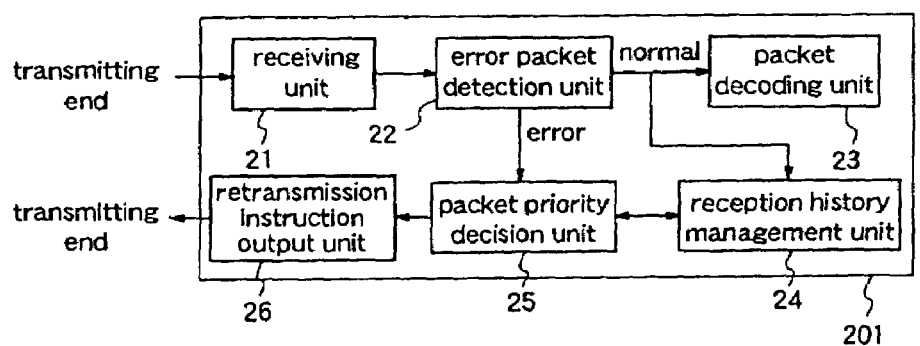
FIG. 2 is a block diagram illustrating a data receiving apparatus (receiving terminal) in the data transmission system according to the first embodiment.
Figure 3:
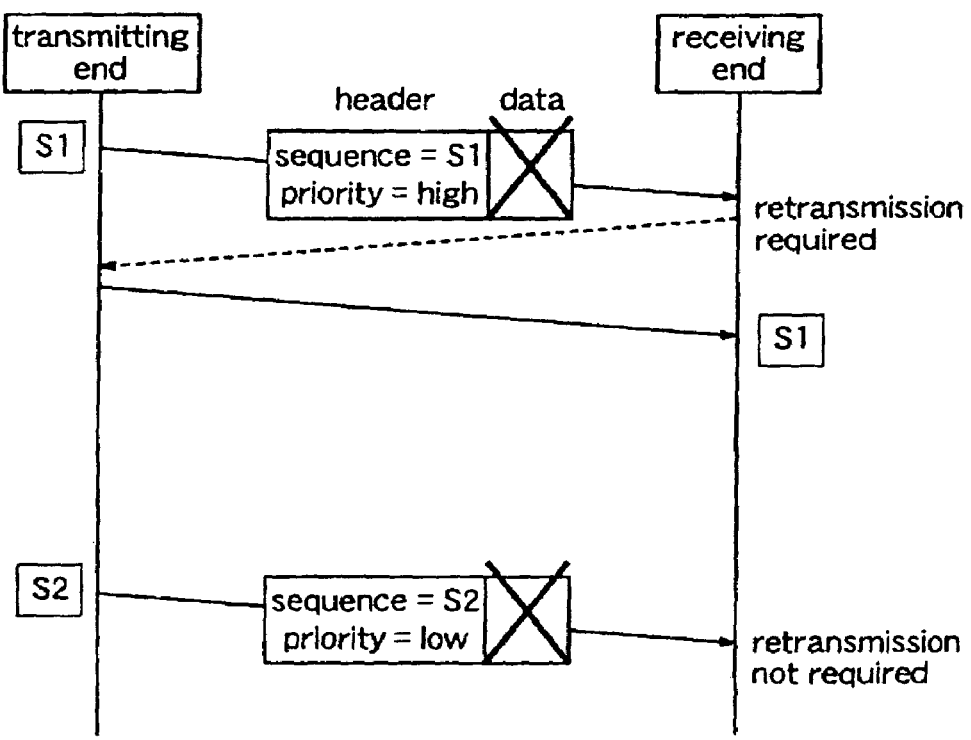
FIG. 3 is a sequence diagram for explaining packet selective retransmission control in a data transmission method according to the first embodiment.

FIGS. 1–3 are diagrams for explaining a data transmission method according to a first embodiment of the present invention.

In the data transmission method of this first embodiment, data transmission from the transmitting end to the receiving end is continuously performed in units of packets, each packet having additional information relating to its sequence number, priority, and data reproduction time at the receiving end, while successively reproducing data of packets received at the receiving end. At this time, only error packets whose priorities are equal to or higher than a predetermined value are retransmitted.

FIG. 1(a) is a block diagram illustrating a data transmission apparatus 101 in a data transmission system which performs real-time data transmission according to the data transmission method of the first embodiment.

This data transmission apparatus 101 constitutes a relay server (transmitting end) which relays data transmitted between a distribution server and a terminal (receiving end). This apparatus 101 includes a receiving unit 11, a transmission queue management unit 12, and a transmission unit 13. The receiving unit 11 receives packets transmitted from the distribution server. The transmission queue management unit 12 sets the transmission order of the received packets and the packets to be retransmitted (hereinafter referred to as retransmission packets) in accordance with the above-described additional information. The transmission unit 13 transmits the packet data in the transmission order which has been set by the transmission queue management unit 12.

Each packet transmitted from the transmitting end is composed of a data section containing digital data such as video data, audio data, and text data, and a header section containing additional information other than these digital data. To be specific, the header section of each packet contains additional information relating to its sequence number, priority, and data reproduction time at the receiving end.

Further, the data transmission apparatus 101 includes a buffer 17 for retransmission (hereinafter, referred to as a retransmission buffer 17), a packet priority decision unit 15, and a retransmission buffer management unit 18. The retransmission buffer 17 stores predetermined packets amongst the received packets, as retransmission packets. The packet priority decision unit 15 decides the priorities of the received packets. The retransmission buffer management unit 18 controls the retransmission buffer 17 such that data of packets whose priorities are equal to or higher than a predetermined value are stored in the buffer 17, in accordance with the decided priorities of the packets. To be specific, only when data of a packet having a sequence number indicated by a retransmission request from the receiving side is stored in the retransmission buffer 17, the retransmission decision unit 16 decides that data of this packet should be retransmitted to the receiving end.

Further, the data transmission apparatus 101 includes a retransmission instruction receiving unit 14 and a retransmission decision unit 16. The retransmission instruction receiving unit 14 receives a retransmission instruction (hereinafter also referred to as a retransmission request) from the terminal at the receiving end. The retransmission decision unit 16 decides whether retransmission of a packet for which the retransmission instruction has been made is performed or not.

While in FIG. 1(*a*) the data transmission apparatus 101 constitutes a relay server, when the data transmission apparatus is a distribution server, it is constructed as shown in FIG. 1(*b*). That is, in FIG. 1(*b*), the receiving unit 11 of the data transmission apparatus 101 is replaced with a coded packet generation unit, 10*a* which encodes the data and outputs the coded data in packet units, and a priority allocation unit 10*b* which allocates additional information such as a priority to each packet output from the coded packet generation unit 10*a*.

FIG. 2 is a block diagram illustrating a data receiving apparatus 201 in the data transmission system which performs real-time data transmission according to the data transmission method of the first embodiment.

The data receiving apparatus 201 includes a receiving unit 21, an error packet detection unit 22, and a packet decoding unit 23. The receiving unit 21 receives the packets transmitted from the relay server (the data transmission apparatus at the transmitting end). The error packet detection unit 22 detects error packets in which errors have occurred during transmission, and outputs normal packets which have been transmitted without transmission errors. The packet decoding unit 23 receives the normal packets and decodes the coded data of the normal packets.

Further, the data receiving apparatus 201 includes a reception history management unit 24, a packet priority decision unit 25, and a retransmission instruction output unit 26. The reception history management unit 24 manages the packet reception history. The packet priority decision unit 25 receives the result of the detection in the error packet detection unit 22 and decides an error packet the priority of which is equal to or higher than a predetermined value. The retransmission instruction output unit 26 outputs a request for retransmitting the error packet which has been decided in the packet priority decision unit 25, toward the transmitting end, by indicating the sequence number of the error packet.

Next, the function and effect will be described.

FIG. 3 is a sequence chart for explaining the packet selective retransmission control in the data transmission method of the first embodiment.

In the data transmission method of this first embodiment, when a transmission error occurs during packet transmission, a retransmission request is made for only the packets whose priorities are equal to or higher than a predetermined value, from the receiving end to the transmitting end, while no retransmission request is made for the error packets whose priorities are lower than the predetermined value.

For example, assuming that the priorities equal to or higher than the predetermined value are high priorities while the priorities lower than the predetermined value are low priorities, when an error occurs during transmission of a high priority packet (S1) of sequence number, S1, a retransmission request for this high priority packet (S1) is made. However, when an error occurs during transmission of a low priority packet (S2) of sequence number S2, no retransmission request is made for this low priority packet (S2).

To be specific, each packet transmitted from the distribution server is given additional information relating to its sequence number and priority. In the data transmission apparatus 101 as a relay server, the transmission order of the received packets is set by the transmission queue management unit 12, and the packets are supplied to the transmission unit 13. On the other hand, the priorities of the received packets are decided by the packet priority decision unit 15. Then, in the transmission unit 13, transmission of these packets is performed according to the transmission order, which has been set. Further, those packets whose priorities are decided as being equal to or higher than the predetermined value are stored in the retransmission buffer 17 under control of the retransmission buffer management unit 17. Further, in the retransmission buffer 17, data are successively released (discarded) from the packets which cannot be in time for reproduction, under control of the management unit 18.

When the retransmission buffer 17 has no more vacant space (capacity), one of the following two processes is performed: a first updating process in which the above-described retransmission data is retained while the data of the packets stored in the retransmission buffer 17 are discarded in order starting from a packet of the earliest reproduction time; and a second updating process in which the retransmission data is retained while successively discarding the data stored in the retransmission buffer 17 so that reproduction of packet data for predetermined packets, amongst the packet of the earliest reproduction time and the subsequent packets, is performed at regular intervals at the receiving end.

In this way, the packets from the distribution server are successively transmitted to the terminal (data receiving apparatus) 201 through the relay server (data transmission apparatus) 101.

In the data receiving apparatus 201, the packets from the relay server (data transmission apparatus) 101 are received by the receiving unit 21, and the received packets are supplied to the error packet detection unit 22. Then, only the packets which have been transmitted without transmission errors are output from the error packet detection unit 22 to the packet decoding unit 23, and the additional information of each packet is supplied to the reception history management unit 24. At this time, the priority information of each error packet is supplied to the packet priority decision unit 25, wherein it is decided whether or not the priority of the error packet is equal to or higher than a predetermined value. With respect to the error packet whose priority is equal to or higher than the predetermined value, the retransmission instruction output unit 26 outputs a retransmission request to the transmitting end, by indicating the sequence number of this error packet.

Then, in the data transmission apparatus 101 at the transmitting end, the retransmission request is received by the retransmission instruction receiving unit 14, and it is decided by the retransmission decision unit 16 as to whether the packet of the sequence number indicated by the retransmission request is stored in the retransmission buffer 17 or not. When the packet of the sequence number indicated by the retransmission request is stored in the retransmission buffer 17, this packet is output as a retransmission packet, from the retransmission buffer 17 to the transmission queue management unit 12. In the transmission queue management unit 12, the retransmission packet is given a predetermined transmission order and then retransmitted to the receiving end through the transmission unit 13.

As described above, according to the first embodiment of the present invention, data transmission from the transmitting end to the receiving end is continuously performed in units of packets each having additional information relating to its sequence number, priority, and data reproduction time and, simultaneously, data of the packets received at the receiving end are successively reproduced. With respect to error packets affected by transmission errors, only those having priorities equal to or higher than a predetermined value are retransmitted. Therefore, the transmission quality of the radio section in the real-time transmission is improved and, moreover, the number of retransmission times can be reduced.

In this first embodiment, each packet may be given the frame type, such as I frame, P frame, and B frame, as the additional information, instead of the priority.

Further, there are various methods for deciding the packet priority. For example, in the case of a video signal based on the MPEG standard, packets corresponding to I frames may be decided as high priority packets. Further, in the packet discarding process performed when the retransmission buffer is filled to the capacity, the above-described first or second updating process may be performed on the packets in the order of ascending priorities.

Embodiment 2

Figure 4:
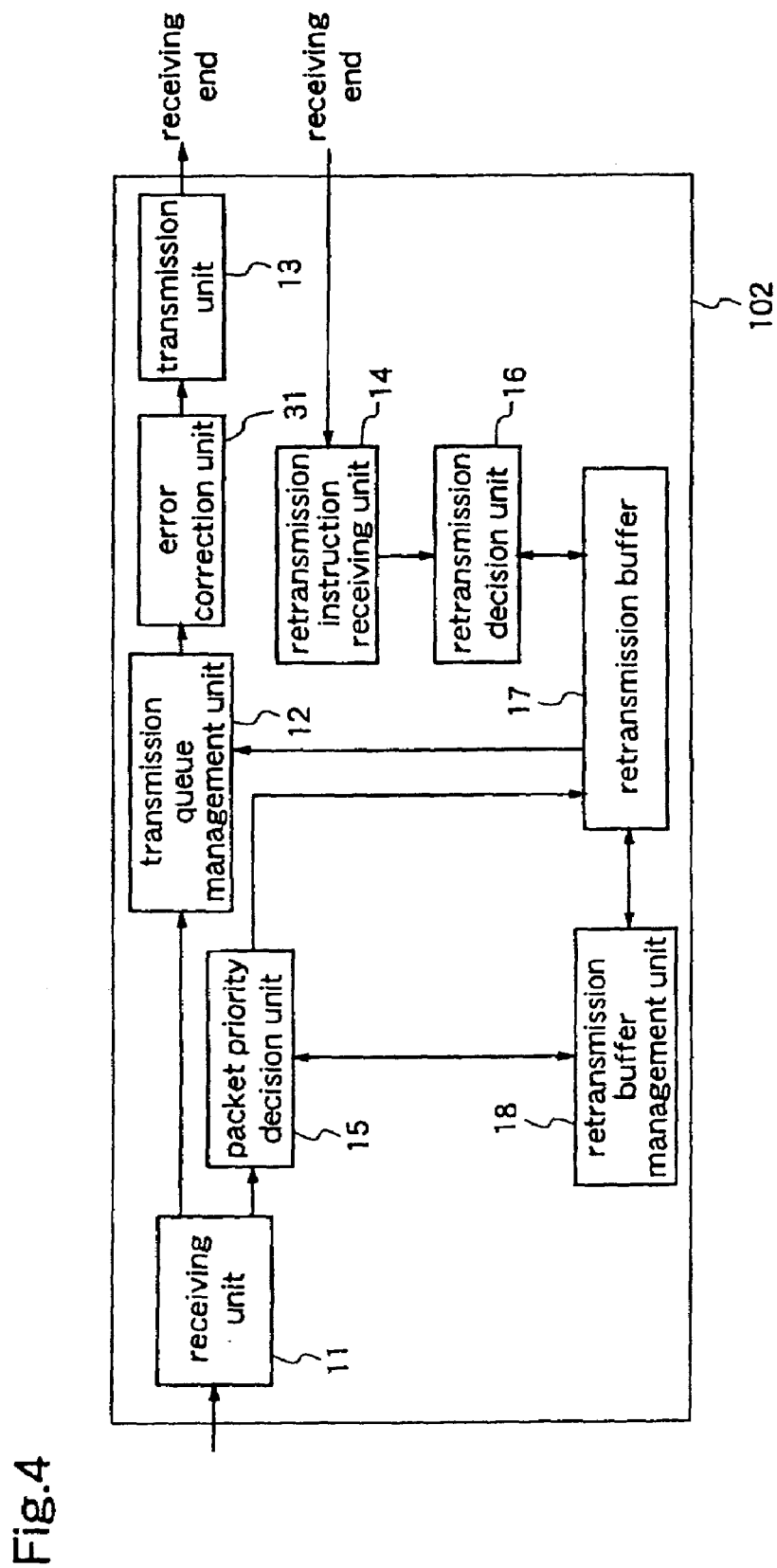
FIG. 4 is a block diagram illustrating a data transmission apparatus (relay server) in a data transmission system according to a second embodiment of the present invention.
Figure 5:
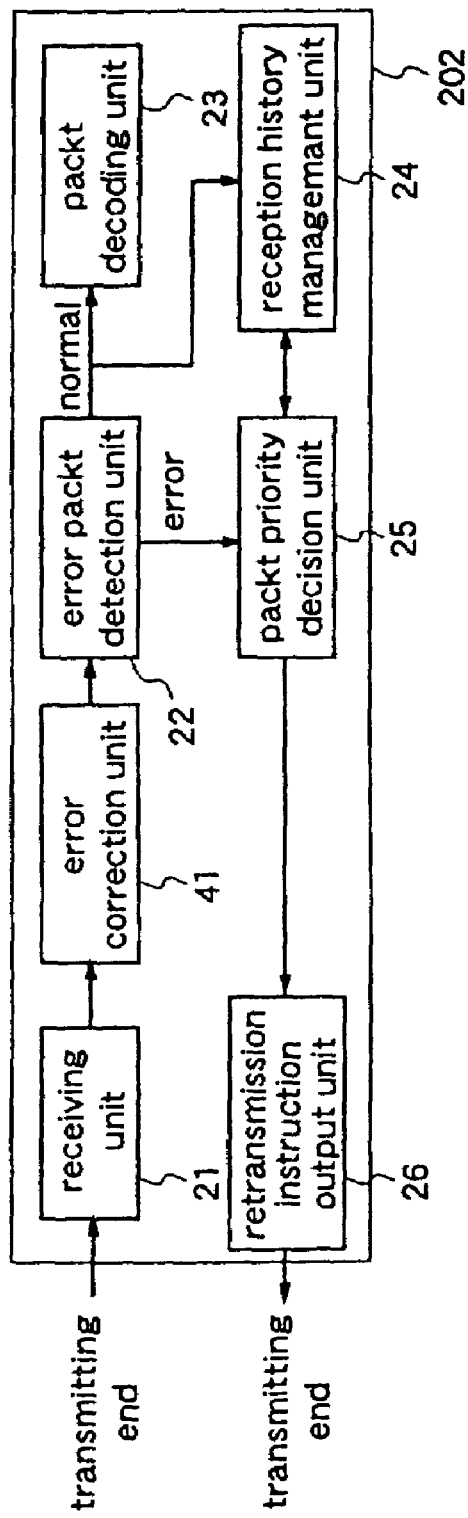
FIG. 5 is a block diagram illustrating a data receiving apparatus (receiving terminal) in the data transmission system according to the second embodiment.

FIGS. 4–5 are diagrams for explaining a data transmission method according to a second embodiment of the present invention.

FIG. 4 is a block diagram illustrating a data transmission apparatus 102 in a data transmission system which performs real-time data transmission according to this data transmission method.

The data transmission apparatus 102 includes an error correction unit 31, in addition to the constituents of the data transmission apparatus 101 of the first embodiment. The error correction unit 31 performs an error correction process in which each packet output from the transmission queue management unit 12 is given error correction codes for additional information such as its sequence number priority, etc., and the packet which has been subjected to the error correction process is supplied to the transmission unit 13.

Other constituents of the data transmission apparatus 102 are identical to those of the data transmission apparatus 10 of the first embodiment.

FIG. 5 is a block diagram illustrating a data receiving apparatus 202 in the data transmission system which performs the real-time data transmission according to the data transmission method of this second embodiment.

The data receiving apparatus 202 of this second embodiment includes an error correction unit 41, in addition to the constituents of the data receiving apparatus 201 of the first embodiment. The error correction unit 41 performs an error correction process in which each packet received by the receiving unit 21 is subjected to an error correction process in which the additional information of this packet is subjected to error correction by using the error correction codes given to the packet, and the packet which has been subjected to the error correction process is output to the error packet detection unit 22. Other constituents of the data receiving apparatus 202 are identical to those of the data receiving apparatus 201 of the first embodiment.

Next, the function and effect will be described.

In the data transmission method according to the second embodiment, at the transmitting end, each packet to be transmitted is given error correction codes for the additional information relating to its sequence number, priority, etc. At the receiving end, the additional information is subjected to error correction according to the error correction codes and, thereafter, a retransmission request for the error packet is made in accordance with the additional information. Thereby, even when the sequence number and the priority information have errors, a retransmission request for the error packet can be correctly performed.

Embodiment 3

Figure 6:
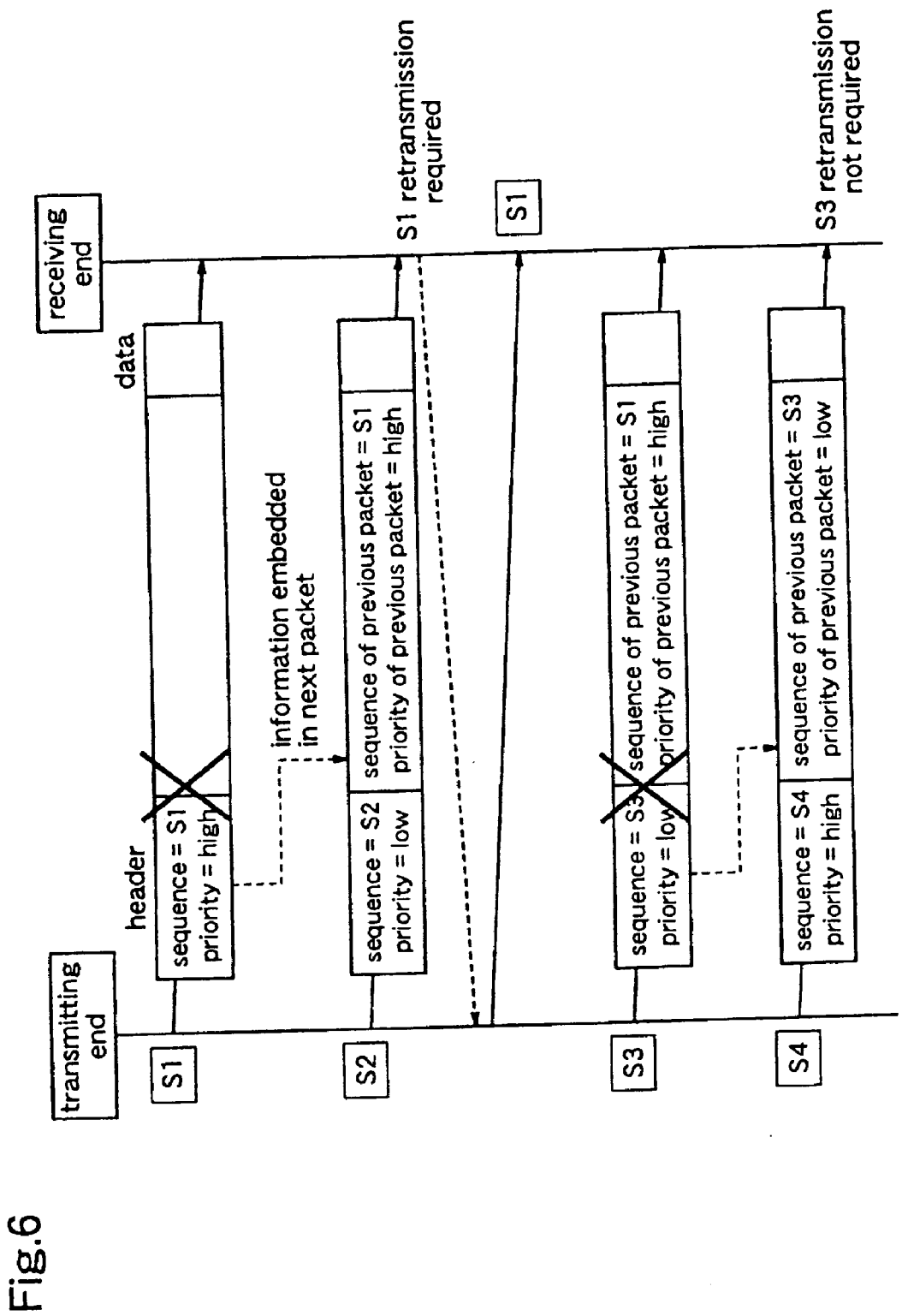
FIG. 6 is a sequence diagram for explaining packet selective retransmission control in a data transmission method according to a third embodiment of the present invention.

FIGS. 6–9 are diagrams for explaining data transmission methods according to a third embodiment of the invention and a modification of the third embodiment. FIG. 6 is a sequence diagram for explaining packet selective retransmission control in the data transmission method of the third embodiment.

In the data transmission method of the third embodiment, at the transmitting end, additional information relating to the sequence number and priority of a predetermined packet is embedded in a subsequent packet which will be transmitted after the predetermined packet. At the receiving end, when a transmission error of the predetermined packet occurs and thereby the additional information of the predetermined packet has an error, a retransmission request for the error packet is made when receiving the subsequent packet which is transmitted after the error packet, in accordance with the additional information of the predetermined packet which is embedded in the subsequent packet.

For example, assuming that the priorities equal to or higher than a predetermined value are high priorities while the priorities lower than the predetermined value are low priorities, as shown in FIG. 6, when an error occurs during transmission of a high priority packet (S1) of sequence number S1 and only a low priority packet (S2) of sequence number S2 which follows the packet S1 is normally received, a retransmission request for the high priority packet (S1), is made when the next low priority packet (S2) is received.

On the other hand, when an error occurs during transmission of a low priority packet (S3) of sequence number S3 and only a high priority packet (S4) of sequence number S4 which follows the packet S3 is normally received, no retransmission request for the low priority packet S3 is made when the next high priority packet (S4) is received.

In the data transmission method so constructed, even when an error occurs during transmission of a predetermined packet and thereby the sequence number or the priority information of this packet has an error, since the additional information (sequence number, priority, etc.) of the predetermined packet is embedded in the subsequent packet which is transmitted next to this packet, a transmission request for this error packet (predetermined packet) can be made correctly.

While in this third embodiment the additional information of each packet is embedded in the next packet, the additional information of each packet may be embedded in, not only the next packet, but, also a plurality of subsequent packets. This construction will be described hereinafter as a modification of the third embodiment.

Modification of Embodiment 3

Figure 7:
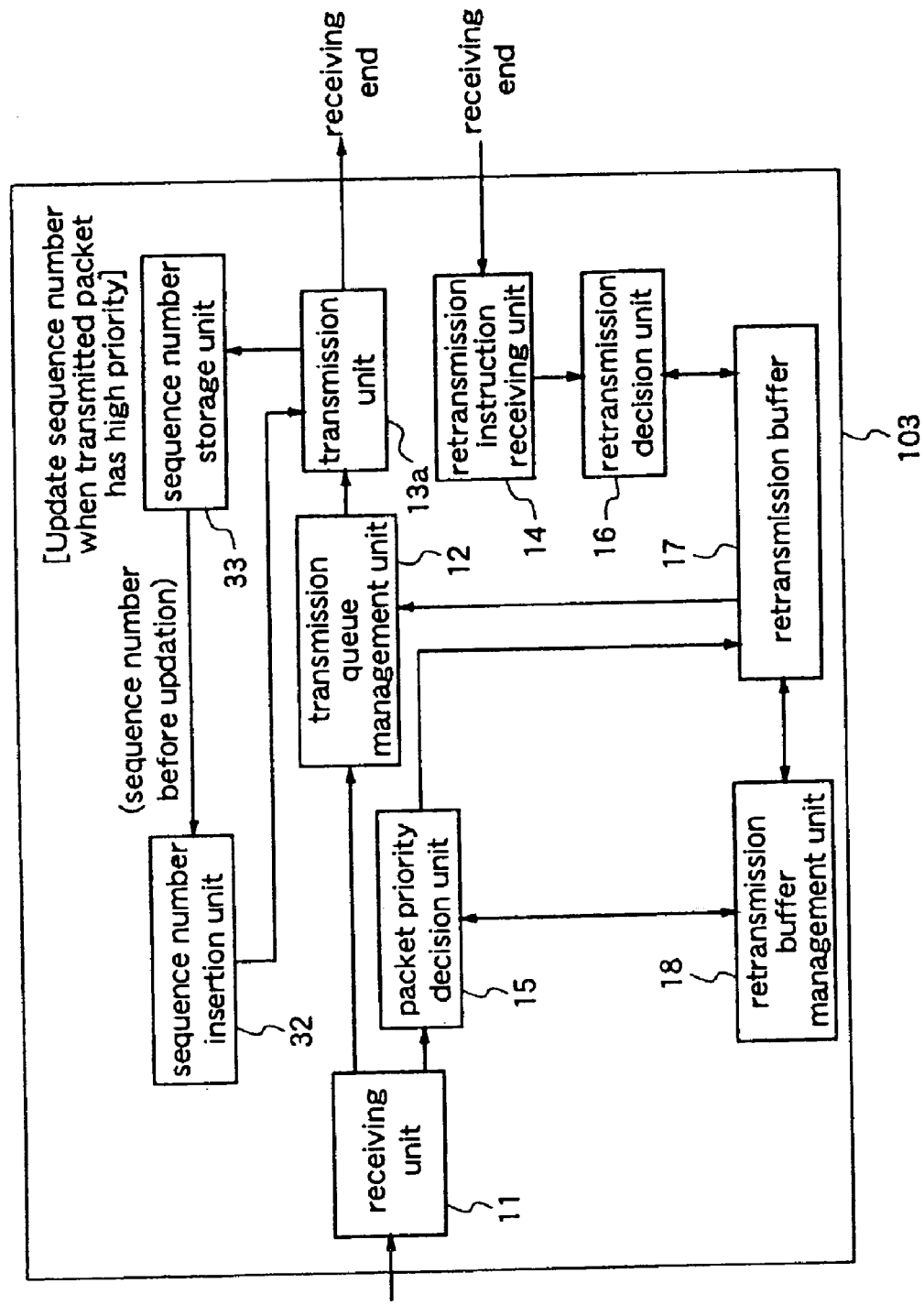
FIG. 7 is a block diagram illustrating a data transmission apparatus (relay server) in a data transmission system according to a modification of the third embodiment.

FIG. 7 is a block diagram illustrating a data transmission apparatus 103 in a data transmission system which performs real-time data transmission by using a data transmission method according to the modification of the third embodiment.

The data transmission apparatus 103 includes a sequence number storage unit 33 and a sequence number insertion unit 32, in addition to the constituents of the data transmission apparatus 101 of the first embodiment. The sequence number storage unit 33 stores the sequence numbers of the packets whose priorities are equal to or higher than a predetermined value, amongst the packets transmitted by a transmission unit 13a. The sequence number insertion unit 32 outputs each of the sequence numbers stored in the sequence number storage unit 33 to the transmission unit 13a so that the sequence number is inserted in the header of the packet to be transmitted. Further, the transmission unit 13a of this modification is different from the transmission unit 13 of the first embodiment only in that it inserts the sequence number supplied from the sequence number insertion unit 32 into the header of the packet supplied from the transmission queue management unit 12, before transmitting the packet. Other constituents of the data transmission apparatus 103 are identical to those of the data transmission apparatus 101 of the first embodiment.

Figure 8:
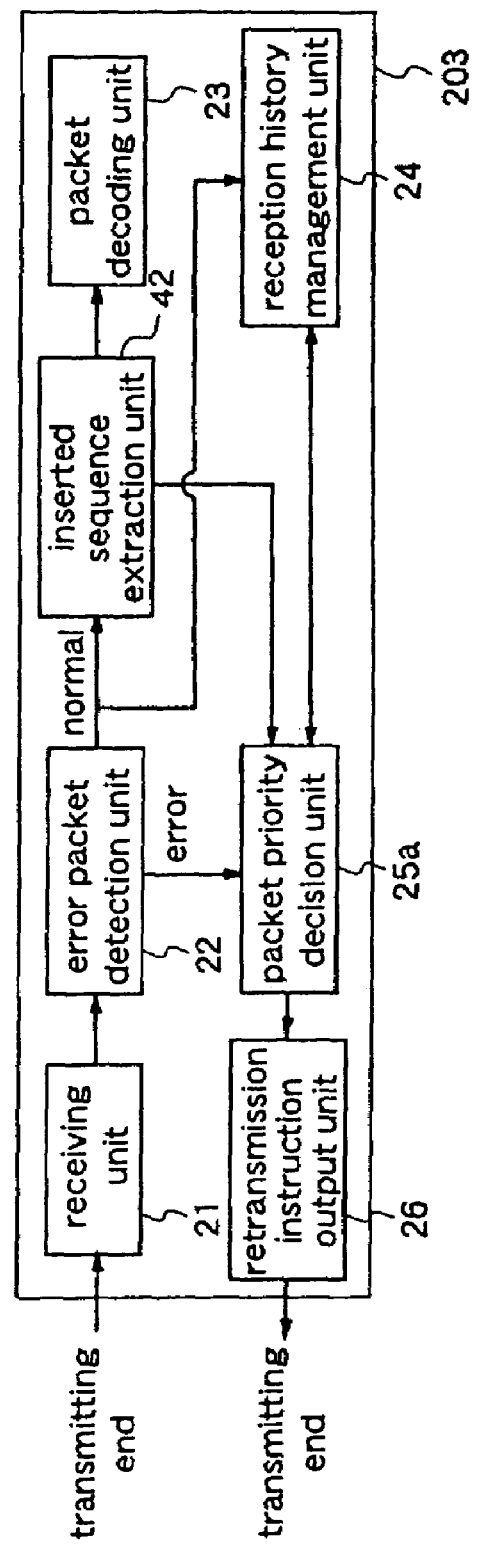
FIG. 8 is a block diagram illustrating a data receiving apparatus (receiving terminal) in the data transmission system according to the modification of the third embodiment.

FIG. 8 is a block diagram illustrating a data receiving apparatus 203 in the data transmission system which performs the real-time data transmission by using the data transmission method according to the modification of the third embodiment.

The data receiving apparatus 203 according to the modification of the third embodiment includes an inserted sequence extraction unit 42, in addition to the constituents of the data receiving apparatus 201 of the first embodiment. The inserted sequence extraction unit 42 extracts, from a normal packet output from the error packet detection unit 22, the sequence number of a high priority packet which has been received in advance of the normal packet. The normal packet is output to the packet decoding unit 23 through the inserted sequence extraction unit 42. Further, in the data receiving apparatus 203, the packet priority decision unit 25a outputs a retransmission request to the retransmission instruction output unit 26 when the packet of the sequence number extracted by the inserted sequence extraction unit 42 is an error packet. Other constituents of the data receiving unit 203 are identical to those of the data receiving apparatus 201 of the first embodiment.

Next, the function and effect will be described.

Figure 9:
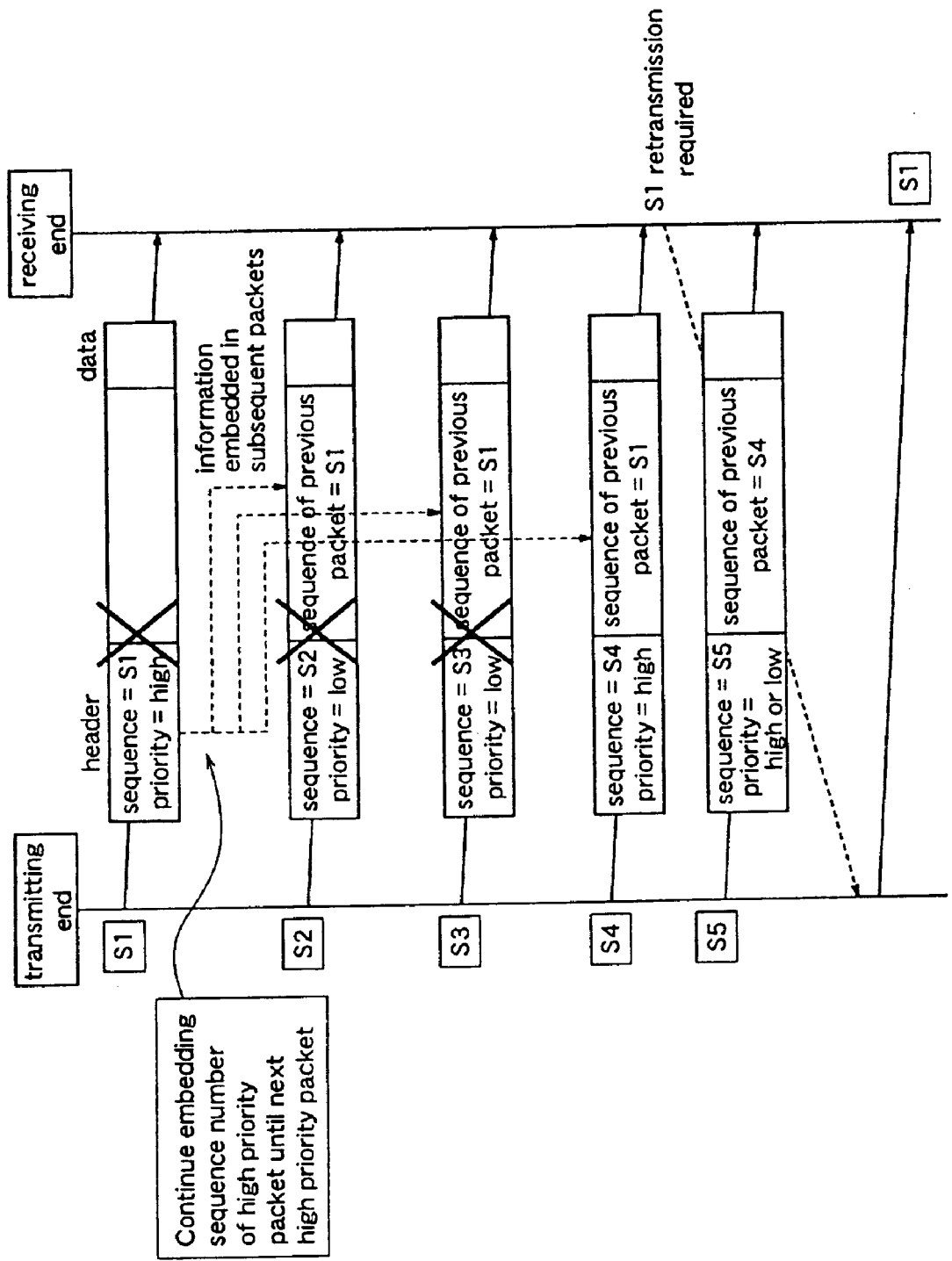
FIG. 9 is a sequence diagram for explaining packet selective retransmission control in a data transmission method according to the modification of the third embodiment.

FIG. 9 is a sequence diagram for explaining packet selective retransmission control in the data transmission method according to the modification of the third embodiment.

In the data transmission apparatus (transmitting end) 103, in addition to the transmission operation of the data transmission apparatus 101 according to the first embodiment, the process of embedding the sequence number of a high priority packet to be transmitted in the subsequent packets is carried out until the next high priority is transmitted.

For example, assuming that the priorities equal to or higher than a predetermined value are high priorities while the priorities lower than the predetermined value are low priorities, as shown in FIG. 9, after a high priority packet (S1) of sequence number S1 has been transmitted, subsequent packets (S2)–(S4) of sequence numbers S2–S4 are transmitted after the sequence number S1 of the previous high priority packet (S1) is embedded therein, and then a high priority packet (S5) of sequence number S5 is transmitted after the sequence number S4 of the previous high priority packet (S4) is embedded therein.

When an error occurs while the high priority packet (S1) and the subsequent low priority packets (S2) and (S3) are transmitted and so only the high priority packet (S4) is normally received, a retransmission request for the first high priority packet S1 is made when the next high priority packet (S4) is received.

Further, in the data receiving apparatus (receiving end) 203, in addition to the receiving operation of the data receiving apparatus 201 of the first embodiment, the following retransmission is performed. That is, when the sequence number embedded in the received packet is extracted, if the packet corresponding to this sequence number is an error packet, a packet retransmission request is sent to the transmitting end by using the sequence number of this packet.

In the data transmission method according to the modification of the third embodiment, at the transmitting end, the process of embedding the sequence number of a high priority packet, the priority of which is equal to or higher than a predetermined value, into the subsequent packets which follow this high priority packet, is continued until a high priority packet next to the high priority packet is transmitted. At the receiving end, the sequence number of another packet (high priority packet) embedded in the received packet is extracted. When this packet (another packet) is an error packet, a retransmission request for this packet is made by indicating the sequence number of: this packet. Therefore, even when two successive packets become error packets, the sequence number of the high priority packet which has become an error packet can be detected from the header information of the subsequent packet which is transmitted without a transmission error, whereby a retransmission request for the high priority error packet can be made with higher reliability.

In the third embodiment, the sequence number and priority information of each packet are embedded in the header of a packet to be transmitted next to this packet, and in the modification of the third embodiment, the sequence number of a high priority packet to be transmitted is embedded in the subsequent plural packets until the next high priority packet is transmitted. However, the information to be embedded in the subsequent packet is not restricted thereto. For example, the number of retransmission times may be embedded in the subsequent packet together with the sequence number.

In this case, at the transmitting end, information relating to the number of retransmission times is embedded in each packet together with the sequence number. At the receiving end, when making a retransmission request for an error packet, the number of retransmission times and the sequence number corresponding to the error packet are paired and indicated to the transmitting end. At the transmitting end, a selective retransmission process is performed as follows. That is, retransmission of the error packet for which the retransmission request has been made is performed when the data of the packet having the sequence number indicated by the retransmission request from the receiving end is stored in the retransmission buffer and there is matching in the number of retransmission times between the packet for which the retransmission request is made and the packet which is stored in the buffer and has the identical sequence number. Then, the number of retransmission times of the retransmitted packet in the retransmission buffer is incremented.

Hereinafter, a specific construction for embedding the number of retransmission times (hereinafter also referred to as retransmission count) in the subsequent packets will be described as a fourth embodiment of the invention.

Embodiment 4

FIGS. 10–15 are diagrams for explaining a data transmission method according to a fourth embodiment of the present invention.

Figure 10:
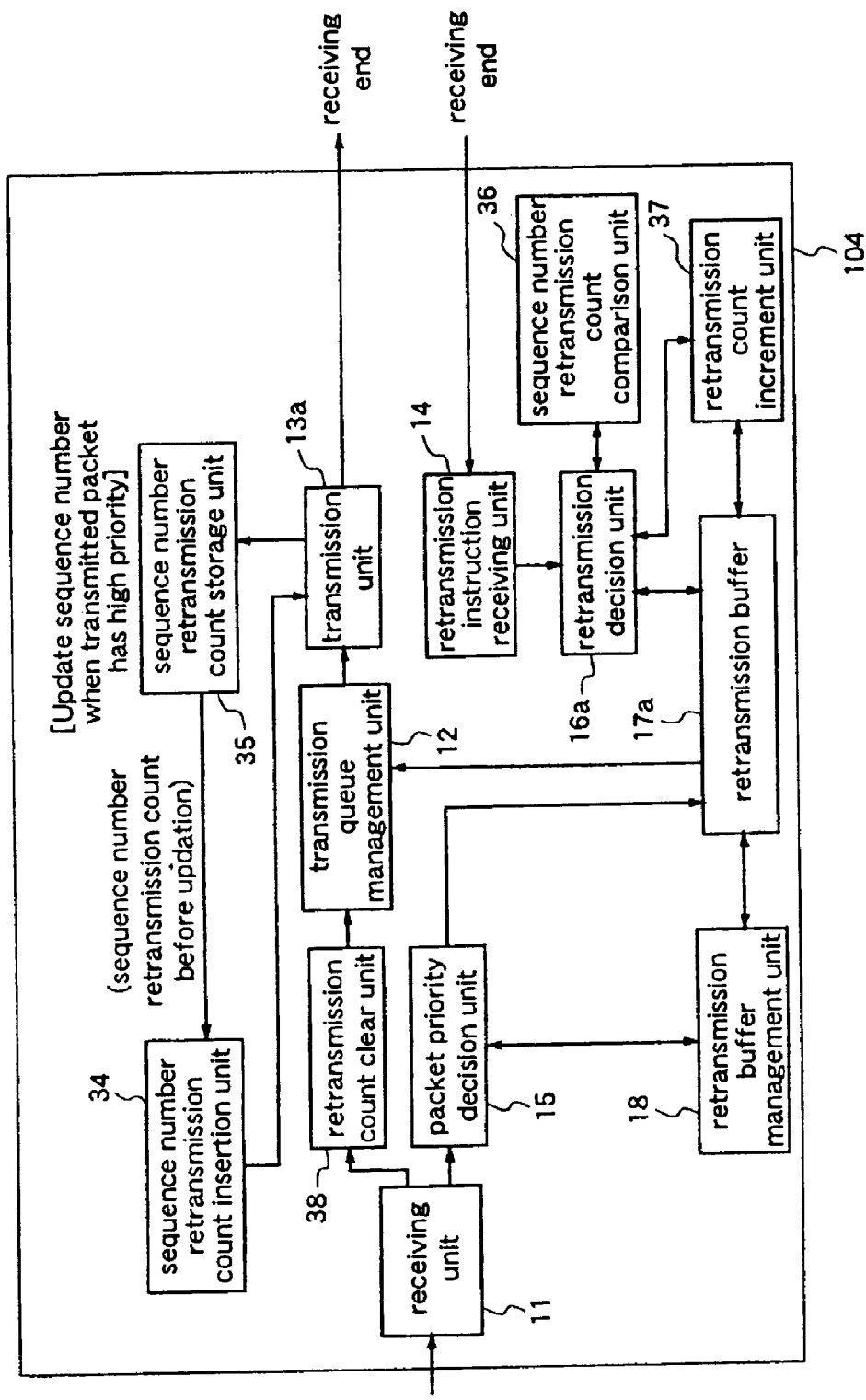
FIG. 10 is a block diagram illustrating a data transmission apparatus (relay server) in a data transmission system according to a fourth embodiment of the present invention.

FIG. 10 is a block diagram illustrating a data transmission apparatus 104 in a data transmission system which performs real-time data transmission by the data transmission method according to the fourth embodiment.

The data transmission apparatus 104 includes a sequence number/retransmission count storage unit 35, a sequence number/retransmission count insertion unit 34, and a retransmission count clear unit 38. The sequence number/retransmission count storage unit 35 stores the sequence numbers and the retransmission counts of the packets whose priorities are equal to or higher than a predetermined value, amongst the packets transmitted by the transmission unit 13a. The sequence number/retransmission count insertion unit 34 outputs the sequence number and the retransmission count which are stored in the storage unit 35, to the transmission unit 13a, such that these data are inserted in the header of the packet to be transmitted. The retransmission count clear unit 38 subjects the packet received at the receiving unit 11 to a process of clearing the retransmission count, and outputs the packet to the transmission queue management unit 12. Further, the transmission unit 13a of this fourth embodiment is different in function from the transmission unit 13 of the first embodiment only in that the transmission unit 13a inserts the sequence number and the retransmission count supplied from the sequence number/retransmission count insertion unit 34 into the header of the packet supplied from the transmission queue management unit 12 and then transmits this packet.

The data transmission apparatus 104 further includes a sequence number/retransmission count comparison unit 36 which receives the retransmission-instruction received by the retransmission instruction receiving unit 14 (i.e., the sequence number and retransmission count of the packet to be retransmitted) through the reproduction decision unit 16a, and compares the sequence number of the packet for which the retransmission request has been made with the sequence numbers of the packets stored in the retransmission buffer 17. Further, the sequence number/retransmission count comparison unit 36 compares the retransmission count of the packet for which the retransmission request has been made with the retransmission count of the packet which is stored in the retransmission buffer 17 and has the sequence number indicated by the retransmission request.

In the data transmission apparatus 104, the retransmission decision unit 16a decides retransmission of packets as follows, in accordance with the output from the comparison unit 36. To be specific, when the sequence number of the rearmost packet which has been received most recently is larger than the sequence number of the error packet, it is decided that selective retransmission should be performed on the error packet. On the other hand, when the sequence number of the rearmost packet is smaller than the sequence number of the error packet, it is decided that selective retransmission should be performed on a packet having a sequence number which is larger than the sequence number of the rearmost packet and equal to or smaller than the sequence number of the error packet. Further, the retransmission buffer 17a outputs the packet to be retransmitted, to the transmission queue management unit 12, in accordance with the result of the decision in the retransmission propriety decision unit 16a.

In FIG. 10, the sequence number/retransmission count increment unit increments the retransmission count (number of retransmission times) of the packet in the retransmission buffer 17a, which packet is decided to be retransmitted by the retransmission decision unit 16a.

Other constituents of the data transmission apparatus 104 are identical to those of the data transmission apparatus of the first embodiment.

Figure 11:
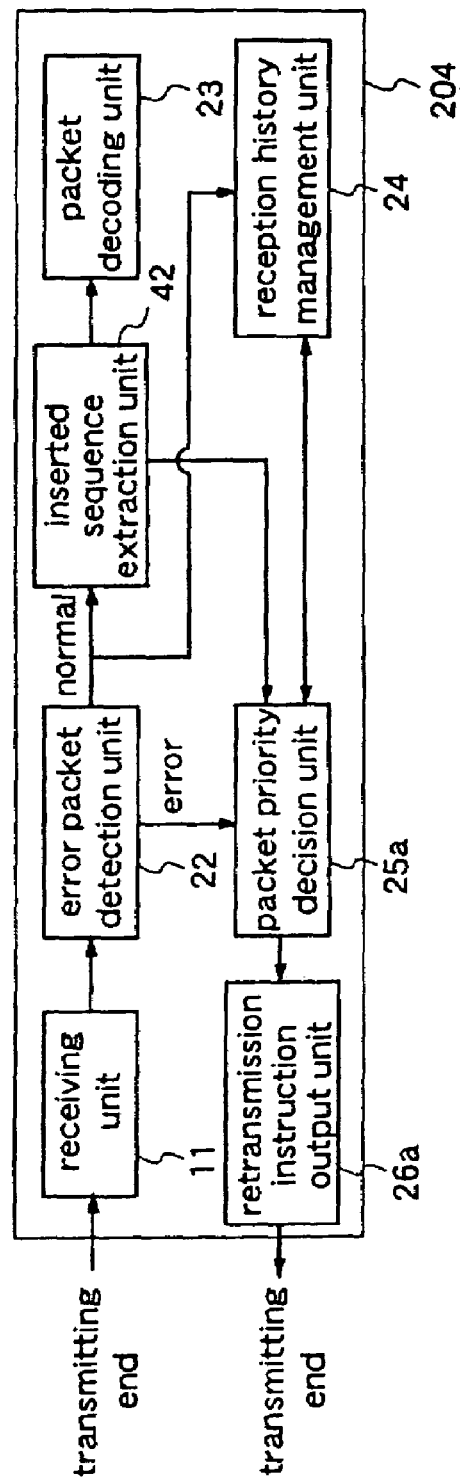
FIG. 11 is a block diagram illustrating a data receiving apparatus (receiving terminal) in the data transmission system according to the fourth embodiment.

FIG. 11 is a block diagram illustrating a data receiving apparatus 204 in the data transmission system which performs the real-time data transmission according to the data transmission method of the fourth embodiment.

The data receiving unit 204 of this fourth embodiment includes a retransmission instruction output unit 26a, instead of the retransmission instruction output unit 26 of the data receiving apparatus 203 according to the modification of the third embodiment. The retransmission instruction output unit 206a outputs a retransmission instruction which requests retransmission of a packet, by using information in which the sequence number and retransmission count of this packet are paired.

Other constituents of the data receiving apparatus 204 are identical to those of the data receiving apparatus 203 according to the modification of the third embodiment.

Next, the function and effect will be described.

Figure 12:
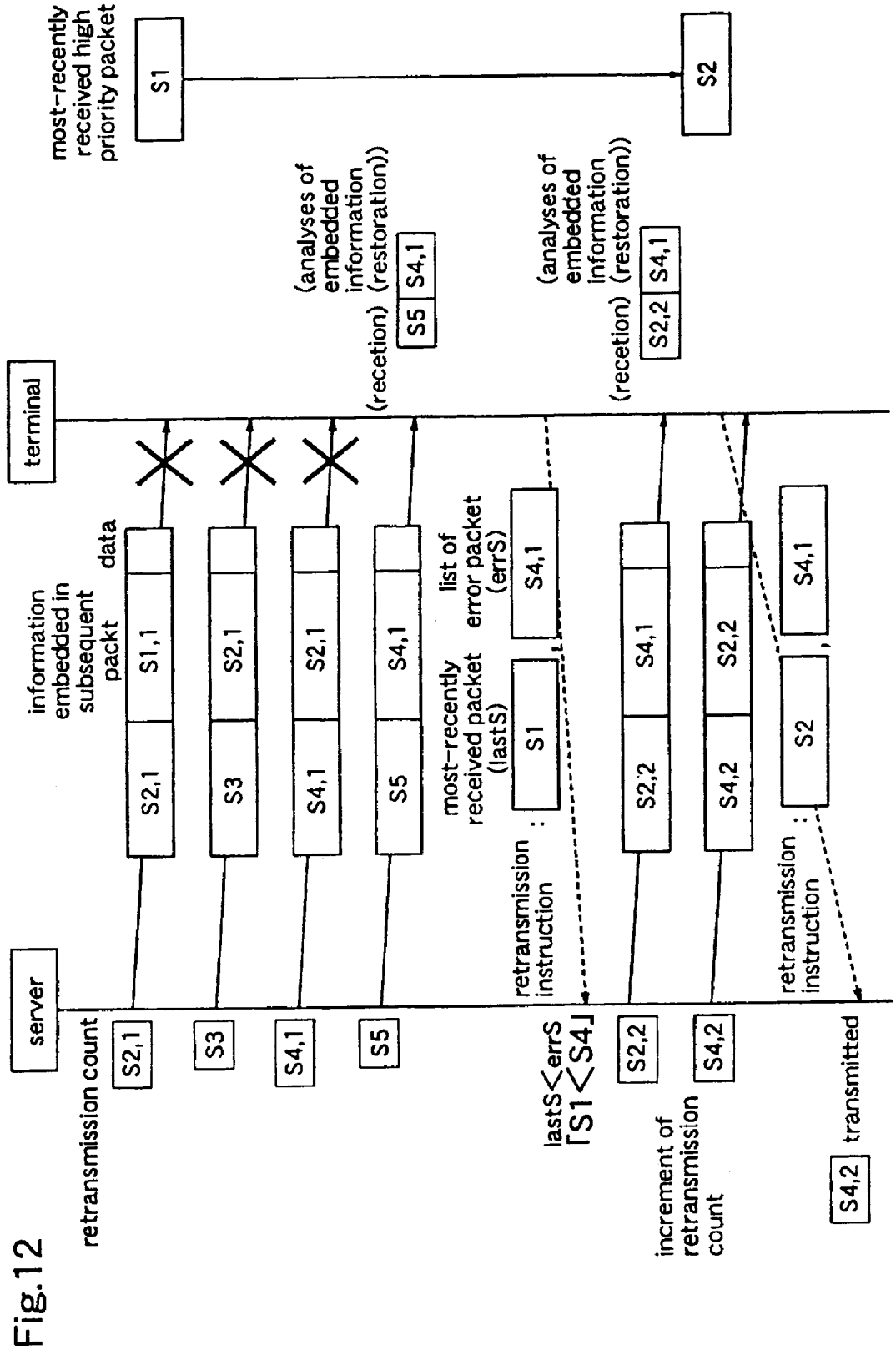
FIG. 12 is a sequence diagram for explaining a first example of packet selective retransmission control in a data transmission method according to the fourth embodiment.

FIG. 12 a sequence diagram for explaining packet selective retransmission control in the data transmission method of the fourth embodiment, illustrating a first example of data exchange between the transmitting end and the receiving end.

In the state shown in FIG. 12, the high priority packet of sequence number S1 has already been received normally at the receiving end. Hereinafter, a packet having a sequence number Sn and retransmission count N is represented as a packet (Sn,N): [n,N: natural numbers]. In the figure, packets of sequence numbers S1, S2, and S4 are high priority packets, and packets of sequence numbers, S3 and S5 are packets other than the high priority packets. In this fourth embodiment, only the additional information of the above-mentioned high priority packets are embedded in the subsequent packets.

Initially, as shown in FIG. 12, at a predetermined transmission timing, the high priority packet (S2,1) subsequent to the high priority packet (S1) is retransmitted. At this time, in the header of the packet (S2,1), the sequence number S1 and retransmission count of the high priority packet (S1) are embedded as well as its sequence number S2 and retransmission count 1.

At the next transmission timing, the packet (S3) subsequent to the high priority packet (S2,1) is transmitted having, in its header, the sequence number S2 and retransmission count 1 of the high priority packet (S2,1) as well as its sequence number S3.

At the next transmission timing, the next high priority packet (S4,1) is retransmitted, having, in its header, the sequence number S2 and retransmission count 1 of the high priority packet (S2,1) as well as its sequence number S4 and retransmission count 1.

At the next transmission timing, the next packet (S5) is transmitted, having, in its header, the sequence number S4 and retransmission count 1 of the high priority packet (S4, 1) as well as its sequence number S5.

In the above-described four times of packet transmission, transmission error has occurred during the first to third packet transmission and, therefore, the packets (S2,1), (S3), and (S4) are not received at the receiving end while only the packet (S5 is received.

In this state, at the transmitting end, it is known that the high priority packet which has been received most recently is the packet having the sequence number S1, and the error packet is the packet having the sequence number S4 and the retransmission count 1, but it is not known what kinds of packets have been transmitted between the high priority packet (S1) and the packet (S5).

So, the receiving end sends a retransmission request for the high priority packet (S4,1), together with the sequence number of the most-recently received high priority packet as well as the sequence number S4 and retransmission count 1 of this packet (S4,1).

Then, at the transmitting end, the sequence number S1 of most recently received high priority packet is compared with the sequence number S4 of the error packet for which the retransmission request has been made. In this case, since the sequence number of the most-recently received high priority packet is smaller than the sequence number of the error packet, the transmitting end performs selective retransmission for those packets having sequence numbers larger than the sequence number S1 and equal to or smaller than the sequence number S4.

In this case, the high priority packet (S2,2) is transmitted having, in its header, the sequence number S4 and retransmission count 1 of the high priority packet (S4,1) and, subsequently, the high priority packet (S4,2) is transmitted, having in its header the sequence number S2 and retransmission count 2 of the high priority packet (S2,2).

On receipt of the high priority packet (S2,2), the receiving end sends a retransmission request for the high priority packet (S4,1) toward the transmitting end, together with the sequence number S2 of the most-recently received high priority packet (S2,2) as well as the sequence number S4 and retransmission count 1 of this packet (S4,1). However, with respect to the high priority packet (S4), since the second retransmission has already been done, no retransmission is performed in response to the retransmission request for the high priority packet (S4,1).

Next, another example of data exchange will be described by using a sequence diagram of FIG. 13.

Figure 13:
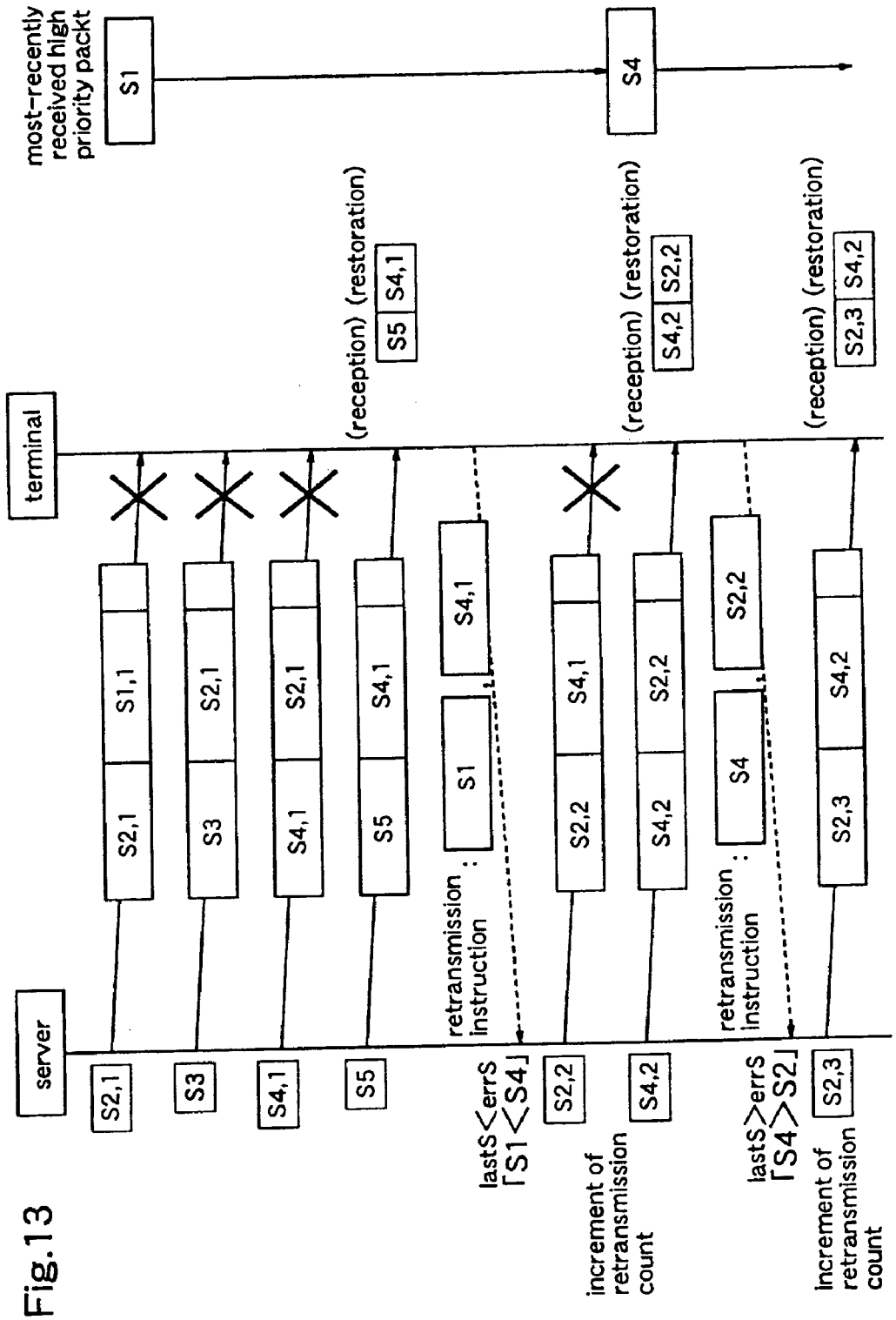
FIG. 13 is a sequence diagram for explaining a second example of packet selective retransmission control in the data transmission method according to the fourth embodiment.

In the case shown in FIG. 13, data exchange from transmission of the high priority packet (S2,1) to transmission of the high priority packet (S2,2) is identical to that describe with respect to FIG. 12.

In the case shown in FIG. 13, transmission of the high priority packet (S2,2) is error transmission, and the next high priority packet (S4,2) is normally received.

In this case, at the receiving end, it is known that the high priority packet which has been received most recently has the sequence number S4, and the error packet has the sequence number S2 and the retransmission count 2.

So, the receiving end sends a retransmission request for the high priority packet (S2,2), together with the sequence number S4 of the most recently received high priority packet as well as the sequence number S2 and retransmission count 2 of this packet (S2,2).

Then, at the transmitting end, the sequence number S4 of the most-recently received high priority packet is compared with the sequence number S2 of the error packet for which the retransmission request has been made. In this case, since the sequence number S4 of the most recently received high priority packet is larger than the sequence number S2 of the error packets the transmitting end performs selective retransmission for only the error packet.

That is, the high priority packet (S2,3) is transmitted, having, in its header, the sequence number S4 and retransmission count 2 of the high priority packet (S4,2).

Next, still another example of data exchange will be described by using a sequence diagram of FIG. 14.

Figure 14:
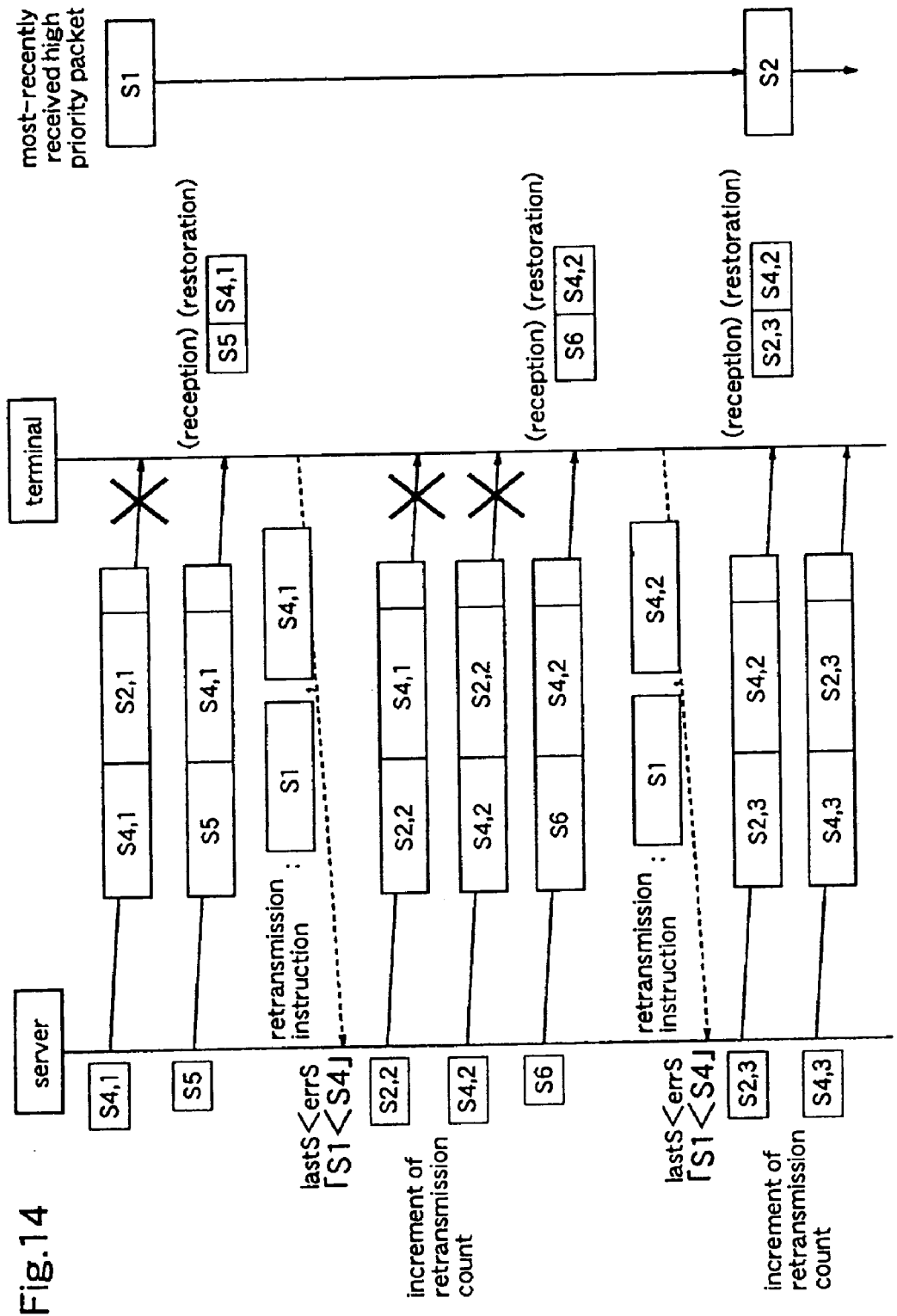
FIG. 14 is a sequence diagram for explaining a third example of packet selective retransmission control in the data transmission method according to the fourth embodiment.

Initially, as shown in FIG. 14, at a predetermined transmission timing, the high priority packet (S4,1) is retransmitted, having, in its header, the, sequence number S2 and retransmission count 1 of the high priority packet (S2,1) which has been transmitted in advance of this packet, as well as the sequence number S4 and retransmission count 1 of this packet.

At the next transmission timing, the next packet (S5) is transmitted, having, in its header, the sequence number 54 and retransmission count 1 of the high priority packet (S4,1) as well as the sequence number S5 of this packet.

In this example, a transmission error has occurred during the first packet transmission, and so the packet (S4,1) has not been received at the receiving end while only the packet (S5) has been received.

In this state, at the receiving end, it is known that the most-recently received, high priority packet has the sequence number S1, and the error packet has the sequence number S4 and the retransmission count 1.

So, the receiving end sends a retransmission request for the high priority packet (S4,1), together with the sequence number S1 of the most-recently received high priority packet as well as the sequence number S4 and retransmission count 1 of this packet.

Then, at the transmitting end, the sequence number S1 of the most-recently received high priority packet is compared with the sequence number S4 of the error packet for which the retransmission request has been made. In this case, since the sequence number S1 of the most-recently received high priority packet is smaller than the sequence number S4 of the error packet the transmitting end performs selective retransmission for those packets having sequence numbers larger than the sequence number S1 and equal to or smaller than the sequence number S4.

In this cease, the high priority packet (S2,2) is transmitted having, in its header; the sequence number S4 and retransmission count 1 of the high priority packet (S4,1) as well as the sequence number S2 and retransmission count Z of this packet (S2,2) and, subsequently, the high priority packet (S4,2) is transmitted, having, in its header, the sequence number S2 and retransmission count 2 of the high priority packet (S2,2) as well as the sequence number S4 and transmission count 2 of this packet. Thereafter, the packet of sequence number S6 is transmitted having, in its packet, the sequence number S4 and retransmission count 2 of the high priority packet (S4,2) as well as the sequence number S6 of this packet.

Since errors have occurred during transmission of the high priority packets (S2,2) and (S4,2), these packets are not received at the receiving end, and only the packet (S6) is received.

In this state, at the receiving end, it is known that the most-recently received high priority packet has the sequence number S1, and the error packet has the sequence number S4 and the retransmission count 2.

So, the receiving end sends a retransmission request for the high priority packet (S4,2), together with the sequence number S1 of the most-recently received high priority packet as well as the sequence number S4 and retransmission count 2 of this packet.

Then, at the transmitting end, the sequence number S1 of the most-recently received; high priority packet is compared with the sequence number S4 of the error packet for which the retransmission request has been made. In this case, since the sequence number S1 of the most-recently received high priority packet is smaller than the sequence number 54 of the error packet the transmitting end performs selective retransmission for those packets having sequence numbers which are larger than the sequence number S1 and equal to or smaller than the sequence number S4.

That is, the high priority packet (S2,3) is transmitted, having, in its header, the sequence number S4 and retransmission count 2 of the high priority packet (S4,2) as well as the sequence number S2 and retransmission count 3 of this packet and, subsequently, the high priority packet (S4,3) is transmitted, having, in its header, the sequence number S2 and retransmission count 3 of the high priority packet (S2,3) as well as the sequence number S4 and retransmission count 3 of this packet.

As described above, according to the fourth embodiment, when the sequence number of the most-recently received high priority packet is larger than the sequence number of the error packet, the transmitting end retransmits only the error packet. Therefore, retransmission of the error packet can be performed efficiently.

In this fourth embodiment, emphasis has been placed on the case where one data receiving apparatus is provided for one data transmission apparatus. However, the selective retransmission process of this fourth embodiment can be applied to multicast having a plurality of data receiving apparatuses for one data transmission apparatus. Hereinafter, a selective retransmission process applicable to multicast will be described as a modification of the fourth embodiment.

Modification of Embodiment 4

Figure 15:
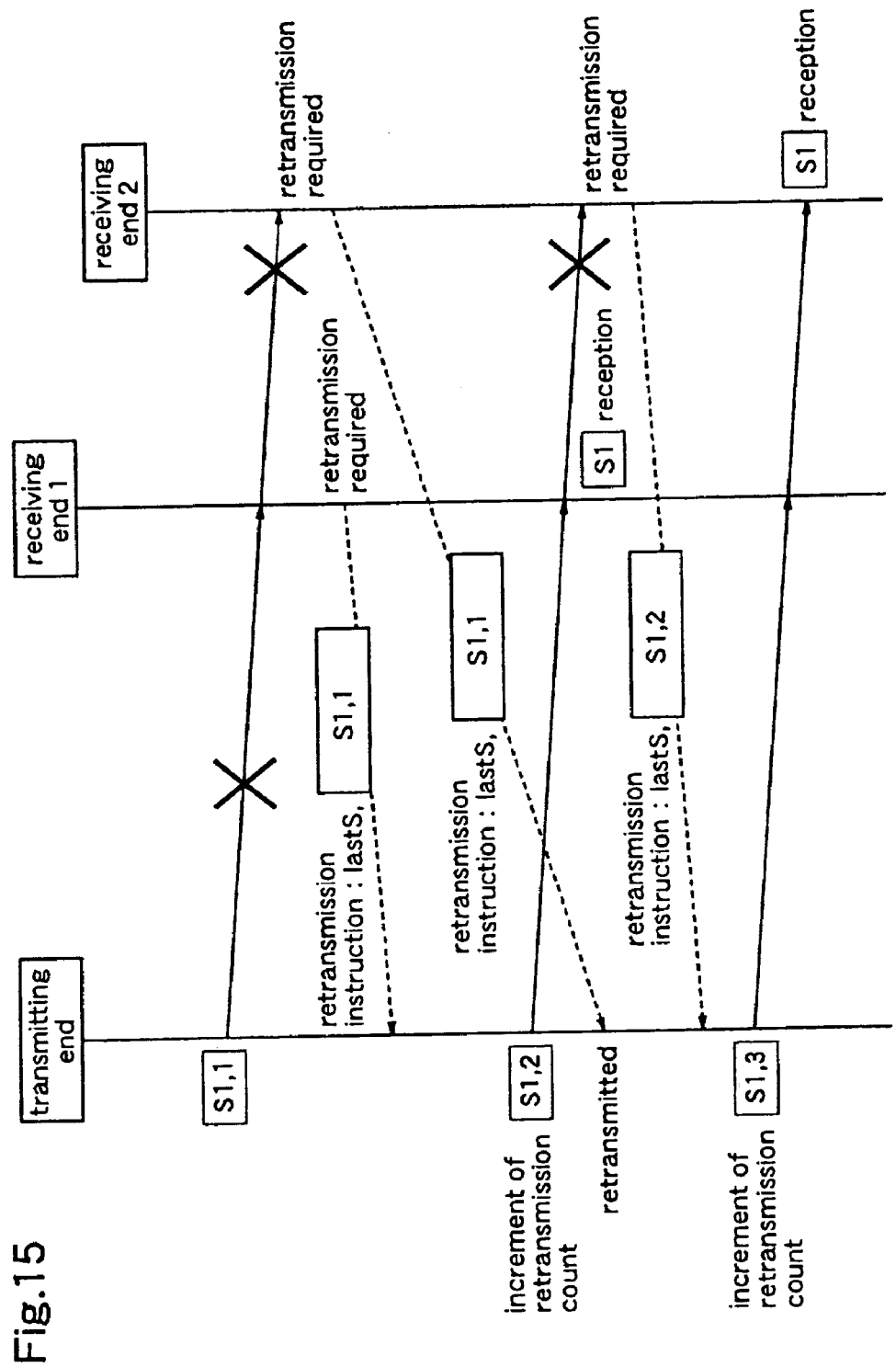
FIG. 15 is a sequence diagram for explaining a fourth example of packet selective retransmission control in a data transmission method according to a modification of the fourth embodiment.

FIG. 15 is a sequence diagram for explaining a data transmission method according to a modification of the fourth embodiment, illustrating an example of selective retransmission in the case where a plurality of data receiving apparatuses are provided for one data transmission apparatus.

Initially, as shown in FIG. 15, at a predetermined transmission timing, the high priority packet (S1,1) is transmitted, having, in its header, the sequence number and retransmission count of a previous high priority packet as well as the sequence number S1 and retransmission count 1 of this packet. In this case, there are two receiving ends for the transmitting end, i.e., the receiving end 1 and the receiving end 2, and transmission of the high priority packet (S1,1) is error transmission.

In this case, each receiving end sends a retransmission request for the high priority packet (S1,1), together with the sequence number (lastS) of the most-recently received high priority packet.

In response to the retransmission request from the receiving end 1, the transmitting end retransmits the high priority packet (S1,2). However, after this retransmission, the transmitting end does not perform retransmission in response to the retransmission request from the receiving end 2, because the high priority packet (S1,2) has already been retransmitted in response to the retransmission request from the receiving end 2.

As the result of the retransmission of the high priority packet (S1,2), the receiving end 1 receives the high priority packet (S1) while the receiving end 2 does not receive the high priority packet (S1).

In this case, the receiving end 2 outputs a retransmission request for the high priority packet (S1,2). In response to this request, the transmitting end increments the retransmission count and retransmits the high priority packet (S1,3).

In the fourth embodiment and the modification thereof, an upper limit may be set for the retransmission count. Further, the upper limit of the retransmission count may be changed according to the priority value of the packet.

Embodiment 5

Figure 16:
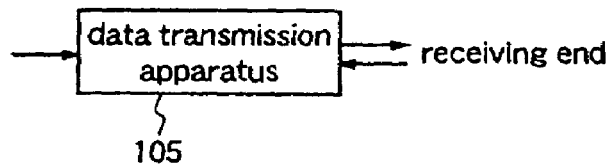
FIGS. 16(a) and 16(b) are block diagrams for explaining a data transmission apparatus as a relay server and a data receiving apparatus as a receiving terminal, respectively, in a data transmission system according to a fifth embodiment of the present invention.
Figure 16:
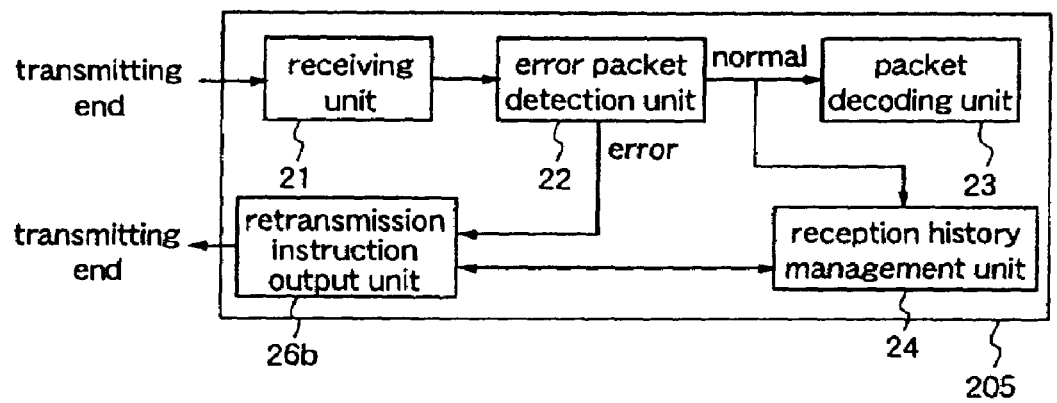
Figure 17:
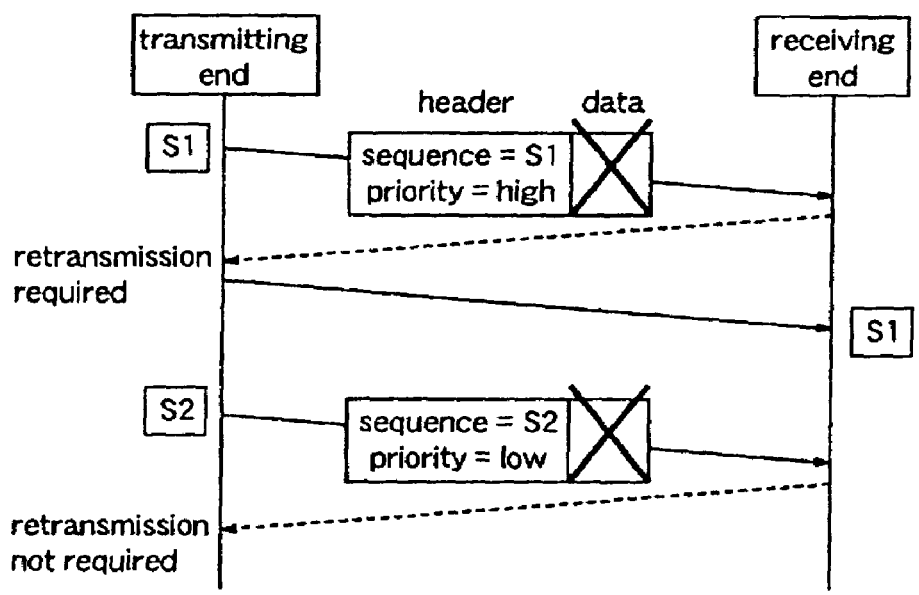
FIG. 17 is a sequence diagram for explaining packet selective retransmission control in a data transmission method according to the fifth embodiment.

FIGS. 16 and 17 are diagrams for explaining a data transmission method according to a fifth embodiment of the present invention.

According to the data transmission method of this fifth embodiment, in the data transmission method of the first embodiment absence of a sequence number is detected at the receiving end, and a retransmission request for a packet having the absent sequence number is made by using this sequence number. At the transmitting end, when the packet of the sequence number for which the retransmission request has been output from the receiving end is stored in the retransmission buffer 17, retransmission of this packet is performed. At the transmitting end, only high priority packets are stored in the retransmission buffer 17.

FIGS. 16(*a*) and 16(*b*) are block diagrams illustrating a data transmission apparatus 105 and a data, receiving apparatus 205, respectively, in a data transmission system which performs real-time data transmission by the data transmission method of this fifth embodiment.

The data transmission apparatus 105 is identical in structure to the data transmission apparatus 101 of the first embodiment. The data receiving apparatus 205 includes a receiving unit 21, an error packet detection unit 22, a packet decoding unit 23, and a reception history management unit 24, like the data receiving apparatus 201 of the first embodiment. The receiving unit 21 receives packets transmitted from a relay server (data transmission apparatus at the transmitting end). The error packet detection unit 22 detects an error packet in which an error has occurred during transmission, in accordance with the output from the receiving unit 21, and outputs a normal packet which has been transmitted without a transmission error. The packet decoding unit 23 receives the normal packet to decode coded data of the normal packet. The reception history management unit 24 manages the reception history of packets.

The data receiving apparatus 205 of this fifth embodiment has a retransmission instruction output unit 26*b* which outputs a retransmission request for a packet corresponding to the absent sequence number detected by the error packet detection unit 22, instead of the retransmission instruction output unit 26 of the data receiving apparatus 201 of the first embodiment.

Next, the function and effect will be described.

FIG. 17 is a sequence diagram for explaining packet selective retransmission control in the data transmission method of this fifth embodiment.

When a high priority packet (S1) of sequence number S1, which has been output from the data transmission apparatus (transmitting end) 105; is not received by the data receiving apparatus (receiving end) 205 due to a transmission error, in the data receiving apparatus 205; the error packet detection unit 22 detects that the sequence number S1 is absent, and a retransmission request for the packet of this sequence number S1 is output to the transmitting end.

At the transmitting end, it is decided whether the packet of the retransmission request is stored in the retransmission buffer 17 or not. In this case, since the packet of the retransmission request is a high priority packet, it is stored in the retransmission buffer 17. Therefore, the transmitting end performs retransmission of this packet.

Further, when a packet (S2) of sequence number S2, which has been output from the data transmission apparatus (transmitting end) 105, is not received by the data receiving apparatus (receiving end) 205 due to a transmission error, in the data receiving apparatus 205, the error packet detection unit 22, detects that the sequence number S2 is absent, and a retransmission request, for the packet of this sequence number S2 is output to the transmitting end.

At the transmitting end, it is decided whether the packet of the retransmission request is stored in the retransmission buffer 17 or not. In this case, since the packet of the retransmission request is not a high priority packet, it is not stored in the retransmission buffer 17. Therefore, the transmitting end does not perform retransmission of this packet.

As described above, according to the fifth embodiment of the invention, the receiving end detects the absence of sequence number, and instructs the transmitting end to retransmit the packet of the absent sequence number by using this sequence number. Then, the transmitting end retransmits the packet of the sequence number indicated by the instruction from the receiving end when this packet is stored in the retransmission buffer. Therefore, the transmission quality in the wireless section in real-time transmission can be improved and, furthermore, the number of retransmission times can be reduced.

Embodiment 6

Figure 18:
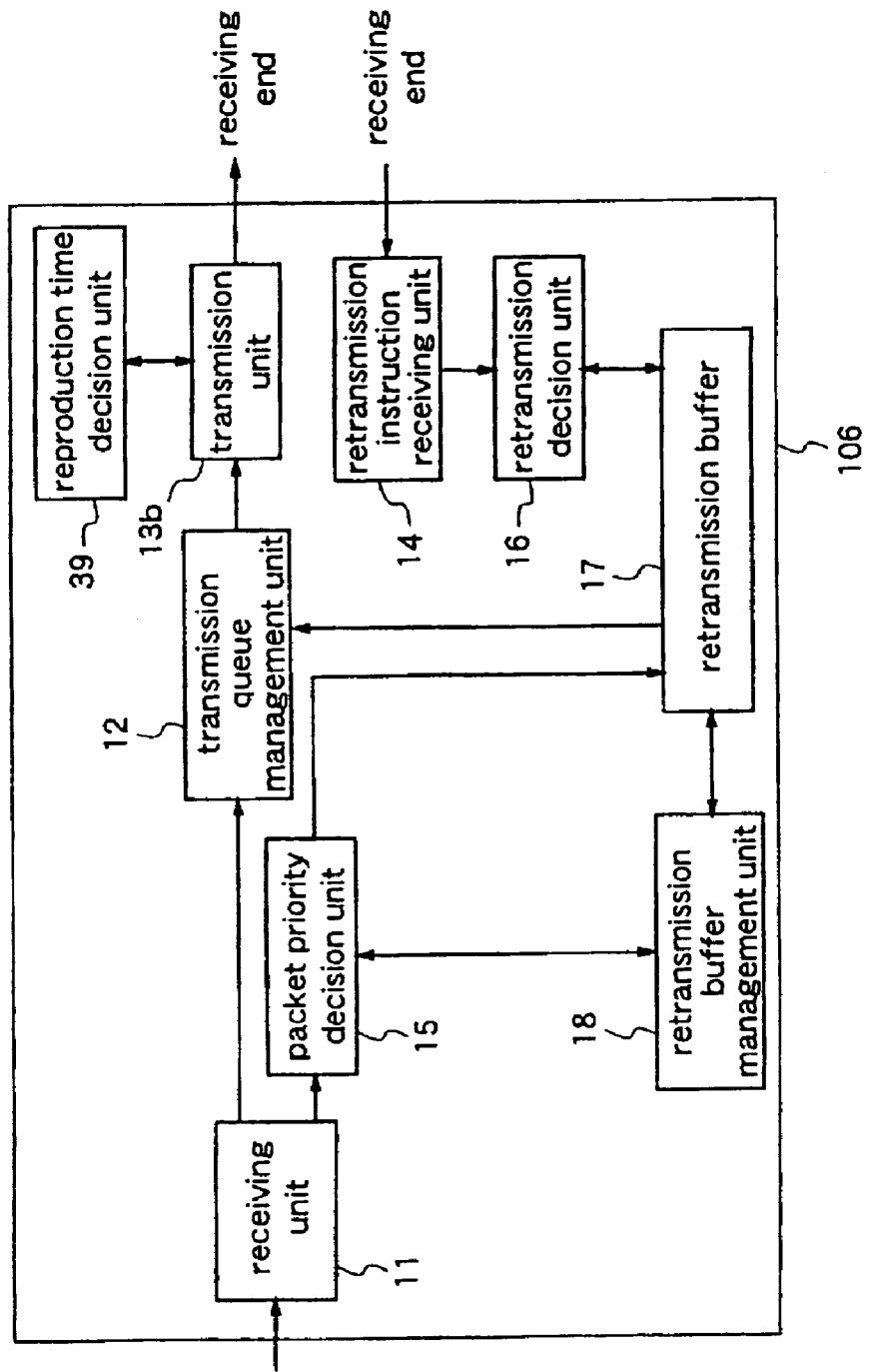
FIG. 18 is a block diagram illustrating a data transmission apparatus (relay server) in a data transmission system according to a sixth embodiment of the present invention.
Figure 19:
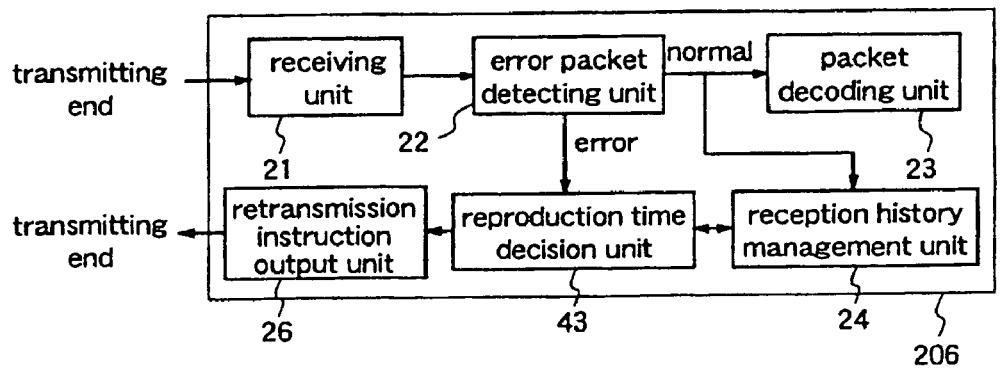
FIG. 19 is a block diagram illustrating a data receiving apparatus (receiving terminal) in the data transmission system according to the sixth embodiment.
Figure 20:
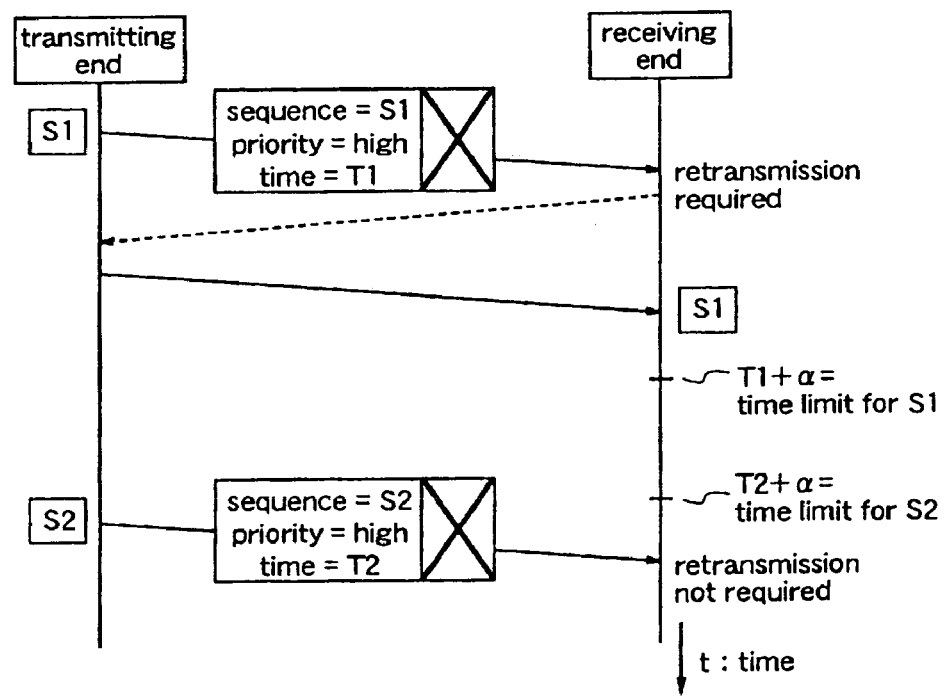
FIG. 20 is a sequence diagram for explaining packet retransmission control with time limit, in the data transmission method according to the sixth embodiment.

FIGS. 18–20 are diagrams for explaining a data transmission method according to a sixth embodiment of the present inventions.

In the data transmission method of this sixth embodiment, data transmission from the transmitting end to the receiving end is continuously performed in units of packets each having additional information relating to its sequence number, priority and data reproduction time and, simultaneously, data in the packets received at the receiving end are successively reproduced. At this time, only the packet which can arrive at the receiving end within the time limit is retransmitted.

FIG. 18 is a block diagram illustrating a data transmission apparatus 106 in a data transmission system which performs real-time data transmission by the data transmission method of this sixth embodiment.

This data transmission apparatus 106 constitutes a relay server (transmitting end) which relays data transmitted between distribution server and a terminal 9 (receiving end). The data transmission apparatus 106 includes a reproduction time decision unit 39, in addition to the constituents of the data transmission apparatus 101 of the first embodiment. The reproduction time decision unit 39 decides a packet which cannot arrive at the receiving end within the reproduction time, amongst the packets to be transmitted. In the transmission unit 13b, the packet decided in the reproduction time decision unit 39 is not transmitted to the receiving end whether it is stored in the retransmission buffer 17 or not.

Other constituents of the data transmission apparatus 106 are identical to those of the data transmission apparatus 101 of the first embodiment.

FIG. 19 is a block diagram illustrating a data receiving apparatus 206 in the data transmission system which performs real-time data transmission according to the data transmission method of the sixth embodiment.

The data receiving apparatus 206 includes a reproduction time decision unit 43, instead of the packet priority decision unit 25 of the data receiving apparatus 201 of the first embodiment. The reproduction time decision unit 43 detects the reproduction time which is given to the error packet detected by the error packet detection unit 22 and the arrival time of the error packet at the receiving end, decides the arrival time limit based on the reproduction time, and decides whether or not the error packet has arrived at the receiving end before the arrival time limit. On the basis of the result of the decision, the retransmission instruction output unit 26 instructs the transmitting end to retransmit the error packet which has arrived at the receiving end before the arrival time limit, by using the sequence number of the packet. The decision of the arrival time limit by the reproduction time decision unit 43 is performed based on at least one of the allowable packet delay time which is decided at the receiving end, and the packet transmission delay time between the transmitting end and the receiving end.

Other constituents of the data receiving apparatus 206 are identical to those of the data receiving apparatus 201 of the first embodiment.

As for the method of deciding the arrival time limit, it will be described in detail as an eighth embodiment of the present invention.

Next, the function and effect will be described.

FIG. 20 is a sequence diagram for explaining packet retransmission control with time limit, in the data transmission method according to this sixth embodiment.

In the data transmission apparatus (transmitting end) 106, each packet to be transmitted is given a reproduction time at the receiving end.

For example, when high priority packets (S1) and (S2) having sequence numbers S1 and S2, which have been transmitted from the data transmission apparatus (transmitting end) 106, are not normally received at the data receiving apparatus (receiving end) 206 due to a transmission error, in the data receiving apparatus 206, the error packet detection unit 22 decides that these high priority packets (S1) and (S2) are error packets. Further, the reproduction time decision unit 43 detects the reproduction times (T1) and (T2) and the arrival times of these error packets, decides the arrival time limits (T1+α) and (T2+α) in accordance with the reproduction times, and decides whether or not these error packets have arrived at the receiving end before the arrival time limits, respectively.

Since the high priority packet (S1) has arrived at the receiving end before the time limit, the receiving end instructs the transmitting end to retransmit this packet.

On the other hand, since the high priority packet (S2) has not arrived at the receiving end before the time limit, the receiving end does not instruct the transmitting end to retransmit this packet.

In the data transmission apparatus 106, when the data of the packet having the sequence number indicated by the retransmission request from the receiving end, is stored in the retransmission buffer, the data of the packet whose transmission time does not pass the reproduction time is retransmitted to the receiving end. On the other hand, as for the data of the packet whose transmission time has passed the reproduction time, this data is discarded without being transmitted, and the data in the retransmission buffer is discarded successively from the packet which cannot arrive at the receiving end within the data reproduction time.

As described above, according to the sixth embodiment of the present invention, data transmission from the transmitting end to the receiving end is continuously performed in units of packets each having additional information relating to its sequence number, priority, and data reproduction time at the receiving end and, simultaneously, data of the packets received at the receiving end are successively reproduced. At this time, only the packets which have arrived at the receiving end within the time limit at the receiving end, are retransmitted to the transmitting end. Therefore, the transmission quality of wireless sections in real-time transmission is improved and, moreover, the number of retransmission times can be reduced.

While in this sixth embodiment emphasis has been placed on the method for recovering errors of data in packets there is a case where additional information added to the packet header (i.e., the sequence number, the reproduction time, etc.) has an error. There are various methods of recovering the additional information as well as, recovering the errors in data. Hereinafter, these methods will be described as modifications of the sixth embodiment.

Modification 1 of Embodiment 6

In a first modification of the sixth embodiment, in addition to the processes at the transmitting end and the receiving end in the data transmission method of the, sixth embodiment, at the transmitting end, error correction codes for the sequence number and the reproduction time are given to the packet to be transmitted. At the receiving end, error correction for the sequence number and the reproduction time is performed by utilizing the error correction codes and, thereafter, error packet retransmission control is performed on the basis of the decided arrival limit time.

In the first modification of the sixth embodiment so constructed, even when the sequence number and the reproduction time of the error packet have errors, these additional information can be corrected.

Modification 2 of Embodiment 6

In a second modification of the sixth embodiment, in addition to the processes at the transmitting end and the receiving end in the data transmission method of the sixth embodiment, at the transmitting end, the sequence number and the reproduction time of a predetermined packet are embedded in a packet to be transmitted next. At the receiving end, the embedded information (i.e., the sequence number and the reproduction time) of the previous packet (the predetermined packet) is extracted when the next packet is received. On the basis of this information, the arrival time limit of the predetermined packet is decided; and retransmission control is performed for the predetermined packet as an error packet.

Figure 21:
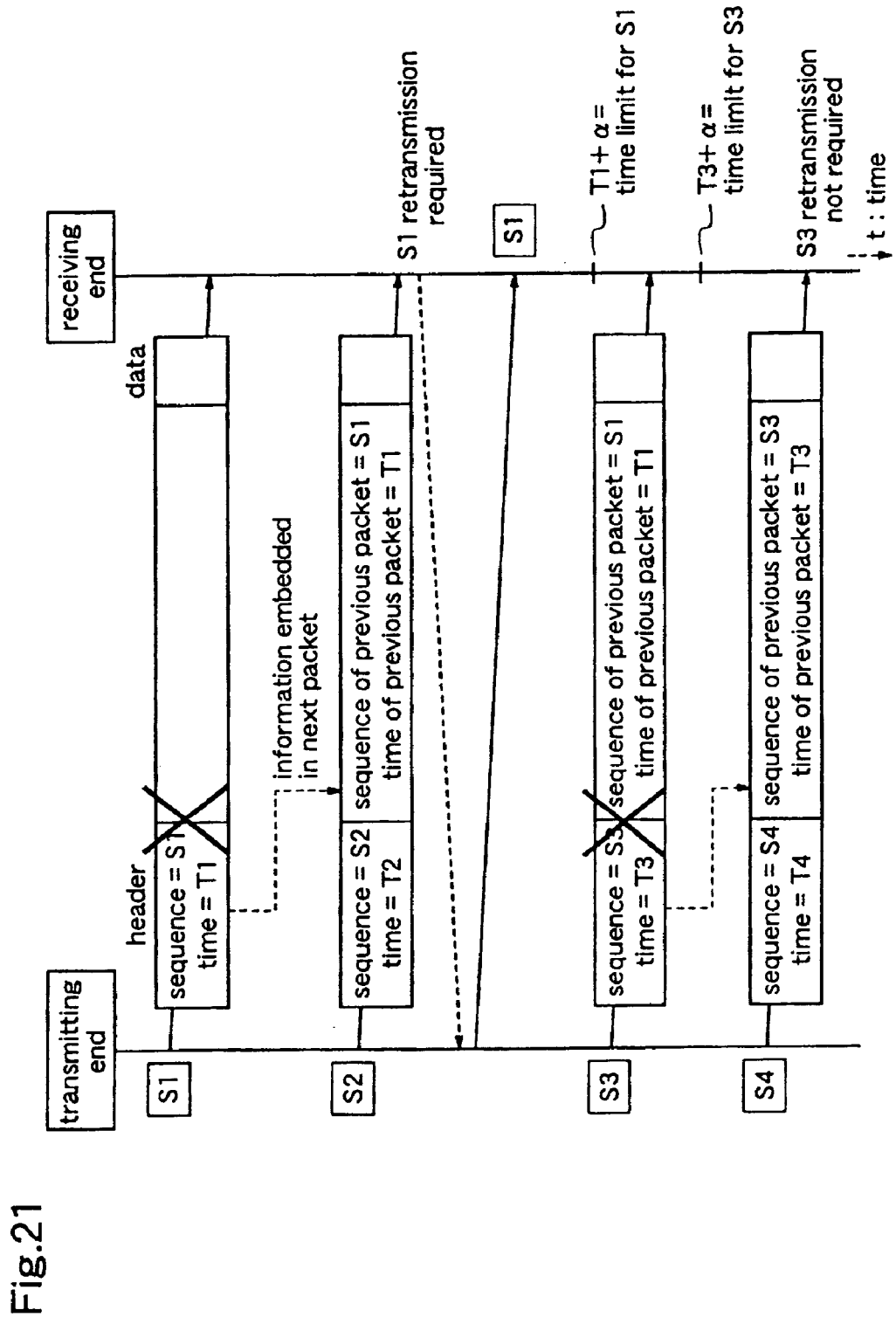
FIG. 21 is a sequence diagram for explaining packet retransmission control with time limit, in a data transmission method according to an modification of the sixth embodiment.

FIG. 21 is a sequence diagram for explaining packet data retransmission control with time limit, in a data communication system according to the second modification of the sixth embodiment.

At the transmitting end, a predetermined packet is given the sequence number and the reproduction time at the receiving end, and the sequence number and the reproduction time of this predetermined packet are also embedded in a next packet which is to be transmitted next to the predetermined packet.

Thereafter, as shown in FIG. 21, packets (S1) and (S2) of sequence numbers S1 and S2 are transmitted from the transmitting end, and the packet (S1) is not normally received at the receiving end due to a transmission error. Even in this case, as long as the packet (S2) is normally received at the receiving end, the receiving end can detect the sequence number S1 and the reproduction time, (T11) of the packet (S1) previous to the packet (S2).

So, at the receiving end, the arrival time limit (T1+a) is decided on the basis of the reproduction time (T1) of the error packet (S1), and it is decided whether or not the receiving end can receive the retransmitted packet within the arrival time limit if a retransmission request is made at this point of time. In this case, there is a possibility that the packet (S1) will arrive at the receiving, end before the time limit if a retransmission request for the packet (S1) is made when receiving the packet (S2) and, therefore, the receiving end sends a retransmission request for the packet (S1) to the transmitting end.

Thereafter, as shown in FIG. 21, packets (S3) and (S4) of sequence numbers S3 and S4 are transmitted from the transmitting end, and the packet (S3) is not normally received at the receiving end due to a transmission error. Even in this case, as long as the packet (4) is normally received at the receiving end, the receiving end can detect the sequence number S3 and the reproduction time (T3) of the packet (S3) previous to the packet (S4).

So, at the receiving end, the arrival time limit (T3+α) is decided on the basis of the reproduction time (T3) of the error packet (S3), and it, is decided whether the packet (S3) has arrived at the receiving end before the time limit or not. In this case, since the packet (S3) has not arrived at the receiving end before the time limit, the receiving end does not instruct the transmitting end to retransmit the packet (S3).

In the second modification of the sixth embodiment so constructed, at the transmitting end, the sequence number and the reproduction time of a predetermined packet are also embedded in a packet to be transmitted next to the predetermined packet. Therefore, even when errors occur in not only the data of the packet but also the sequence number and the reproduction time, the receiving end can make a retransmission request for the error packet. Moreover, since the receiving end does not make a retransmission request for the packet which cannot arrive at the receiving end within the reproduction time at the receiving end, the number of retransmission times can be reduced.

As still another modification, the selective retransmission control according to any of the first to fifth embodiments and their modifications may be combined with the time-limit retransmission control according to any of the sixth embodiment and its modifications.

For example, the second embodiment in which each packet is given error correction codes for its sequence number and priority information may be combined with the first modification of the sixth embodiment in which each packet is given error correction codes for its sequence number and reproduction time (first combination). According to this combination, each packet is given error correction codes for its sequence number, priority information, and reproduction time.

Further, the third embodiment in which the sequence number and the priority information of a predetermined packet are embedded in a packet to be transmitted next to the predetermined packet, may be combined with the second modification of the sixth embodiment in which the sequence number and the reproduction time of a predetermined packet are embedded in a packet to be transmitted next to the predetermined packet (second combination). According to this combination, the sequence number, the priority information, and the reproduction time of the predetermined packet are embedded in the packet to be transmitted next to the predetermined packet.

Further, the modification of the third embodiment in which the process of embedding the sequence number and the priority information of a high priority packet to be transmitted into subsequent packets is continued until a next high priority packet is transmitted, may be combined with the second modification of the sixth embodiment in which the sequence number and the reproduction time of a predetermined packet are embedded in a packet to be transmitted next to the predetermined packet (third combination). According to this combination, the process of embedding the sequence number, the priority information, and the reproduction time of a high priority packet into subsequent, packets is continued until a next high priority packet is transmitted.

Furthermore, according to the combination of the selective retransmission control and the retransmission control with time limit (second or third combination), the quantity of data to be embedded in the packet increases. Therefore, there is proposed a method of embedding a difference between the header information (sequence number, priority information, reproduction time) of a predetermined packet and the header information of a subsequent packet, in the subsequent packet.

Hereinafter, this method will be described as a third, modification of the sixth embodiment.

Modification 3 of Embodiment 6

Figure 22:
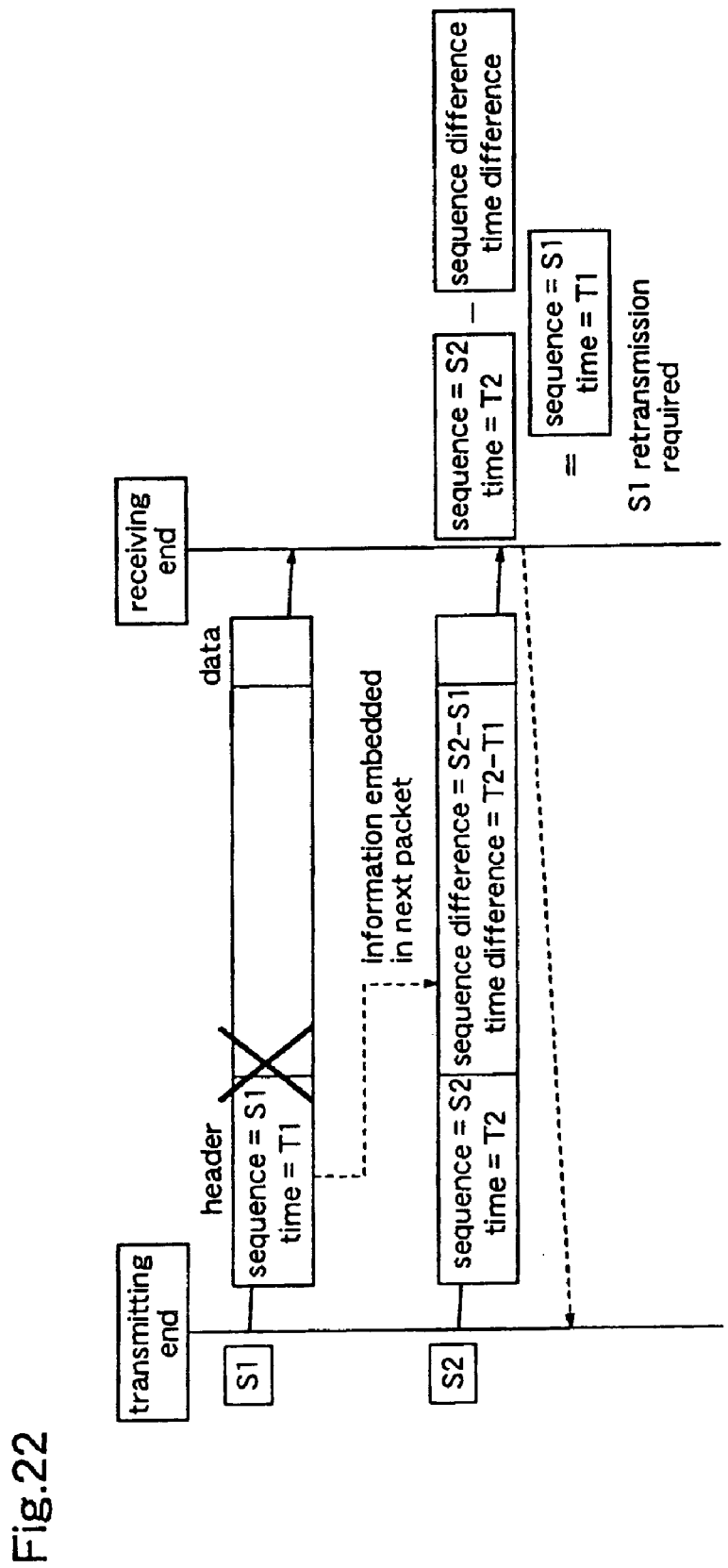
FIG. 22 is a sequence diagram for explaining packet retransmission control with time limit, in a data transmission method according to another modification of the sixth embodiment.

FIG. 22 is a sequence diagram for explaining packet, retransmission control with time limit, in the data transmission method according to a third modification of the sixth embodiment.

At the transmitting end, in a packet to be transmitted next to a predetermined packet, difference information relating to the sequence numbers and thee reproduction time of the predetermined packet which has previously been transmitted is embedded together with the sequence number and the reproduction time of this packet. This difference information is composed of a difference between the sequence number of the predetermined packet and the sequence number of the next packet (sequence difference) and a difference between the reproduction time of the predetermined packet and the reproduction time of the next packet (time difference).

For example, as shown in FIG. 22, packets (S1) and (S2) of sequence numbers S1 and S2 are transmitted from the transmitting end, and the packet (S1) is not normally received at the receiving end due to transmission error. Even in this case, as long as the packet (S2) is normally received at the receiving end, the receiving end can obtain the sequence number S1 and the reproduction time (T1) of the packet (S1) previous td the packet (S2).

That is, the sequence number S1 of the packet (S1) can be obtained by subtracting the sequence difference (S2–S1) from the sequence number S2 of the packet (S2). Further, the reproduction time (T1) of the packet (S1) can be obtained by subtracting the difference time (T2–T1) from the reproduction time (T2) of the packet (S2).

Therefore, at the receiving end, the arrival time limit (T1+α) is decided on the basis of the reproduction time (T1) of the error packet (S1), and it is decided whether this packet has arrived at the receiving end before the arrival time limit or not. For example, when the packet (S1) has arrived at the receiving end before the arrival time limit, the receiving end instructs the transmitting end to retransmit the packet (S1), by using the sequence number S1.

In the third modification of the sixth embodiment so constructed, since a difference between the header information (sequence number priority information, reproduction time) of a predetermined packet and the header information of a subsequence packet is embedded in the subsequence packet, the quantity of information to be embedded in the packet is reduced.

While in the third modification of the sixth embodiment the sequence number and the reproduction time are described as information to be embedded in the subsequent packet, information to be embedded is not restricted thereto. For example, in addition to the sequence number and the reproduction time, the retransmission count and the priority may be embedded.

Hereinafter, a description will be given of embodiments relating to application sections of the retransmission control of the data transmission methods according to the aforementioned embodiments.

Embodiment 7

In a data transmission method according to a seventh embodiment of the invention, data transmission between a distribution server and a terminal is performed in packet units through a relay server and, at the terminal end, data of received packets are successively reproduced. When a transmission error occurs between the relay server and the terminal, the relay server performs retransmission of the error packet in accordance with a retransmission request from the terminal. When a transmission error occurs between the distribution server and the relay server, the distribution server performs retransmission of the error packet in accordance with a retransmission request which is transmitted from the terminal through the relay server.

Figure 23:
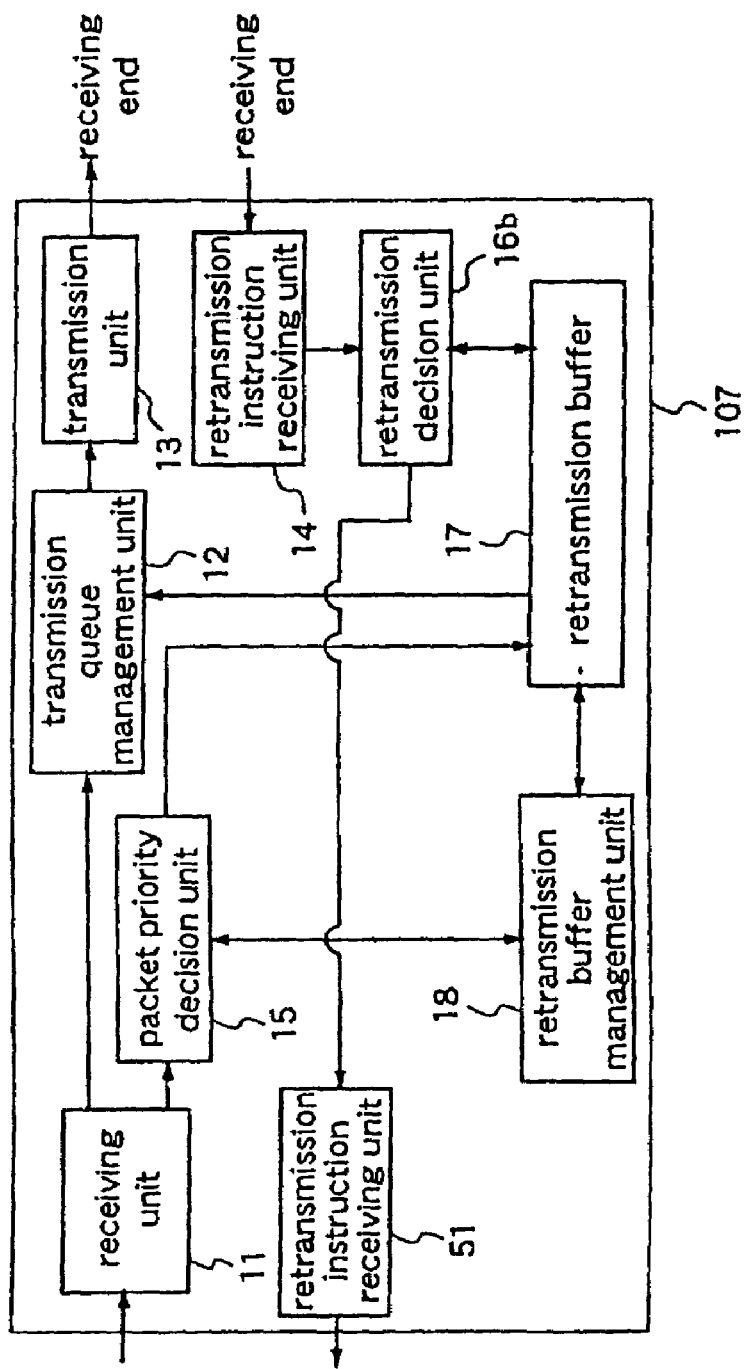
FIG. 23 is a block diagram illustrating a data transmission apparatus (relay server) in a data transmission system according to a seventh embodiment of the present invention.

FIG. 23 is a block diagram for explaining a data transmission method according to this seventh embodiment, illustrating a data transmission apparatus 107 in a system performing data transmission according to the data transmission method.

This data transmission apparatus 107 constitutes a relay server (transmitting end) which relays data transmitted between the distribution server and the terminal (receiving end), and it includes a retransmission instruction output unit 51, in addition to the constituents of the data transmission apparatus 101 of the first embodiment. The retransmission instruction output unit 51 instructs the distribution server to retransmit an error packet for which a retransmission request has been output from the terminal, on the basis of the result of decision in the retransmission propriety decision unit 16. Other constituents of the data transmission apparatus 107 are identical to those of the data transmission apparatus 101 of the first embodiment.

Next, the function and effect will be described.

In the seventh embodiment so constructed, when data transmission between the distribution server and the terminal is performed in packet units, the data transmission apparatus 107 relays data between the distribution server and the terminal.

When a transmission error occurs between the relay server (data transmission apparatus 107) and the terminal, the relay server performs retransmission of the error packet. In this case, a retransmission request for the error packet from the terminal is not relayed to the distribution server.

Further, when a transmission error occurs between the distribution server and the relay server (data transmission apparatus 107), a retransmission request for the error packet from the terminal is transmitted to the distribution server, and the error packet which is retransmitted from the distribution server is relayed by the data transmission apparatus 107 to be transmitted to the terminal.

In the seventh embodiment so constructed, when a transmission error occurs between the relay server (the data transmission apparatus) and the terminal, a retransmission request for the error packet from the terminal is not relayed to the distribution server, and the relay server performs retransmission for the error packet. Therefore, the number of retransmission times between the distribution server and the relay server can be reduced.

Modification of Embodiment 7

A modification of the seventh embodiment is a data transmission method in which data transmission between a distribution server and a terminal is performed in packet units through a relay server and, at the terminal end, data of received packets are successively reproduced. When a transmission error occurs between the distribution server and the relay server, the error packet is not transmitted to the terminal, but the relay server transmits a retransmission request to the distribution server and the error packet is retransmitted from the distribution server to the relay server.

Figure 24:
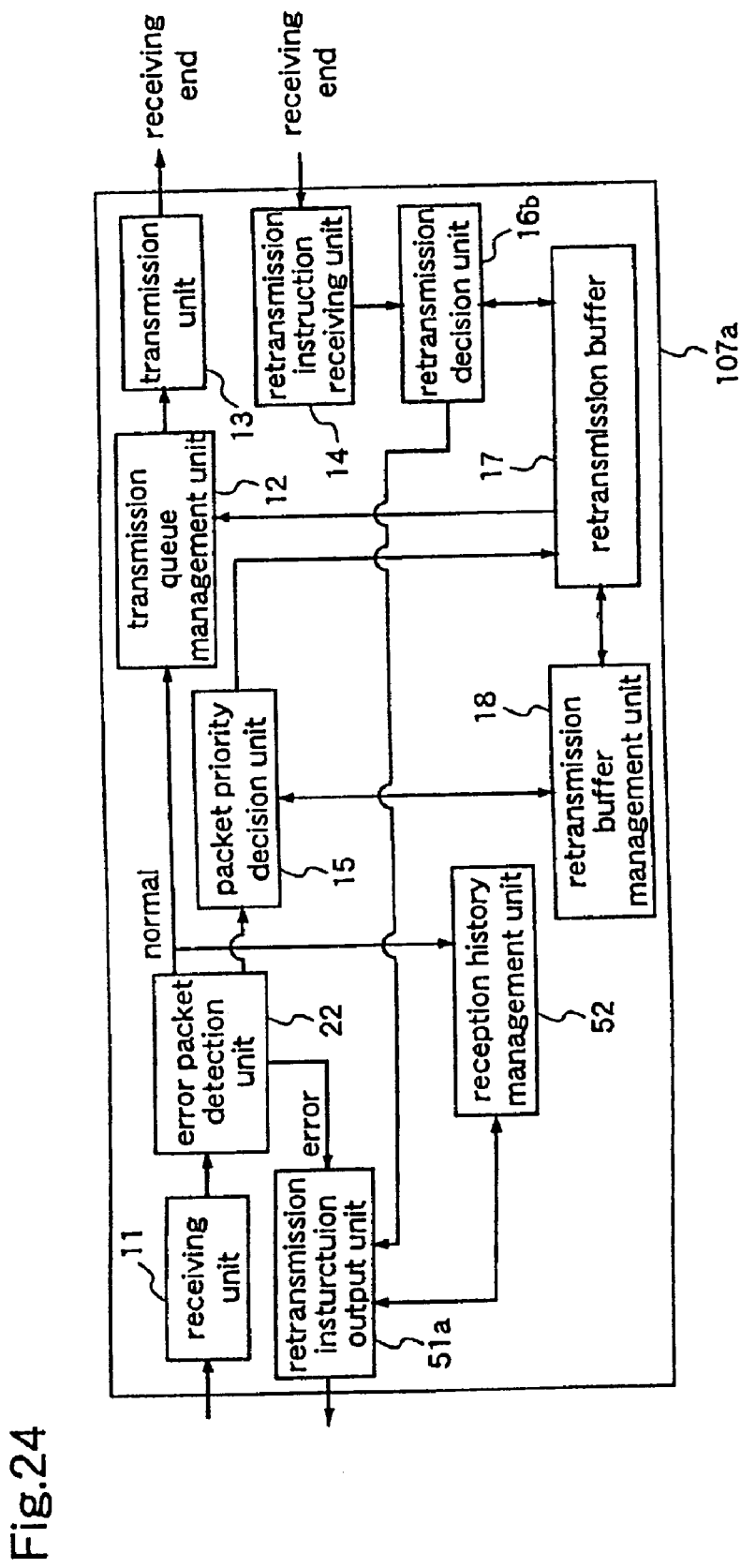
FIG. 24 is a block diagram illustrating a data transmission apparatus (relay server) in a data transmission system according to a modification of the seventh embodiment.

FIG. 24 is a block diagram illustrating a data transmission apparatus 107a in a data communication system according to the modification of the seventh embodiment.

The data transmission apparatus 107a constitutes a relay server (transmitting end) which relays data transmitted between a distribution server and a terminal (receiving end), and it includes an error packet decision unit 22, a reception history management unit, 52, and a retransmission instruction output unit 51a, in addition to the constituents of the data transmission apparatus 101 of the first embodiment. The error packet decision unit 22 decides whether each packet received is an error packet or not on the basis of the output from the receiving unit 11 which receives packets from the distribution server, and outputs normally received packets. The reception history management unit 52 manages the history of the normally received packets. The retransmission instruction output unit 51a instructs the distribution server to retransmit the error packet, according to the result of the decision in the retransmission decision unit 16, the result of the detection in the error packet detection unit 22, and the content s of the reception history in the reception history management unit 52. Other constituents of the data transmission apparatus 107a are identical to those of the data transmission apparatus 101 of the first embodiment.

Next, the function and effect will be described.

In the modification of the seventh embodiment so constructed, when data transmission between the distribution server and the terminal is performed in packet units, the data transmission apparatus 107a relays the data between the distribution server and the terminal.

When a transmission error occurs between the relay server (data transmission apparatus 107a) and the terminal, the relay server performs retransmission of the error packet. In this case, a retransmission request for the error packet from the terminal is not relayed to the distribution server.

Further, when a transmission error occurs between the distribution server and the relay server (data transmission apparatus 107a) the error packet is not transmitted to the terminal, but a retransmission request from the relay server is transmitted to the distribution server and the error packet is retransmitted from the distribution server to the relay server.

Then, the relay server transmits the error packet retransmitted from the distribution server, to the terminal.

In the modification of the seventh embodiment, when a transmission error occurs between the distribution server and the relay server, the error packet is not transmitted to the terminal, but the relay server outputs a retransmission request to the distribution server and thereby the distribution server retransmits the error packet to the relay server. Therefore, wasteful transmission of the error packet from the relay server to the terminal is avoided.

Embodiment 8

Figure 25:
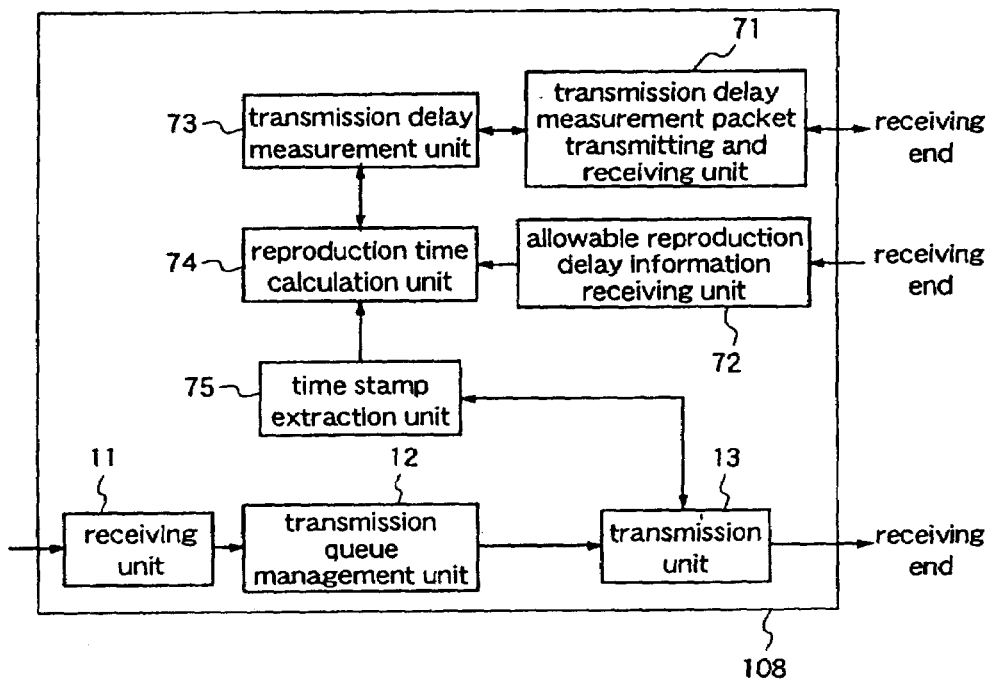
FIG. 25 is a block diagram illustrating a data transmission apparatus (relay server) in a data transmission system according to an eighth embodiment of the present invention.
Figure 26:
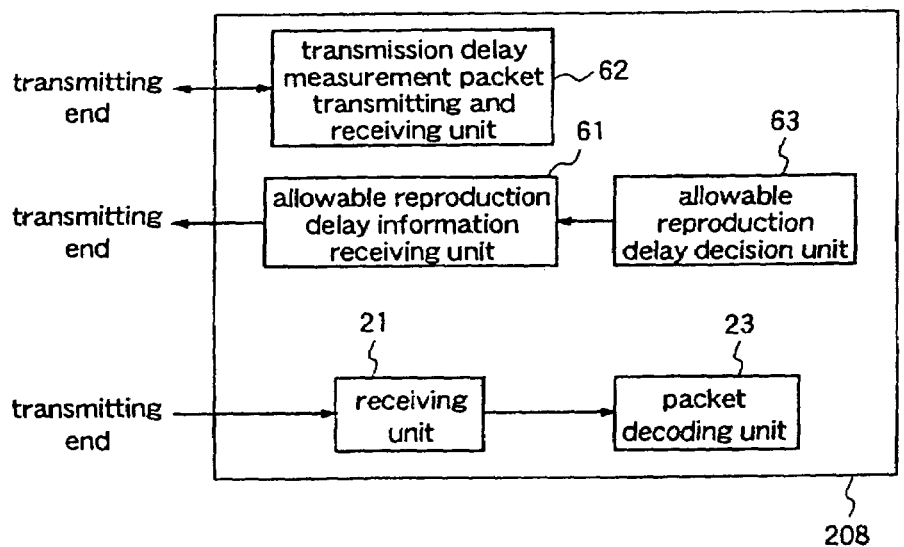
FIG. 26 is a block diagram illustrating a data receiving apparatus (receiving terminal) in the data transmission system according to the eighth embodiment.
Figure 27:
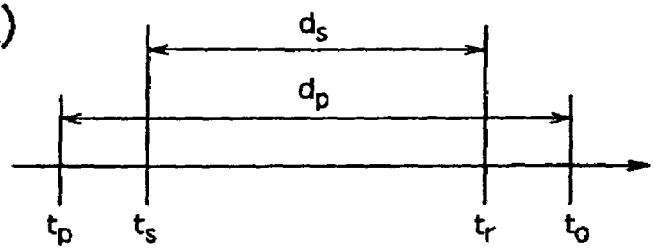
FIGS. 27(a) and 27(b) are diagrams for explaining a reproduction time estimation method according to the eighth embodiment illustrating the relationship between the time stamp of a packet and the packet output time (FIG. 27(a)) and a time stamp mapping method (FIG. 27(b)).
Figure 27:
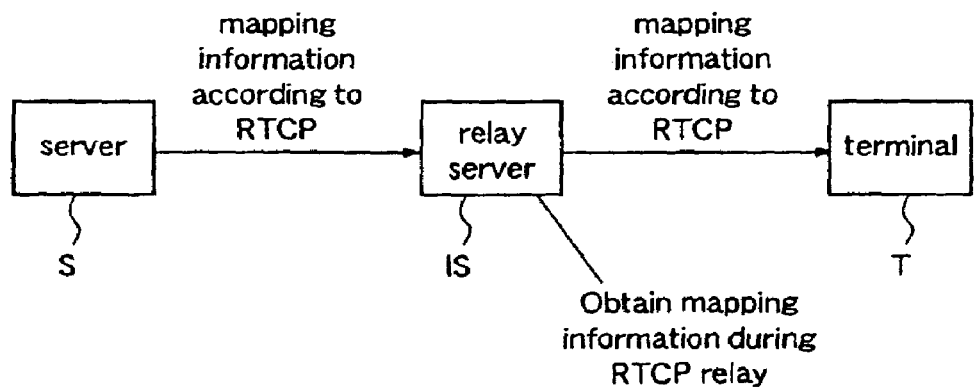
Figure 28:
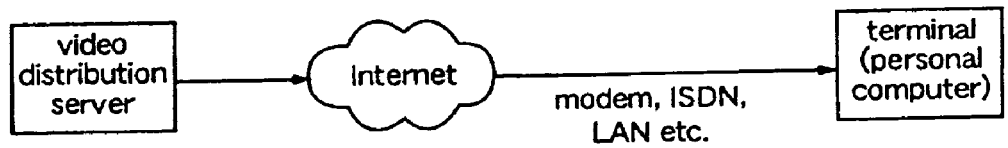
FIGS. 28(a) and 28(b) are schematic diagrams for conceptually explaining the conventional video transmission system, illustrating a server and a terminal connected by a cable (FIG. 28(a)), and a server and a terminal connected by a network including a radio transmission section.
Figure 28:
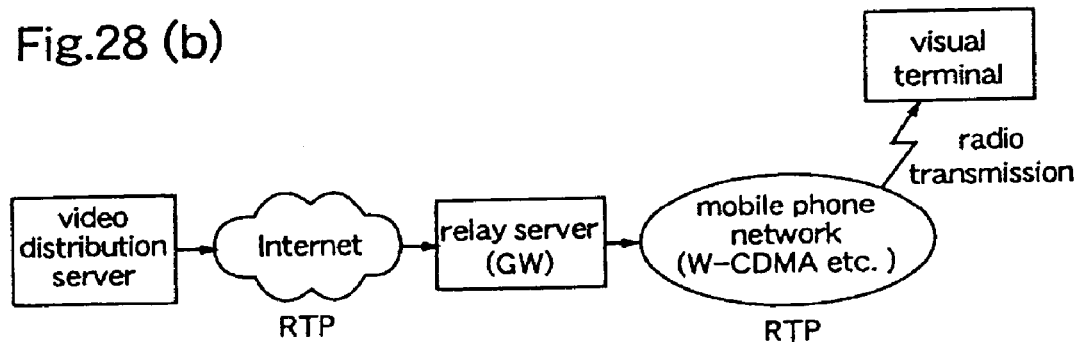

FIGS. 25–27 are diagrams for explaining a data transmission method according to an eighth embodiment of the present invention.

In this data transmission method, data transmission between a distribution server and a terminal is performed in packet units and, at the terminal end, data of received packets are successively reproduced. Further, information about a reproduction delay time which is allowable for the data reproduction time at the terminal end, is transmitted, from the terminal to the distribution server. In the distribution server, the reproduction time at the terminal is estimated on the basis of the reproduction delay time and the transmission delay time which is required for data transmission between the distribution server and the terminal.

FIG. 25 is a block diagram illustrating a data transmission apparatus 108 in a data communication system according, to this eighth embodiment of the invention.

This data transmission apparatus 108 constitutes a relay server (transmitting end) which relays data transmission between a distribution server and a terminal (receiving end), and it includes a receiving unit 11, a transmission queue management unit 12, and a transmission unit 13. The receiving unit 11 receives packets transmitted from the distribution server. The transmission queue management unit 12 sets the transmission order of the received packets, in accordance with additional information, such as a sequence number, which is given to each packet. The transmission unit 13 transmits the packets in the transmission order which is set by the unit 12.

The data transmission apparatus 108 further includes a time stamp extraction unit 75 and an allowable reproduction delay information receiving unit 72. The time stamp extraction unit 75 extracts a time stamp which is given to each packet as time information, through the transmission unit 13. The allowable reproduction delay information receiving unit 72 receives information relating to the allowable reproduction delay time (arrival time limit) from the receiving end (terminal).

Further, the data transmission apparatus 108 includes a transmission delay measurement packet transmitting and receiving unit 71, and a transmission delay measurement unit 73. The transmission delay measurement packet transmitting and receiving unit 71 performs transmission and reception of a packet used for measuring a transmission delay (transmission delay measurement packet). The transmission delay measurement unit 73 measures a transmission delay in accordance with the time required for forward and backward transmission of the transmission delay measurement packet between the transmitting end and the receiving end.

Further, the data transmission apparatus 108 includes a reproduction time calculation unit 74 which estimates the data reproduction time at the receiving end, in accordance with the transmission delay, the time stamp, and the allowable reproduction delay time (arrival time limit), and outputs the estimated reproduction time.

Furthermore, like the data transmission apparatus according to embodiment 1 or 6, the data transmission apparatus 108 has the function of storing a packet the priority of which is equal to or higher than a predetermined value in a retransmission buffer and discarding a packet which cannot be in the time for retransmissions and the function of retransmitting a packet for which a retransmission request is output from the receiving end, although these functions are not shown in the figure.

To be specific, the data transmission apparatus 108 includes the constituents corresponding to the retransmission instruction receiving unit 14, the packet priority decision unit 15, the retransmission decision unit 16, the retransmission buffer 17, and the retransmission buffer management unit 18 which are included in the data transmission apparatus 101 of the first embodiment. In the transmission queue management unit 12, setting of the packet transmission order is performed on all the packets to be transmitted, including not only the received packets but also the packets to be transmitted.

FIG. 26 is a block diagram illustrating a data receiving apparatus 208 in the data transmission system which performs real-time data transmission by the data transmission method according to this eighth embodiment.

The data receiving apparatus 208 includes a receiving unit 21 which receives packets transmitted from the relay server (data transmission apparatus at the transmitting end), and a packet decoding unit 23 which decodes the received packets.

The data receiving apparatus 208 further includes a transmission delay measurement packet transmitting and receiving unit 62, an allowable reproduction delay decision unit 63, and an allowable reproduction delay information transmitting unit 61. The transmission delay measurement packet transmitting and receiving unit 62 receives the transmission delay measurement packet which has been transmitted from the transmission delay measurement packet transmitting and receiving unit 71 at the transmitting end, and returns it to the transmitting end. The allowable reproduction delay decision unit 63 decides an allowable reproduction delay time, and outputs information relating to this. The allowable reproduction delay information transmitting unit 61 transmits the information relating to the allowable reproduction delay time, to the transmitting end.

Furthermore, like the data receiving apparatuses according to embodiments 1 and 6, the data receiving apparatus 208 has the function of detecting error packets and outputting a retransmission request for an error packet which can be in the time for retransmission, although this is not shown in the figure.

To be specific, the data receiving apparatus 208 includes the constituents corresponding to the error packet detection unit 22, the reception history management unit 24, the packet priority decision unit 25, and the retransmission instruction output unit 26 which are included in the data receiving apparatus 201 of the first embodiment.

Next, the function and effect will be described.

FIGS. 27(a) and 27(b) are diagrams for explaining a method for estimating the data reproduction time at the terminal, in the server according to this eighth embodiment. More specifically, FIG. 27(a) shows the relationship between the packet time stamp and the packet output time (reproduction time) or the like, and FIG. 27(b) shows a method for mapping the time stamp to the standard-time.

In the data transmission apparatus (transmitting end) 108, when the transmission unit 13 performs packet transmission in accordance with the transmission order which is set by the transmission queue management unit 12, the time stamp $t_p$ included in each packet is extracted by the time stamp extraction unit 75, and output to the reproduction time calculation unit 74. Further, the allowable reproduction delay time $d_p$ which is decided by the decision unit 63 of the data receiving apparatus (receiving end) 208 and transmitted through the transmission unit 61, is received by the allowable reproduction delay information receiving unit 72 and output to the reproduction time calculation unit 74. Further, the transmission delay measurement packet is transmitted from the transmission delay measurement packet transmitting and receiving unit 71 at the transmitting end to the transmission delay measurement packet transmitting and receiving unit 62 at the receiving end, and the transmission delay measurement packet is returned from the transmitting and receiving unit 62 at the receiving end to the transmitting and receiving unit 72 at the transmitting end, whereby the server-to-terminal transmission delay $d_s$ is obtained by the transmission delay measurement unit 73 and output to the reproduction time calculation unit 74. The time when each packet is output from the server is measured at the transmitting end.

Then, the reproduction time calculation unit 74 estimates the reproduction time (packet output time) $t_o$ of each packet at the receiving end.

To be specific, as shown in FIG. 27(a), the packet output time to is obtained by adding the allowable reproduction delay time $d_p$ to the time stamp $t_p$, and the terminal reception time $t_r$ is obtained by adding the server-to-terminal transmission delay $d_s$ to the server output time $t_s$. Accordingly, the reproduction time calculation unit 74 obtains the packet output time to by $(t_p+d_p)$ and the terminal reception time $t_r$ by $(t_s+d_s)$.

Thereafter, in the data transmission apparatus 108, on the basis of comparison between $(t_s+d_s)$ and $(t_p+d_p)$ it is decided whether the transmission packet can arrive at the receiving end before the reproduction time or not, i.e., whether the relationship terminal reception time tr to the requested packet output time to, is satisfied or not. Based on the result of this decision, retransmission of the requested error packet and discard of the packet in the retransmission buffer are performed.

While in this eighth embodiment the reproduction delay $d_p$ is transmitted from the receiving terminal to the server, this may be a fixed value. Further, temporal synchronization between the server and the terminal is made by, for example, NTP (network time protocol) of Internet standard.

Further, the time stamp $t_p$ of each packet is obtained from the time stamp of the RTP header, this time stamp value must be mapped onto the same time axis as the server output time or the like.

Hereinafter, the RTP time stamp mapping method in the relay server will be described briefly.

Since the RTP time stamp is not expressed directly by the standard time, it is mapped to time information based on the standard time, by using information included in other standard protocols RTCP. (Real-Time Control Protocol) and RTSP (Real-Time Stream Protocol). The relay server (data transmission apparatus) 108 must know this mapping information and, therefore, the relay, server 108 obtains this mapping information when it relays the mapping information.

For example, as shown in FIG. 27(b), when the mapping information for the time stamps included in the Internet standard protocols RTCP and RTSP, which is output from the server S, is relayed by the relay server IS to the terminal T, the mapping information is analyzed by the relay server IS. Further, the mapping information for the time stamps at the terminal is transmitted from the terminal to the server.

As described above, according to the eighth embodiment, since the server (data transmission apparatus) estimates the actual output time (reproduction time) of each packet at the terminal, a packet which cannot be in time for reproduction can be eliminated from the retransmission buffer.

In this eighth embodiment, the method for deciding the transmission delay time and the allowable reproduction delay time is not restricted to the above-mentioned method. For example, during data reproduction at the receiving end, the transmission delay between the server and the terminal may be dynamically updated according to the information from the receiving end. Alternatively, during data reproduction at the receiving end, the allowable reproduction delay may be measured and changed dynamically.

Furthermore, while in this eighth embodiment the actual output time (reproduction time) of each packet at the terminal is estimated in the relay server (data transmission apparatus), it may be estimated in the distribution server in accordance with the allowable reproduction delay time from the terminal or the transmission delay time required for data transmission between the distribution server and the terminal.

Embodiment 9

Figure 29:
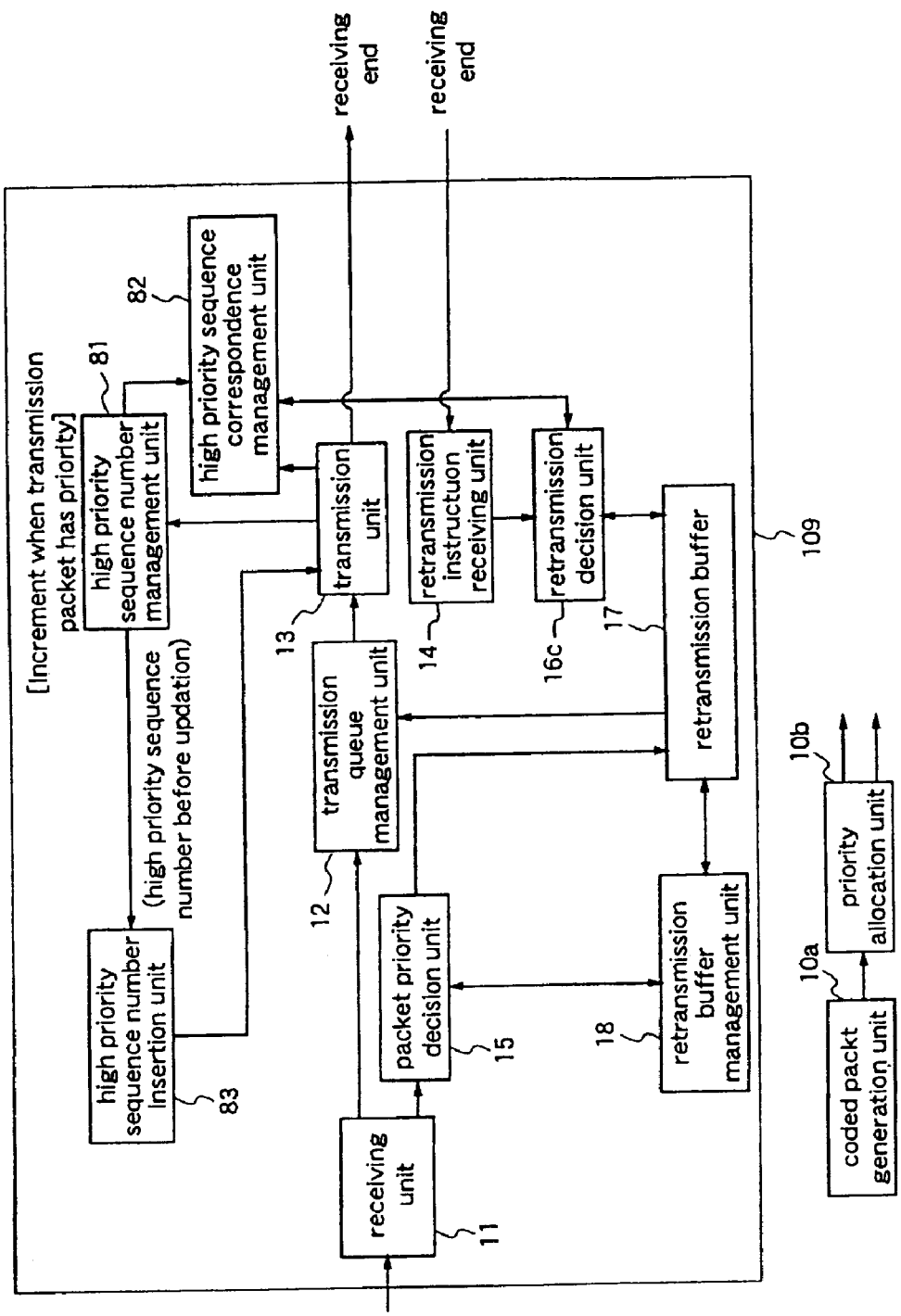
FIGS. 29(a) and 29(b) are block diagrams for explaining a data transmission apparatus as a relay server and a data transmission apparatus as a distribution server, respectively, in a data transmission system according to a ninth embodiment of the present invention.
Figure 30:
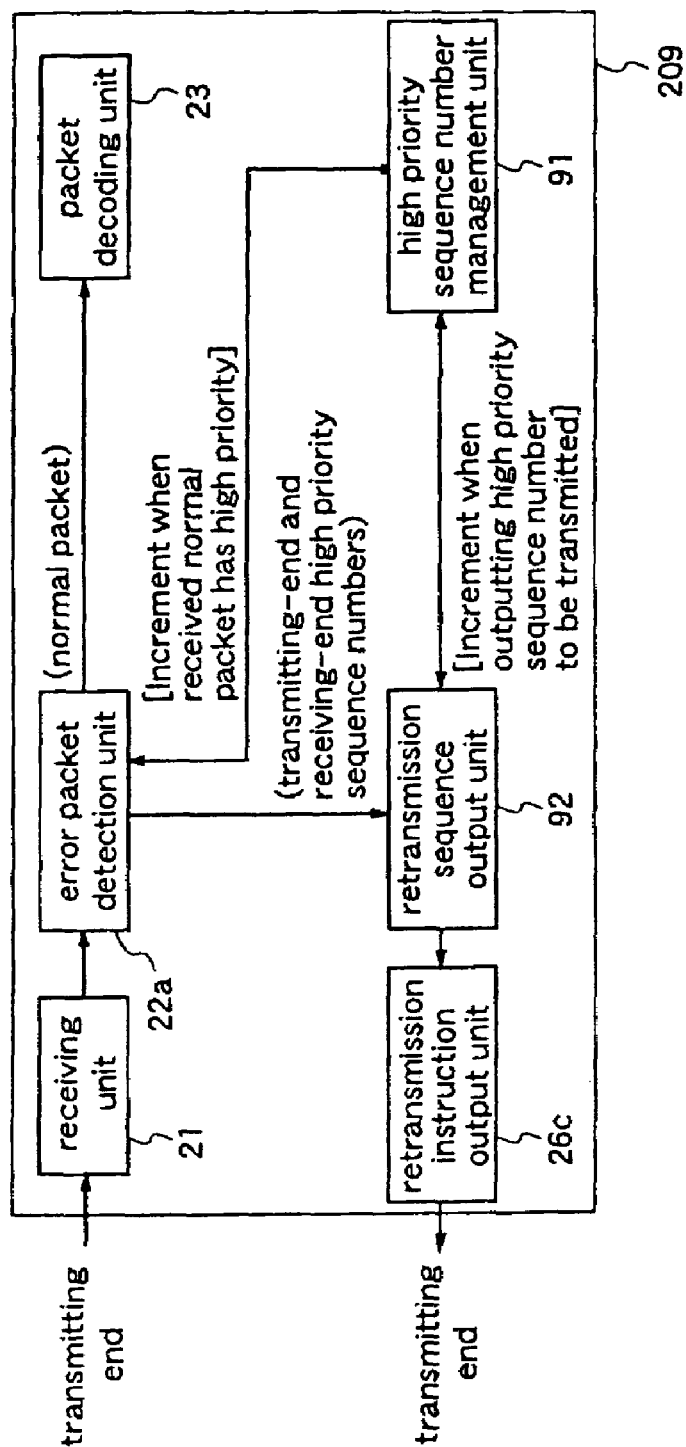
FIG. 30 is a block diagram illustrating a data receiving apparatus (receiving terminal) in the data transmission system according to the ninth embodiment.
Figure 31:
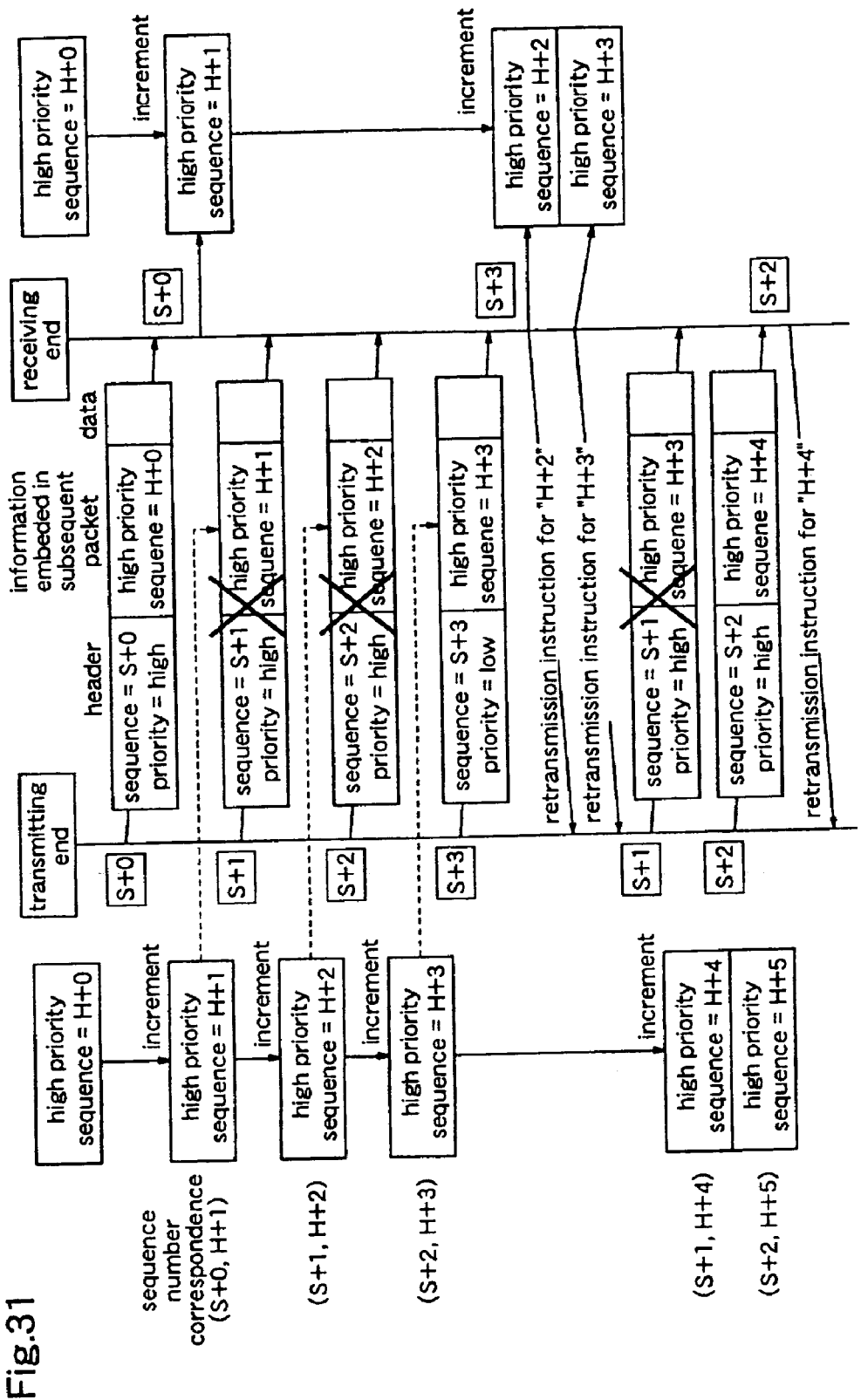
FIG. 31 is a sequence diagram for explaining packet selective retransmission control in the real-time data transmission method according to the ninth embodiment.

FIGS. 29–31 are diagrams for explaining a data transmission method according to a ninth embodiment of the present invention. In the data transmission method of this ninth embodiment, data transmission from the transmitting end to the receiving end is continuously performed in units of packets each having additional information relating to its sequence number, priority, and data reproduction time at the receiving end, which are required to realize real-time transmission in packet units, while successively reproducing data of the packets received at the receiving end. At this time, only error packets whose priorities are equal to or higher than a predetermined value are retransmitted.

FIG. 29(a) is a block diagram illustrating a data transmission apparatus 109 in a data transmission system which performs real-time data transmission according to the data transmission method of this ninth embodiment.

The data transmission apparatus 109 constitutes a relay server (transmitting end) which relays data transmitted between a distribution server and a terminal (receiving end). The data transmission apparatus 109 includes a receiving unit 11, a transmission queue management unit 12, and a transmission unit 13. The receiving unit 11 receives packets transmitted from the distribution server. The transmission queue management unit 12 sets the transmission order of the received packets and the packets to be retransmitted (retransmission packets) in accordance with the above-described additional information. The transmission unit 13 transmits the packet data in the transmission order which has been set by the transmission queue management unit 12.

The data transmission apparatus 109 further includes a high priority sequence number management unit 81, a sequence number correspondence management unit 82, and a high priority sequence number insertion unit 83. When the priority of a packet transmitted by the transmission unit 13 is equal to or higher than a predetermined value, the high priority sequence number management unit 81 increments the value of the sequence number which corresponds to only the high priority packet (high priority sequence number), and stores the incremented value. The sequence number correspondence management unit 82 stores the correspondence between the value of the sequence number of the transmitted high priority packet and the value of the incremented high priority sequence number of this high priority packet. The high priority sequence insertion unit 83 outputs the value of the high priority sequence number of each high priority packet, which is stored in the management unit 81, so that it is inserted in the packet to be transmitted.

The high priority sequence numbers managed by the high priority sequence number management unit 81 correspond to the number of high priority packets transmitted from the transmitting end.

Further, the data transmission apparatus 109 includes a retransmission buffer 17, a packet priority decision unit 15, and a retransmission buffer management unit 18. The retransmission buffer 17 stores predetermined packets amongst the received packets, as retransmission packets. The packet priority decision unit 15 decides the priorities of the received packets. The retransmission buffer management unit 18 controls the retransmission buffer 17 such that data of packets whose priorities are equal to or higher than a predetermined value are stored in the buffer 17, in accordance with the decided priorities of the packets.

Further, the data transmission apparatus 109 includes a retransmission instruction receiving unit 14 and a retransmission decision unit 16c. The retransmission instruction receiving unit 14 receives a retransmission request indicating a high priority sequence number, from the terminal at the receiving end. The retransmission decision unit 16c decides whether retransmission of a packet for which the retransmission request has been made is performed or not. The retransmission decision unit 16 retrieves the management information in the sequence number correspondence management unit 82, in accordance with the high priority sequence number indicated by the retransmission request, to obtain the sequence number corresponding to the high priority sequence number used for the retransmission request, and decides that the requested packet is to be retransmitted, only when the packet of the sequence number is stored in the retransmission buffer 17.

In FIG. 29(a), real-time data transmission is performed in packet units between the distribution server and the terminal through the relay server or the like, and the data transmission apparatus 109 constitutes the relay server. However, the relay server may serve as the distribution server. To be specific, when the data transmission apparatus serves as the distribution server, it is constructed as shown in FIG. 29(b). In FIG. 29(b), the receiving unit 11 of the data transmission apparatus 109 is replaced with a coded packet generation unit 10a which encodes the data and outputs the coded data in packet units, and a priority allocation unit 10b which allocates additional information, such as a priority, to each packet output from the coded packet generation unit 10a.

FIG. 30 is a block diagram illustrating a data receiving apparatus 209 in the data transmission system which performs real-time data transmission according to the data transmission method of the ninth embodiment.

The data receiving apparatus 209 includes a receiving unit 21, an error packet detection unit 22a, and a packet decoding unit 23. The receiving unit 21 receives the packets transmitted from the data transmission apparatus at the transmitting end. The error packet detection unit 22a detects error packets in which errors have occurred during transmission and outputs normal packets which have been transmitted without transmission errors. The packet decoding unit 23 receives the normal packets and decodes the coded data of the normal packets.

When the high priority sequence number inserted in the packet from the data transmission apparatus (transmitting end high priority sequence number) is correctly extracted, the error packet detection unit 22a outputs both of the value of the transmitting end high priority sequence number and the value of the receiving end high priority sequence number at this point of time. The value of the receiving end high priority number corresponds to the number of the high priority packets received at the receiving end, and this value is incremented every time a high priority packet is received at the receiving end.

Further, the data receiving apparatus 209 includes a high priority sequence number management unit 91 and are transmission sequence number decision unit 92. When the error packet detection unit 122a outputs a normal packet, the high priority sequence number management unit 91 increments the value of the receiving end high priority sequence number and stores it. The retransmission sequence number decision unit 92 compares the value of the transmitting end high priority sequence number output from the error packet detection unit 22a with the value of the receiving end high priority sequence number. When these values are not equal, the decision unit 92 outputs the values ranging from the value obtained by adding 1 to the value of the receiving end high priority sequence number to the value of the transmitting end high priority sequence number, as the values of retransmission sequence numbers (transmitting end high-priority sequence numbers).

The high priority sequence number management unit 91 increments the value of the stored receiving end high priority sequence number every time the retransmission sequence number decision unit 92 outputs a high priority sequence number.

Further, the data receiving unit 209 includes a retransmission instruction output unit 26c which outputs a retransmission request for an error packet to the transmitting end, on the basis of the transmitting end high priority sequence number which is output as a retransmission sequence number from the retransmission sequence number decision unit 92.

Next, the function and effect will be described.

FIG. 31 is a sequence diagram for explaining the selective packet retransmission control in the data transmission method of this ninth embodiment.

In the description with respect to FIG. 31, a sequence number [S+n] indicates a sequence number having a value "S+n", a sequence number [H+n], indicates a high priority sequence number having a value "H+n", and a packet (S+n) indicates a packet having a sequence number the value of which is "S+n". Further, n is any of 0, 1, 2, 3, 4, and 5.

For example, assuming that the priorities equal to or higher than the predetermined value are high priorities while the priorities lower than the predetermined value are low priorities, as shown in FIG. 31, when an error has occurred during transmission of high priority packets (S+1) and (S+2) of sequence numbers [S+1] and [S+2], retransmission requests for these high priority packets are made at the receiving end. However, when an error has occurred during transmission of a low priority packet (S+3) of sequence number [S+3], no retransmission request is made for this low priority packet (S+3).

To be specific, each packet transmitted from the distribution server is given additional information relating to its sequence number and priority. In the data transmission apparatus 109 as a relay server, the transmission order of the received packets is set by the transmission queue management unit 12, and then the packets are supplied to the transmission unit 13. On the other hand, the priorities of the received packets are decided by the packet priority decision unit 15. Then, in the transmission unit 13, transmission of these packets is performed according to the transmission order which has been set. Further, those packets whose priorities are decided as being equal to or higher than the predetermined value are stored in the retransmission buffer 17 under control of the retransmission buffer management unit 18. Further, in the retransmission buffer 17, data are successively released (discarded) from the packets which cannot be in time for reproduction, under control of the management unit 18.

Next, a description will be given of management of the sequence numbers at the time of packet transmission.

When transmitting a high priority packet, the high priority sequence number is incremented.

To be specific, when a high priority packet (S+0) of sequence number [S+0] is transmitted by the transmission unit 13, the value of the transmitting end high priority sequence number [H+0] which is stored in the high priority sequence number management unit 81 is incremented to "H+1". At this time, the value of the sequence number [S+0] of the high priority packet (S+0) and the incremented value of the transmitting end high priority sequence number [H+1] are entered, by one-to-one correspondence, in the sequence number correspondence management unit 82.

Likewise, when a high priority packet (S+1) of sequence number [S+1] is transmitted by the transmission unit 13, the value of the transmitting end high priority sequence number [H+1] which is stored in the high priority sequence number management unit 81 is incremented to "H+2". At this time, the value of the sequence number [S+1] of the high priority packet (S+1) and the incremented value of the transmitting end high priority sequence number [H+2] are entered, by one-to-one correspondence, in the sequence number correspondence management unit 82.

Further, also when a high priority packet (S+2) is transmitted, like the high priority packets (S+0) and (S+1), the transmitting end high priority sequence number [H+2] in the high priority sequence number management unit 81 is incremented, and the sequence number [S+2] of the high priority packet (S+2) and the incremented transmitting end high priority sequence number [H+3] are entered, by one-to-one correspondence, in the sequence number correspondence management unit 82.

On the other hand, when transmitting a low priority packet, the corresponding low, priority sequence number is not incremented To be specific, when a low priority packet (S+3) of sequence number [S+3] is transmitted by the transmission unit 13, the value of the transmitting end high priority sequence number [H+3] stored in the high priority sequence number management unit 81 is not updated but maintained as it is. At this time, the process of entering the sequence number of the transmitted packet and the transmitting end high priority sequence number [H+3] which is stored in the high priority sequence number management unit 81, in the sequence number correspondence management unit 82, is not performed.

Next, a description will be given of a sequence number embedding process at the time of packet transmission.

When the high priority packet (S+1) is transmitted, the value of the transmitting end high priority sequence number [H+] which is stored in the high priority sequence number management unit 81 at this point of time, is embedded in the header of the transmission packet (S+1) by the high priority sequence number insertion unit 83. Likewise, when the low priority packet (S+3) is transmitted, the value of the transmitting end high priority sequence number [H+3] which is stored in the high priority sequence number management unit 81 at this point of time, is embedded in the header of the transmission packet (S+3) by the high priority sequence number insertion unit 83. Thereafter, the transmission packet having the transmitting end high priority sequence number so embedded in its header, is transmitted to the receiving end by the transmission unit 13.

Those packets output from the distribution server are successively transmitted to the terminal (data receiving apparatus) 209 through the relay server.

In the data receiving apparatus 209, the packets from the relay server (data transmission apparatus) 109 are received by the receiving unit 21, and the received packets are supplied to the error packet detection unit 22a. The normally received high priority packet (S+0) is output from the error packet detection unit 22a to the packet decoding unit 23, and the value of its receiving end high priority sequence number (i.e., the value of the high priority sequence number [H+0] stored in the high priority sequence number management unit 91) is incremented to "H+1".

It is assumed that a transmission error has occurred during transmission of the high priority packets (S+1) and (S+2) and, thereafter, the low priority packet (S+3) subsequent to these packets has been transmitted without a transmission error.

In this case, the normally transmitted low priority packet (S+3) is output from the error packet detection unit 22a to the packet decoding unit 23, but the value of the receiving end high priority sequence number [H+1] which is stored in the high priority sequence number management unit 91 is not incremented.

Further, in the error packet detection unit 22a, when the transmitting end high priority sequence numbers [H+0] and [H+3] which are inserted in the high priority packet (S+0) and the low priority packet (S+3), respectively, are correctly extracted, these transmitting end high priority sequence, numbers [H+0] and [H+3] are output to the retransmission sequence number decision unit 92. Further, the receiving end high priority sequence numbers [H+0] and [H+1] which are stored in the high priority sequence number management unit 91 at the time when the transmitting end high priority sequence numbers [H+0] and [H+3] are extracted by the error packet detection unit 22a, are output to the retransmission sequence number decision unit 92.

For example, at the time when the transmitting end high priority sequence number [H+0] is extracted, the value [H+0] of the receiving end high priority sequence number stored in the high priority sequence number management unit 91 as well as the transmitting end high priority sequence number [H+0] are output to the retransmission sequence number decision unit 92. At the time when the transmitting end high priority sequence number [H+3] is extracted, the value [H+1] of the receiving end high priority sequence number stored in the high priority sequence number management unit 91 as well as the transmitting end high priority sequence number [H+3] are output to the retransmission sequence number decision unit 92.

In the retransmission sequence number decision unit 92, the transmitting end high priority sequence number and the receiving end high priority sequence number, which have been supplied at the same time, are compared, to decide whether retransmission is to be requested to the transmitting end.

For example, as the result of the comparison between the transmitting end high priority sequence number [H+0] and the receiving end high priority sequence number [H+0], since the values of these high priority sequence numbers are equal, no transmission instruction is performed. On the other hand, as the result of the comparison between the transmitting end high priority sequence number [H+3] and the receiving end high priority sequence number [H+1], since the values of these high priority sequence numbers are not equal, a retransmission instruction is performed. In this case, the values ranging from the value obtained by adding 1 to the value of the receiving end high priority sequence number [H+1] to the value of the transmitting end high priority sequence number [H+3], i.e., "H+1" and "H+3", are output to the retransmission instruction output unit 26 as the values of the high priority sequence numbers user for the retransmission instruction. At this time, in the high priority sequence, number management unit 91, the value of the stored receiving end high priority sequence number is incremented twice to be "H+3".

On receipt of "H+2" and "H+3" as the values of the high priority sequence numbers, the retransmission instruction output unit 26 outputs a retransmission request with the high priority sequence number [H+2] and a retransmission request with the high priority sequence number [H+3], to the transmitting end.

Then, in the data transmission apparatus 109 at the transmitting end, the retransmission requests are received by the retransmission instruction receiving unit 14, and the management information in the sequence number correspondence management unit 82 is retrieved on the basis of the requested high priority sequence numbers [H+2] and [H+3], thereby obtaining the sequence number [S+1] corresponding to the high priority sequence number [H+2] and the sequence number [S+2] corresponding to the high priority sequence number [H+3].

Further, in the retransmission decision unit 16c, it is decided whether the data of the packets corresponding to the sequence numbers [S+1] and [S+2] are stored in the retransmission buffer 17 or not. Based on the result of this decision, only the packets the data of which are stored in the retransmission buffer 17 are output as retransmission packets from the retransmission buffer 17 to the transmission queue management unit 12. Here, the high priority packets (S+1) and (S+2) are output as retransmission packets.

In the retransmission queue management unit 12, the transmission order is set for these retransmission packets, and these packets are retransmitted to the receiving end through the transmission unit 13. Since the retransmission packets (S+1) and (S+2) are high priority packets, when transmitting these packets the values of their transmitting end high priority sequence numbers stored in the high priority sequence number management unit 81 are incremented.

To be specific, when transmitting the retransmission packet (S+1), the value of the transmitting end high priority sequence number [H+3] stored in the high sequence number management unit 81 is incremented to "H+4", and the sequence number [S+1] of the retransmission packet (S+1) and the transmitting end high priority sequence number [H+4] are entered by one-to-one correspondence, in the sequence number correspondence management unit 82.

Further, when transmitting the retransmission packet (S+2) the value of the transmitting end high priority sequence number [H+4] stored in the high priority sequence number management unit S1 is incremented to "H+5", and the sequence number [S+2] of the retransmission packet (S+2) and the transmitting end high priority sequence number [H+5] are entered, by one-to-one correspondence, in the sequence number correspondence management unit 82.

As described above, according to the ninth embodiment of the invention, data transmission from the transmitting end to the receiving end is continuously performed in units of packets, each packet having additional information relating to its sequence number, priority and data reproduction time, and information relating to the high priority sequence number managed at the transmitting end and, simultaneously, data of received packets are successively reproduced at the receiving end. The value of the transmitting end high priority sequence number possessed by the received packet (number of transmitted high priority packets is compared with the value of the receiving end high priority sequence number, managed at the receiving end (number of received high priority packets)), and a retransmission request is made by indicating a transmitting end high priority sequence number which is absent. Therefore, the transmission quality of the ratio section in real-time transmission can be improved by the retransmission of error packets whose priorities are equal to or higher than a predetermined value and, moreover, the retransmission of error packets can be realized by simpler procedures.

In this ninth embodiment, when the high priority sequence numbers corresponding to plural high priority packets transmitter are continuously absent, the receiving end sends a retransmission request for each high priority packet having the absent high priority sequence number, to the transmitting end. However, retransmission requests for plural high priority packets may be sent collectively to the transmitting end, by listing the values of the plural high priority sequence numbers or indicating the range of these values.

In this case, at the transmitting end; based on the plural high priority sequence numbers requested from the receiving end, the sequence numbers corresponding to the respective transmitting end high priority packets are obtained by retrieval, and the high priority packets having the sequence numbers so obtained are retransmitted to the receiving end.

Embodiment 10

In a data transmission method according to a tenth embodiment of the present invention, the number of times of retransmission requests to the transmitting end and the interval of the retransmission requests are changed according to the transmission status of the radio section, whereby the probability of normal transmission of the retransmission requests to the transmitting end is increased to improve the transmission quality in the radio section.

Figure 32:
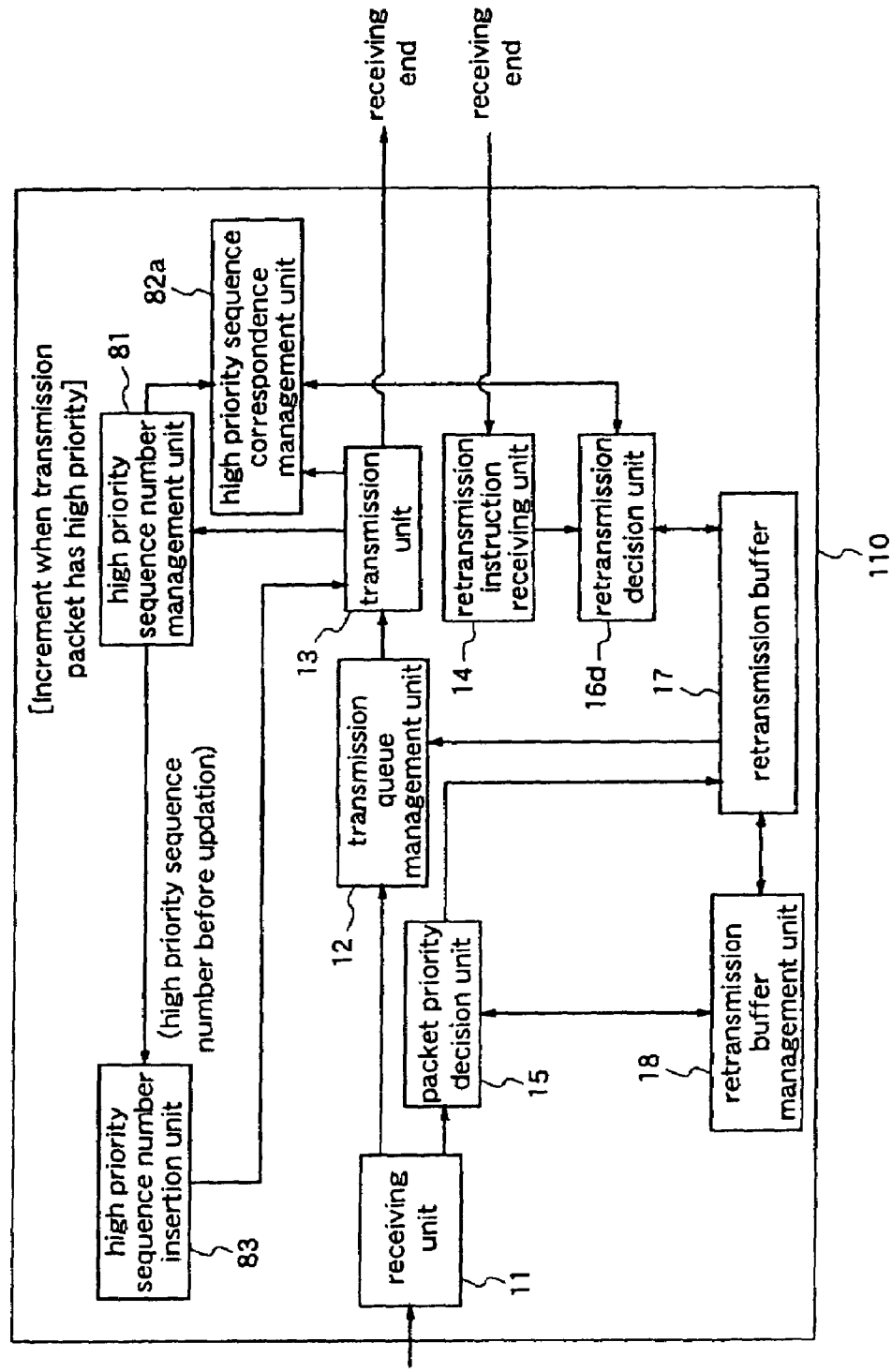
FIG. 32 is a block diagram illustrating a data transmission apparatus (relay server) in a data transmission system according to a tenth embodiment of the present invention.

FIG. 32 is a block diagram illustrating a data transmission apparatus 110 in a data transmission system performing real-time data transmission according to the data transmission method of this tenth embodiment.

The data transmission apparatus 110 includes a retransmission decision unit 16d, instead of the retransmission decision unit 16c of the data transmission apparatus 109 of the ninth embodiment. The retransmission decision unit 16d performed the same process as that of the decision unit 16c and, further, outputs the sequence number of the packet which is decided to be transmitted. Further, the data transmission apparatus 110 includes a sequence number correspondence management unit 82a, instead of the sequence number correspondence management unit 82 of the data transmission apparatus 109. The sequence number correspondence management unit 82a performs the same process as that of the unit 82 and, further, deletes the value of the transmitting end high priority sequence number corresponding to the value of the sequence number supplied from the retransmission decision unit 16d. Other constitutes of the data transmission apparatus 110 of this tenth embodiment are identical to those of the data transmission apparatus 109 of the ninth embodiment.

Figure 33:
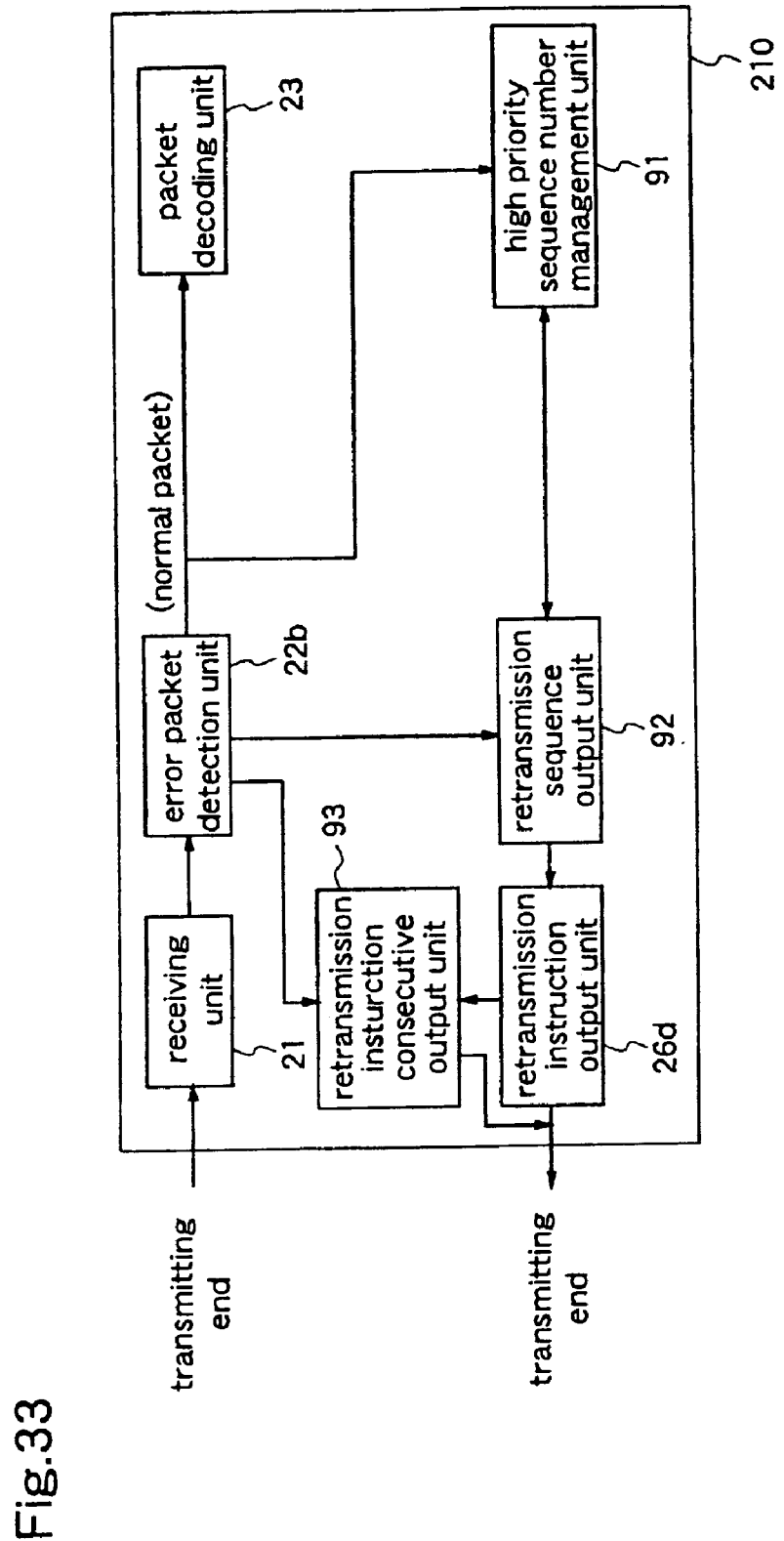
FIG. 33 is a block diagram illustrating a data receiving apparatus (receiving terminal) in the data transmission system according to the tenth embodiment.

FIG. 33 is a block diagram illustrating a data receiving apparatus 210 in the data transmission system performing real-time data transmission according to the data transmission method of this tenth embodiment.

The data receiving apparatus 210 includes an error packet detection unit 22b, instead of the error packet detection unit 22a of the data receiving apparatus 209 of the ninth embodiment The error packet detection unit 22b performs the same process a that of the unit 22a and, further, decides the transmission status of the radio section, from the number of the detected error packets.

Further, the data receiving apparatus 210 includes a retransmission instruction output unit 26d, instead of the retransmission instruction output unit 26c of the data receiving apparatus 209. The retransmission instruction output unit 26d performs the same process as that of the unit 26c and, further, outputs the transmitted retransmission request as a control signal.

Further, the data receiving apparatus 210 includes a retransmission instruction consecutive output unit 93 which receives the control signal (retransmission request) output from the retransmission instruction output unit 26d, and consecutively outputs the retransmission request by a predetermined number of times at predetermined intervals. Further, the unit 93 changes the number of output times of retransmission request and the output interval, according to information indicating the transmission status of the radio section, which is output from the error packet detection unit 22b.

Other constituents of the data receiving apparatus 210 of this tenth embodiment are identical to those of the data receiving apparatus 209 of the ninth embodiment.

Next, the function and effect will be described.

Since the fundamental data transmission process according the data transmission method of this tenth embodiment is identical to that of the ninth embodiment, only a distinctive process of this tenth embodiment will be described hereinafter.

In this tenth embodiment, the packet from the transmitting end is received by the receiving unit 21 and output to the error packet detection unit 22b. In the error packet detection unit 22b, the transmission status of the radio section is detected according to the output of the receiving unit 21, and information indicating the transmission status of the radio section is supplied to the retransmission instruction consecutive output unit 93.

On the other hand, when the high priority sequence number output from the retransmission sequence output unit 92 is input to the retransmission instruction output unit 26b, a retransmission request indicating the high priority sequence number is output from the retransmission instruction output unit 26b to the transmitting end and, simultaneously, this retransmission request is output as a control signal to the retransmission instruction consecutive output unit 93.

Then, the retransmission instruction consecutive output unit 93 performs a consecutive retransmission process for consecutively transmitting the retransmission request by several times. In this consecutive retransmission process, the number transmission times of the retransmission request and the transmission interval are adjusted on the basis of a predetermined value, according to the transmission status of the radio section which is obtained from the output information of the error packet detection unit 22b.

For example, when many transmission errors occur in the radio section, the number of request transmission times is increased and the output interval is increased. Thereby, the probability of normal transmission of the retransmission request to the transmitting end increases. On the other hand, when not many transmission errors occur in the radio section, the number of request transmission times is decreased, and the output interval is narrowed. Thereby the time required for retransmission is reduced.

Further, at the transmitting end, packet retransmission is carried out according to the retransmission request, and the sequence number correspondence management unit 82a deletes the value of the transmitting end high priority sequence number corresponding to the sequence number supplied from the retransmission decision unit 16d.

Therefore, with respect to the same retransmission request which is received again, retrieval for the sequence number corresponding to this retransmission request by the retransmission decision unit 16d ends in failure because the correspondence between the transmitting end high priority sequence number indicated by this retransmission request and the sequence number is deleted from the sequence number correspondence management unit 82a.

As the result, in the retransmission decision unit 16d, it is decided that no retransmission is performed for the high priority packet for which the retransmission request has been made by indicating the value of the transmitting end high priority sequence number. Therefore, at the transmitting end, is avoided that the same packet is repeatedly retransmitted where the same retransmission request is output several times from the receiving end.

As described above, according to the tenth embodiment of the present invention, a retransmission request indicating the high priority sequence number of a desired packet is consecutively transmitted several times, from the receiving end to the transmitting end, against transmission errors. Therefore, when at least one of the several transmission requests from the receiving end is normally received at the transmitting end, the error packet the priority of which is equal to or higher than a predetermined value can be retransmitted, whereby the transmission quality in the radio section in real-time transmission can be effectively improved.

Hereinafter, a description will be given of the data structure of a packet Pa for transmitting data by a data transmitting method according to any of the aforementioned embodiments.

FIGS. 34(a)–34(c) are diagrams illustrating the data structure of the packet Pa.

This packet Pa is composed of a header section Ph which contains relevant information indicating the attribute of the packet, and a data section Pd which stores data to be transmitted (FIG. 34(a)).

The header section Ph includes header information Ia indicating the sequence number corresponding to each packet, header information Ib indicating the reproduction time at the receiving end, of the data to be transmitted (time stamp) Ib, header information indicating the priority of each packet, extension header information Id, and other header information I to I10 (refer to FIG. 34(b)).

The specific convention of each header information is described in RFC1889 as shown in FIG. 34(c). For example, the header information 13 indicates that the extension header information Id is added to the header section Ph when its value is 1. The header information 15 indicates that the data stored in the data section is coded data by the MPEG1 method when its value PT is 32, and indicates that the data stored in the data section is coded data by the MPEG2 method when PT is 33. Further, each of the header information 19, Ic, I10, and I11 is header information to be added when the MPEG1 coded data is transmitted by RTP. The value P (P=1) of the header information Ic indicates that the data in the data section is I frame data, and the packet containing this I frame data is to be treated as a high priority packet. The value P (P=2) indicates that the data in the data section is P frame data, and the packet containing this P frame data is to be treated as a low priority packet. The value P(P=3) indicates that the data in the data section is B frame data, and the packet containing this B frame data is to be treated as a low priority packet.

Further, the extension header information Id corresponds to the sequence number and the priority information of the previous packet in the third embodiment (refer to FIG. 6), the sequence number and the retransmission count of the previously transmitted high priority packet in the fourth embodiment (refer to FIGS. 13 and 14), the sequence number and the reproduction time of the previous packet in the second modification of the sixth embodiment (refer to FIG. 21), the difference value of the sequence number of the previous packet and the difference value of the reproduction time of the previous packet in the third modification of the sixth embodiment (refer to FIG. 22), and the transmitting end high priority sequence number in the ninth embodiment (refer to FIG. 29).

What is claimed is:

1. A data structure of a retransmission packet, recorded on a computer-readable medium, for performing data retransmission from a transmitting end to a receiving end, said data structure of the retransmission packet comprising a header section and a data section, wherein:

said header section contains relevant information indicating an attribute of the retransmission packet, the relevant information including two sequence numbers comprising a first sequence number indicating a reproduction order of the retransmission packet, and a second sequence number indicating a transmission order of another retransmission packet; and said data section contains data to be transmitted.

2. The packet data structure of claim 1, wherein the retransmission packet is a high priority packet having a priority equal to or higher than a predetermined value.

3. The packet data structure of claim 1, wherein the second sequence number assigned to the retransmission packet is included in an RTP header.

4. The packet data structure of claim 1, wherein the second sequence number of a next retransmission packet which is to be transmitted next to the retransmission packet to be transmitted is incremented by one from the second sequence number of the retransmission packet to be transmitted.

* * * * *

UNITED STATES PATENT AND TRADEMARK OFFICE
CERTIFICATE OF CORRECTION

| | |
|---|---|
| PATENT NO. | : 7,124,333 B2 |
| APPLICATION NO. | : 10/945881 |
| DATED | : October 17, 2006 |
| INVENTOR(S) | : Hideaki Fukushima et al. |

It is certified that error appears in the above-identified patent and that said Letters Patent is hereby corrected as shown below:

ON THE TITLE PAGE, ITEM [57] SHOULD READ:

In the abstract, replace "A data transmission apparatus for relaying data transmitted from the transmitting end in units of packets, each packet having additional information relating to its sequence number, priority and data reproduction time, comprises: a receiving unit for receiving packets transmitted from the transmitting end; a priority decision unit for deciding the priority of each of the received packets; a retransmission packet storage unit for storing packets the priorities of which are equal to or higher than a predetermined value, as retransmission packets, on the basis of the priority of each packet decided by the priority decision unit; a retransmission instruction receiving unit for receiving a retransmission request from a terminal at the receiving end; a retransmission decision unit for deciding whether retransmission of the packet for which the retransmission request has been made should be performed or not, on the basis of the retransmission request and the storage status of the retransmission packets in the retransmission packet storage unit a transmission queue management unit for setting the transmission order of the received packets and the packets which have been decided as packets to be retransmitted, on the basis of additional information which is given to each packet; and a transmission unit for transmitting the data of these packets in the transmission order set by the management unit. Therefore, the transmission quality in a radio section in real-time transmission is improved and, further, the number of retransmission times is reduced." with --A data transmission apparatus including a receiving unit for receiving transmitted packets; a priority decision unit; a retransmission packet storage unit; a retransmission instruction receiving unit for receiving a retransmission request from a terminal at the receiving end; a retransmission decision unit; a transmission queue management unit; and a transmission unit.--.

Signed and Sealed this

Sixteenth Day of October, 2007

JON W. DUDAS
*Director of the United States Patent and Trademark Office*